US009148216B2

(12) United States Patent  
Spreizer

(10) Patent No.: US 9,148,216 B2  
(45) Date of Patent: Sep. 29, 2015

(54) DISTRIBUTED SATELLITE-BASED COMMUNICATIONS NETWORK AND METHOD OF PROVIDING INTERACTIVE COMMUNICATIONS SERVICES USING THE SAME

(75) Inventor: Steven H. Spreizer, Smithtown, NY (US)

(73) Assignee: GLOBECOMM SYSTEMS INC., Hauppauge, NY (US)

( * ) Notice: Subject to any disclaimer, the term of this patent is extended or adjusted under 35 U.S.C. 154(b) by 1446 days.

(21) Appl. No.: 10/898,594

(22) Filed: Jul. 23, 2004

(65) Prior Publication Data

US 2005/0136832 A1    Jun. 23, 2005

Related U.S. Application Data

(60) Provisional application No. 60/491,679, filed on Jul. 30, 2003.

(51) Int. Cl.
*H04W 4/00* (2009.01)
*H04B 7/185* (2006.01)
*H04W 84/06* (2009.01)

(52) U.S. Cl.
CPC ........... *H04B 7/18567* (2013.01); *H04W 84/06* (2013.01)

(58) Field of Classification Search
CPC ........ H04W 88/02; H04W 4/02; H04W 88/06
USPC ............................. 455/422.1, 424, 426.2, 427
See application file for complete search history.

(56) References Cited

U.S. PATENT DOCUMENTS

| 5,509,004 A | 4/1996 | Bishop, Jr. et al. ............. 370/54 |
| 5,727,057 A | 3/1998 | Emery et al. .................. 379/211 |
| 5,878,036 A | 3/1999 | Spartz et al. .................. 370/335 |
| 5,878,330 A | 3/1999 | Naumann ....................... 455/71 |

(Continued)

*Primary Examiner* — Nghi H Ly  
(74) *Attorney, Agent, or Firm* — Pollack, P.C.

(57) ABSTRACT

A distributed digital communications network and method for interactive communications, e.g., for cellular, wireless Internet access, digital television, and/or like multimedia services, is provided, that includes one or more global communications satellites positioned and adapted for receiving and relaying packet data communications encapsulating the interactive communications. One or more base station(s) are located in each of a plurality of selected remote geographic regions, and have mobile wireless links to a plurality of subscribers of communications services in the region. A plurality of satellite communications terminals is also provided for communicating with the satellite from the region. Each terminal is located in the selected remote geographic region and associated with one or more of the base stations. In addition, a plurality of user terminals are utilized, each located in the selected remote geographic region and associated with the base station(s) in the region. One or more base station controller(s) located remotely from, or locally with, the base station(s) have programming for controlling the base stations. Furthermore, a single mobile switching center located remotely from, or locally with, the base station controller(s) and the base stations. The switching center, in addition, has a digital communications signal processor for handling digital signal switching between the plurality of base stations, and/or wireline and/or other communications network(s). Finally, a packet data network is utilized between the satellite and satellite communications terminals for interactive data communications throughout the distributed network.

40 Claims, 29 Drawing Sheets

(56) References Cited

U.S. PATENT DOCUMENTS

| | | |
|---|---|---|
| 5,912,883 A | 6/1999 | Hershberg ............... 370/319 |
| 6,064,891 A | 5/2000 | Aucoeur ................... 455/555 |
| 6,311,073 B1 | 10/2001 | Charpentier et al. ....... 455/560 |
| 6,393,300 B1 | 5/2002 | Doutheau et al. .......... 455/555 |
| 6,434,385 B1 | 8/2002 | Aucoeur ................... 455/430 |
| 6,535,716 B1 | 3/2003 | Reichman et al. ......... 455/12.1 |
| 6,873,858 B1 * | 3/2005 | Aguilar et al. ............ 455/552.1 |
| 7,103,017 B2 | 9/2006 | Gutman et al. ............ 370/316 |
| 7,181,161 B2 | 2/2007 | Karabinis ................. 455/12.1 |
| 7,349,361 B1 * | 3/2008 | Allaway et al. ............ 370/316 |
| 7,606,204 B2 | 10/2009 | Sebastian et al. ........... 370/334 |
| 2002/0061766 A1 | 5/2002 | Sato et al. ................. 455/552 |
| 2002/0191595 A1 | 12/2002 | Mar et al. ................. 370/352 |
| 2004/0082330 A1 | 4/2004 | Marin ...................... 455/438 |
| 2004/0264455 A1 * | 12/2004 | Tao .......................... 370/389 |
| 2005/0026634 A1 * | 2/2005 | Raghavan et al. .......... 455/465 |

* cited by examiner

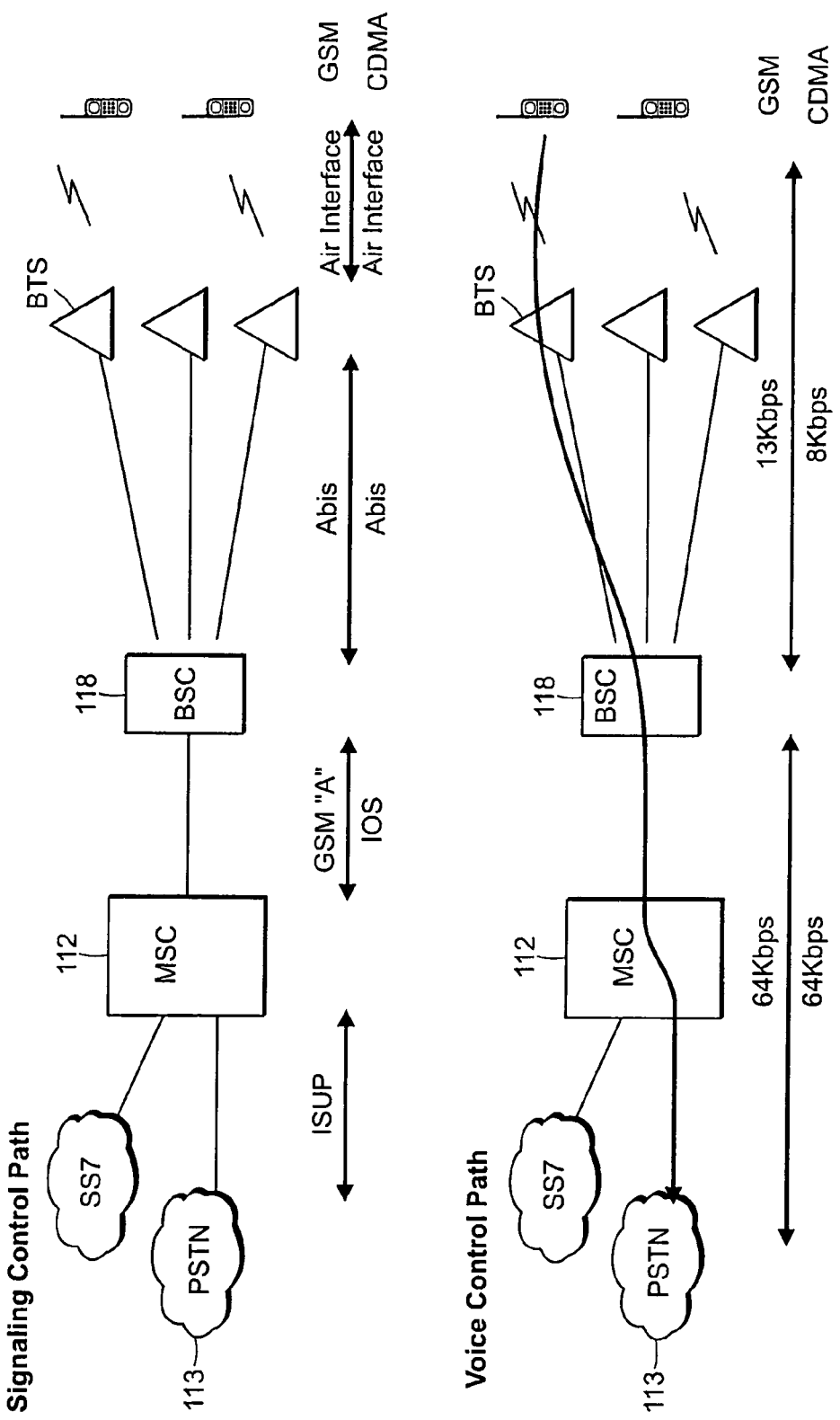

DISTRIBUTED SATELLITE-BASED COMMUNICATIONS NETWORK AND METHOD OF PROVIDING INTERACTIVE COMMUNICATIONS SERVICES USING THE SAME

This Application is based on and claims benefit of U.S. Provisional Application Ser. No. 60/491,679, filed on Jul. 30, 2003.

FIELD OF THE DISCLOSURE

This disclosure relates generally to communications networks and, more particularly, to networks operating over satellite for global applications.

BACKGROUND OF THE DISCLOSURE

Conventional communications networks, such as those for cellular telephones, utilize land based connections between a switch or mobile switching center (MSC), base stations (BSs), base station controllers (BSCs), and other network elements. Specifically, a signal or call processing element, is located in proximity to the physical traffic carrying and switching elements of the network, such elements being housed within the mobile switching center, and near corresponding cellular towers. Hence, when a call is placed, the call is routed through the call processing element and switch of a selected, albeit localized, geographic region based upon the signal reach of the cellular tower and corresponding communications zone defined thereby.

For applications over a relatively large geographic region, numerous cellular towers are usually needed to link the user, especially while a call is in progress, as he or she moves from one zone to another. The construction and maintenance of each tower site and the communications network used to interconnect multiple sites often involves considerable expense. While these arrangements have been found economically feasible for populated areas of most western nations, they are extraordinarily expensive for other nations, particularly those with relatively low population densities and/or vast remote, unpopulated, geographic regions. As a result, most of the geographic expanse of land in the world (including many countries that fall within those regions) have remained underserved or unreachable by cellular telephone service. In turn, the affected regions and nations have been largely precluded from the benefits of the wireless, Internet and digital revolutions of the last decade.

Accordingly, an economical, practical solution is desired not only for reducing the capital expense of providing telephone service to existing customers, but also for improving and adding service in remote geographic regions.

OBJECTS AND SUMMARY OF THE DISCLOSURE

According to one aspect of the disclosure, a distributed cellular network is provided, that includes one or more global communications satellites positioned and adapted for receiving and relaying packet data communications encapsulating cellular telephone communications. One or more base stations located in each of a plurality of selected remote geographic regions has mobile wireless links to a plurality of subscribers of cellular telephone services in the region. A plurality of satellite communications terminals is also provided for communicating with the satellite(s) from the region. Each terminal is located in the selected remote geographic region and associated with one or more of the base stations. In addition, a plurality of user terminals are utilized, each being located in the selected remote geographic region and associated with the base station(s) in the region. A base station controller located remotely from, or locally with, the base station(s) has programming for controlling the plurality of base station(s). Furthermore, a mobile switching center located remotely from, or locally with, the base station controller and the base stations has a call processor for handling cellular telephone call switching between the plurality of base stations, and/or wireline and/or other cellular telephone network(s), if present. Finally, a packet data network is utilized between the satellite and satellite communications terminals for interactive data communications throughout the network.

According to another aspect of the disclosure, a distributed cellular network is provided, that includes one or more global communications satellites positioned and adapted for receiving and relaying packet data communications encapsulating cellular telephone communications. Also provided is a plurality of base stations, each being located in a selected remote geographic region and having mobile wireless links to a plurality of subscribers of cellular telephone services. A plurality of satellite communications terminals are also located in the selected remote geographic regions, at least one terminal associated with each of the one or more base stations, for communicating with the satellite(s) from the region. In addition, a plurality of user terminals are utilized, each being located in the selected remote geographic region and associated with the base station(s) in the region. A base station controller located remotely from, or locally with, the base station(s) has programming for controlling the plurality of base stations. Furthermore, a mobile switching center in proximity to the base station controller has a call processor for handling cellular telephone call switching between the plurality of base stations, and/or wireline and/or other cellular telephone network(s), if present. Finally, a packet data network is utilized between the satellite and satellite communications terminals for interactive data communications throughout the network.

In accordance with a further aspect of the disclosure, a distributed cellular network is provided for enabling calls between a third party, e.g., outside the network, and a cellular telephone subscriber at a selected remote location. The network comprises one or more global communications satellites positioned and adapted for receiving and relaying packet data communications encapsulating cellular telephone communications. Also provided is a first station located in a first remote geographic region. The first station includes a first base station having mobile wireless links to a plurality of subscribers of cellular telephone services in the first region, a first satellite communications terminal for communicating with the satellite from the first region, and a first user terminal. A second station is, in turn, located in a second remote geographic region, the second station including a second base station with mobile wireless links to a plurality of subscribers of cellular telephone services in the second region, a second satellite communications terminal for communicating with the satellite from the second region, and a second user terminal. In addition, a third station is located in a third remote geographic region. The third station comprises a third satellite communications terminal for communicating with the satellite from the third region, a base station controller with programming for controlling the first and second base stations, and a mobile switching center having a call processor for handling cellular telephone call switching between the first and second base stations. A land based telephone network, and/or wireline and/or other cellular telephone network (s), if present, is linked remotely and/or locally to the mobile switching center and has at least one telephone for enabling the third party to place a call to the subscriber. Finally, a packet data network is utilized between the satellite and satellite communications terminals for interactive data communications throughout the network.

In accordance with still another aspect of the disclosure, there is provided a distributed cellular network for enabling calls between a third party, e.g., outside the network, and a cellular telephone subscriber at a selected remote location. One or more global communications satellites are positioned and adapted for receiving and relaying packet data communications encapsulating cellular telephone communications. Also, a first station is located in a first remote geographic region. The first station includes a first base station having mobile wireless links to a plurality of subscribers of cellular telephone services in the first region, a first satellite communications terminal for communicating with the satellite from the first region, a first base station controller with programming for controlling the first base station, and a first user terminal. A second station located in a second remote geographic region includes a second base station having mobile wireless links to a plurality of subscribers of cellular telephone services in the second region. The second station also has a second satellite communications terminal for communicating with the satellite from the second region, a second base station controller with programming for controlling the second base station, and a second user terminal. A third station located in a third remote geographic region comprises a third satellite communications terminal for communicating with the satellite from the third region. In addition, a mobile switching center is provided having a call processor for handling cellular telephone call switching between the first and second base stations. A land based telephone network, and/or wireline and/or other cellular telephone network(s), if present, is linked remotely and/or locally to the mobile switching center and has at least one telephone for enabling the third party to place a call to the subscriber. Finally, a packet data network is utilized between the satellite and satellite communications terminals for interactive data communications throughout the network.

According to yet another aspect of the disclosure, a distributed cellular network is provided for enabling calls between a third party, e.g., outside the network, and a cellular telephone subscriber at a selected remote location. One or more global communications satellites are positioned and adapted for receiving and relaying packet data communications encapsulating cellular telephone communications. Also, a first station is located in a first remote geographic region. The first station includes a first base station having mobile wireless links to a plurality of subscribers of cellular telephone services in the first region, a first satellite communications terminal for communicating with the satellite from the first region, and a first user terminal. In addition, a second station is located in a second remote geographic region. The second station includes a second base station having mobile wireless links to a plurality of subscribers of cellular telephone services in the second region. Further included with the second base station is a second satellite communications terminal for communicating with the satellite from the second region, and a base station controller having programming for controlling the first and second base stations. The second station additionally has a second user terminal. Moreover, a third station is located in a third remote geographic region. The third station includes a third satellite communications terminal for communicating with the satellite from the third region. A mobile switching center is also provided having a call processor for handling cellular telephone call switching between the first and second base stations. A third party land based telephone network, and/or wireline and/or other cellular telephone network(s), if present, is linked remotely and/or locally to the mobile switching center and has at least one telephone for enabling the third party to place a call to the subscriber. Finally, a packet data network is utilized between the satellite and satellite communications terminals for interactive data communications throughout the network.

In accordance with yet a further aspect of the disclosure, a distributed cellular network is provided for enabling calls between a first cellular telephone subscriber at a first remote location and a second cellular telephone subscriber at a second remote location. The network includes one or more global communications satellites positioned and adapted for receiving and relaying packet data communications encapsulating cellular telephone communications. A first station is located in a first remote geographic region, the first station including a first base station having mobile wireless links to a plurality of subscribers of cellular telephone services in the first region, a first satellite communications terminal for communicating with the satellite from the first region, and a first user terminal. Also provided is a second station located in a second remote geographic region. The second station includes a second base station having mobile wireless links to a plurality of subscribers of cellular telephone services in the second region, a second satellite communications terminal for communicating with the satellite from the second region, and a second user terminal. In addition, a third station is located in a third remote geographic region. The third station includes a third satellite communications terminal for communicating with the satellite from the third region. It also utilizes a base station controller with programming for controlling the first and second base stations, and a mobile switching center having a call processor for handling cellular telephone call switching between the first and second base stations. Last, a packet data network is used between the satellite and satellite communications terminals for interactive data communications throughout the network.

According to yet a further aspect of the disclosure, a distributed cellular network is provided for enabling calls between a first cellular telephone subscriber at a first remote location and a second cellular telephone subscriber at a second remote location. One or more global communications satellites are positioned and adapted for receiving and relaying packet data communications encapsulating cellular telephone communications. Also, a first station is located in a first remote geographic region, the first station including a first base station having mobile wireless links to a plurality of subscribers of cellular telephone services in the first region, a first satellite communications terminal for communicating with the satellite from the first region, a first base station controller with programming for controlling the first base station, and a first user terminal. A second station is, in turn, located in a second remote geographic region. The second station includes a second base station having mobile wireless links to a plurality of subscribers of cellular telephone services in the second region, a second satellite communications terminal for communicating with the satellite from the second region, a base station controller with programming for controlling the second base station, and a second user terminal. Furthermore, a third station located in a third remote geographic region includes a third satellite communications terminal for communicating with the satellite from the third region, and a mobile switching center having a call processor for handling cellular telephone call switching between the first and second base stations. Finally, a packet data network between the satellite and satellite communications terminals provides interactive data communications throughout the network.

In accordance with another aspect of the disclosure, a distributed cellular network is provided for enabling calls between a first cellular telephone subscriber at a first remote location and a second cellular telephone subscriber at the first remote location. One or more global communications satellites are positioned and adapted for receiving and relaying packet data communications encapsulating cellular telephone communications. A first station is located in a first remote geographic region, and includes a first base station having mobile wireless links to a plurality of subscribers of cellular telephone services in the first region, a first satellite communications terminal for communicating with the satellite from the first region, a first base station controller with programming for controlling the first base station, and a first user terminal. Similarly, a second station is located in a second remote geographic region. The second station comprises a second satellite communications terminal for communicating with the satellite from the second region, and a mobile switching center having a call processor for handling cellular telephone call switching between the first and second base stations. Finally, a packet data network is used between the satellite and satellite communications terminals for interactive data communications throughout the network.

According to yet another aspect of the disclosure is a method of providing distributed cellular telephone services to a plurality of cellular telephone subscribers at selected remote geographic regions. Initially, one or more global communications satellites are positioned at one or more selected locations for receiving and relaying packet data communications encapsulating cellular telephone communications to at least one of the remote geographic regions. One or more base stations are then located in each of the remote geographic regions, each base station having mobile wireless links to the plurality of subscribers of cellular telephone services. Next, a satellite communications terminal is provided in each of the remote geographic regions, each satellite terminal being associated with one or more of the base stations, for communicating with the satellite from the corresponding region. A user terminal is, in turn, located in each of the remote geographic regions, each user terminal being associated with the base station(s) in the region. A base station controller is provided remotely from the base stations, the base station controller having programming for controlling each of the base stations. Thereafter, a mobile switching center is positioned in proximity to the base station controller. The switching center has a call processor for handling cellular telephone call switching between the base stations. Last, a packet data network is provided between the satellite and satellite communications terminals for interactive data communications throughout the network.

In accordance with still a further aspect of the disclosure is a method of providing distributed cellular telephone services to a plurality of cellular telephone subscribers at selected remote geographic regions. Initially, one or more global communications satellites are positioned at one or more selected locations for receiving and relaying packet data communications encapsulating cellular telephone communications to at least one of the remote geographic regions. One or more base stations are then located in each of the remote geographic regions, each base station having mobile wireless links to the plurality of subscribers of cellular telephone services. Next, a satellite communications terminal is provided in each of the remote geographic regions, each satellite terminal being associated with one or more of the base stations, for communicating with the satellite from the corresponding region. A user terminal is also located in each of the remote geographic regions, each user terminal being associated with the base station(s) in the region. A base station controller is, in turn, provided remotely from at least one of the base stations. The base station controller has programming for controlling each of the base stations. Thereafter, a mobile switching center is positioned remotely from the base stations and the base station controller, the switching center having a call processor for handling cellular telephone call switching between the base stations. Finally, a packet data network is provided between the satellite and satellite communications terminals for interactive data communications throughout the network.

In accordance with still another aspect of the disclosure is a method of providing distributed cellular telephone services to a plurality of cellular telephone subscribers at selected remote geographic regions. The method comprises the steps of (i) positioning one or more global communications satellites at one or more selected locations for receiving and relaying packet data communications encapsulating cellular telephone communications to at least one of the remote geographic regions; (ii) locating a first station in a first remote geographic region, the first station including a first base station having mobile wireless links to a plurality of subscribers of cellular telephone services in the first region, a first satellite communications terminal for communicating with the satellite from the first region, and a first user terminal; (iii) locating a second station in a second remote geographic region, the second station including a second base station having mobile wireless links to a plurality of subscribers of cellular telephone services in the second region, a second satellite communications terminal for communicating with the satellite from the second region, and a second user terminal; (iv) providing a third station in a third remote geographic region, the third station including a third satellite communications terminal for communicating with the satellite from the third region, a base station controller with programming for controlling the first and second base stations, and a mobile switching center having a call processor for handling cellular telephone call switching between the first and second base stations; (v) linking a land based telephone network, and/or wireline and/or other cellular telephone network(s), if present, remotely and/or locally to the mobile switching center, the network having at least one telephone for enabling the third party to place a call to the subscriber; and (vi) providing a packet data network between the satellite and satellite communications terminals for interactive data communications throughout the cellular network.

According to another aspect of the disclosure is a method of providing distributed cellular telephone services to a plurality of cellular telephone subscribers at selected remote geographic regions. First, one or more global communications satellites are positioned at one or more selected locations for receiving and relaying packet data communications encapsulating cellular telephone communications to at least one of the remote geographic regions. A first station is then located in a first remote geographic region, the first station including a first base station having mobile wireless links to a plurality of subscribers of cellular telephone services in the first region, a first satellite communications terminal for communicating with the satellite from the first region, a first base station controller with programming for controlling the first base station, and a first user terminal. Next, a second station is located in a second remote geographic region, the second station including a second base station having mobile wireless links to a plurality of subscribers of cellular telephone services in the second region, a second satellite communications terminal for communicating with the satellite from the second region, a second base station controller with programming for controlling the second base station, and a second user terminal. A third station is provided in a third remote geographic region, the third station including a third satellite communications terminal for communicating with the satellite from the third region, and a mobile switching center having a call processor for handling cellular telephone call switching between the first and second base stations. Thereafter, a land based telephone network, and/or wireline or other cellular telephone network(s), if present, is linked remotely and/or locally to the mobile switching center, the network having at least one telephone for enabling the third party to place a call to the subscriber. Last, a packet data network is provided between the satellite and satellite communications terminals for interactive data communications throughout the cellular network.

According to still a further aspect of the disclosure is a method of providing distributed cellular telephone services to a plurality of cellular telephone subscribers at selected remote geographic regions. Initially, one or more global communications satellites are positioned at one or more selected locations for receiving and relaying packet data communications encapsulating cellular telephone communications to at least one of the remote geographic regions. A first station is located in a first remote geographic region, the first station including a first base station having mobile wireless links to a plurality of subscribers of cellular telephone services in the first region, a first satellite communications terminal for communicating with the satellite from the first region, and a first user terminal. Next, a second station is located in a second remote geographic region. The second station includes a second base station having mobile wireless links to a plurality of subscribers of cellular telephone services in the second region, a second satellite communications terminal for communicating with the satellite from the second region, a base station controller with programming for controlling the first and second base stations, and a second user terminal. A third station is then provided in a third remote geographic region. The third station includes a third satellite communications terminal for communicating with the satellite from the third region, and a mobile switching center having a call processor for handling cellular telephone call switching between the first and second base stations. A land based telephone network, and/or wireline or other cellular telephone network(s), if present, is linked remotely and/or locally to the mobile switching center. The network has at least one telephone for enabling the third party to place a call to the subscriber. Finally, a packet data network is provided between the satellite and satellite communications terminals for interactive data communications throughout the cellular network.

According to another aspect of the disclosure is a method of providing distributed cellular telephone services to a plurality of cellular telephone subscribers between selected remote geographic regions. The method comprises the steps of: (i) positioning one or more global communications satellites at one or more selected locations for receiving and relaying packet data communications encapsulating cellular telephone communications to at least one of the remote geographic regions; (ii) locating a first station in a first remote geographic region, the first station including a first base station having mobile wireless links to a plurality of subscribers of cellular telephone services in the first region, a first satellite communications terminal for communicating with the satellite from the first region, and a first user terminal; (iii) locating a second station in a second remote geographic region, the second station including a second base station having mobile wireless links to a plurality of subscribers of cellular telephone services in the second region, a second satellite communications terminal for communicating with the satellite from the second region, and a second user terminal; (iv) providing a third station in a third remote geographic region, the third station including a third satellite communications terminal for communicating with the satellite from the third region, a base station controller with programming for controlling the first and second base stations, and a mobile switching center having a call processor for handling cellular telephone call switching between the first and second base stations; and (v) providing a packet data network between the satellite and satellite communications terminals for interactive data communications throughout the cellular network.

In accordance with a further aspect of the disclosure is a method of providing distributed cellular telephone services to a plurality of cellular telephone subscribers between selected remote geographic regions. First, one or more global communications satellites are positioned at one or more selected locations for receiving and relaying packet data communications encapsulating cellular telephone communications to at least one of the remote geographic regions. A first station is located in a first remote geographic region, the first station including a first base station having mobile wireless links to a plurality of subscribers of cellular telephone services in the first region, a first satellite communications terminal for communicating with the satellite from the first region, a first base station controller with programming for controlling the first base station, and a first user terminal. Next, a second station is located in a second remote geographic region. The second station includes a second base station having mobile wireless links to a plurality of subscribers of cellular telephone services in the second region, a second satellite communications terminal for communicating with the satellite from the second region, a second base station controller with programming for controlling the second base station, and a second user terminal. A third station is, in turn, provided in a third remote geographic region. The third station includes a third satellite communications terminal for communicating with the satellite from the third region, and a mobile switching center having a call processor for handling cellular telephone call switching between the first and second base stations. Last, a packet data network is provided between the satellite and satellite communications terminals for interactive data communications throughout the cellular network.

Still another aspect of the disclosure is a method of providing distributed cellular telephone services to a plurality of cellular telephone subscribers between selected remote geographic regions. Initially, one or more global communications satellites are positioned at one or more selected locations for receiving and relaying packet data communications encapsulating cellular telephone communications to at least one of the remote geographic regions. A first station is then located in a first remote geographic region, the first station including a first base station having mobile wireless links to a plurality of subscribers of cellular telephone services in the first region, a first satellite communications terminal for communicating with the satellite from the first region, and a first user terminal. Next, a second station is located in a second remote geographic region. The second station includes a second base station having mobile wireless links to a plurality of subscribers of cellular telephone services in the second region, a second satellite communications terminal for communicating with the satellite from the second region, a second base station controller with programming for controlling the first and second base station, and a second user terminal. Thereafter, a third station is provided in a third remote geographic region. The third station includes a third satellite communications terminal for communicating with the satellite from the third region, and a mobile switching center having a call processor for handling cellular telephone call switching between the first and second base stations. Finally, a packet data network between the satellite and satellite communications terminals for interactive data communications throughout the cellular network.

In accordance with another aspect of the disclosure is a distributed cellular network for enabling calls between a third party, e.g., outside the network, and a cellular telephone subscriber at a selected remote location. The network has one or more global communications satellites positioned and adapted for receiving and relaying packet data communications encapsulating cellular telephone communications. Also provided is a first station located in a first remote geographic region, the first station including a first base station having mobile wireless links to a plurality of subscribers of cellular telephone services in the first region, a first satellite communications terminal for communicating with the satellite from the first region, and a first user terminal. A second station located in a second remote geographic region, the second station including a second base station having mobile wireless links to a plurality of subscribers of cellular telephone services in the second region, a second satellite communications terminal for communicating with the satellite from the second region, and a second user terminal. Similarly, a third station is located in a third remote geographic region. The third station includes a third satellite communications terminal for communicating with the satellite from the third region, a plurality of base station controllers with programming for controlling the first and second base stations, and a single mobile switching center having a call processor for handling cellular telephone call switching between the first and second base stations. Further provided is a land based telephone network, and/or wireline and/or other cellular telephone network(s), linked remotely and/or locally to the mobile switching center and having at least one telephone for enabling the third party to place a call to the subscriber. Finally, a packet data network between the satellite and satellite communications terminals facilitates interactive data communications throughout the cellular network.

A further aspect of the disclosure is directed to a distributed cellular network for enabling calls between a third party, e.g., outside the network, and a cellular telephone subscriber at a selected remote location. The network comprises one or more global communications satellites positioned and adapted for receiving and relaying packet data communications encapsulating cellular telephone communications. A first station is located in a first remote geographic region, the first station including a first base station having mobile wireless links to a plurality of subscribers of cellular telephone services in the first region, a first satellite communications terminal for communicating with the satellite from the first region, one or more first base station controllers with programming for controlling the first base station, and a first user terminal. A second station is similarly located in a second remote geographic region. The second station has a second base station with mobile wireless links to a plurality of subscribers of cellular telephone services in the second region, a second satellite communications terminal for communicating with the satellite from the second region, one or more second base station controllers with programming for controlling the second base station, and a second user terminal. Also provided is a third station located in a third remote geographic region, the third station including a third satellite communications terminal for communicating with the satellite from the third region, and a single mobile switching center having a call processor for handling cellular telephone call switching between the first and second base stations. A land based telephone network, and/or wireline and/or other cellular telephone network(s), is linked remotely and/or locally to the mobile switching center and has at least one telephone for enabling the third party to place a call to the subscriber. Moreover, a packet data network between the satellite and satellite communications terminals facilitates interactive data communications throughout the cellular network.

According to still another aspect of the disclosure is a distributed cellular network for enabling calls between a third party, e.g., outside the network, and a cellular telephone subscriber at a selected remote location. One or more global communications satellites are positioned and adapted for receiving and relaying packet data communications encapsulating cellular telephone communications. A first station is located in a first remote geographic region. The first station includes a first base station having mobile wireless links to a plurality of subscribers of cellular telephone services in the first region, a first satellite communications terminal for communicating with the satellite from the first region, and a first user terminal. Likewise, a second station is located in a second remote geographic region. The second station comprises a second base station having mobile wireless links to a plurality of subscribers of cellular telephone services in the second region, a second satellite communications terminal for communicating with the satellite from the second region, one or more second base station controllers with programming for controlling the first and second base stations, and a second user terminal. Additionally, a third station is located in a third remote geographic region, the third station including a third satellite communications terminal for communicating with the satellite from the third region, and a single mobile switching center having a call processor for handling cellular telephone call switching between the first and second base stations. A third party, cellular or land based, telephone network is linked remotely and/or locally to the mobile switching center and has at least one telephone for enabling the third party to place a call to the subscriber. A packet data network is provided between the satellite and satellite communications terminals for interactive data communications throughout the cellular network.

Yet another aspect of the disclosure concerns a distributed cellular network for enabling calls between a first cellular telephone subscriber at a first remote location and a second cellular telephone subscriber at a second remote location. The network comprises: (i) one or more global communications satellites positioned and adapted for receiving and relaying packet data communications encapsulating cellular telephone communications; (ii) a first station located in a first remote geographic region, the first station including a first base station having mobile wireless links to a plurality of subscribers of cellular telephone services in the first region, a first satellite communications terminal for communicating with the satellite from the first region, and a first user terminal; (iii) a second station located in a second remote geographic region, the second station including a second base station having mobile wireless links to a plurality of subscribers of cellular telephone services in the second region, a second satellite communications terminal for communicating with the satellite from the second region, and a second user terminal; (iv) a third station located in a third remote geographic region, the third station including a third satellite communications terminal for communicating with the satellite from the third region, a plurality of base station controllers with programming for controlling the first and second base stations, and a single mobile switching center having a call processor for handling cellular telephone call switching between the first and second base stations; and (v) a packet data network between the satellite and satellite communications terminals for interactive data communications throughout the cellular network.

In accordance with still a further aspect of the disclosure is a distributed cellular network for enabling calls between a first cellular telephone subscriber at a first remote location and a second, wireline telephone subscriber at a second remote location. One or more global communications satellites are positioned and adapted for receiving and relaying packet data communications encapsulating cellular telephone communications. A first station located in a first remote geographic region includes a first base station having mobile wireless links to a plurality of subscribers of cellular telephone services in the first region, a first satellite communications terminal for communicating with the satellite from the first region, one or more first base station controllers with programming for controlling the first base station, and a first user terminal. A second station located in a second remote geographic region comprises a second base station having non-mobile wireline links to a plurality of subscribers of wireline telephone services in the second region, a second satellite communications terminal for communicating with the satellite from the second region, one or more second base station controllers with programming for controlling the second base station, and a second user terminal. In addition, a third station is located in a third remote geographic region. The third station has a third satellite communications terminal for communicating with the satellite from the third region, and a single mobile switching center with a call processor for handling cellular telephone call switching between the first and second base stations. A packet data network between the satellite and satellite communications terminals facilitates interactive data communications throughout the cellular network.

According to yet a further aspect of the disclosure, a distributed cellular network is provided for enabling calls between a first cellular telephone subscriber at a first remote location and a second cellular telephone subscriber at the first remote location. One or more global communications satellites are positioned and adapted for receiving and relaying packet data communications encapsulating cellular telephone communications. A first station located in a first remote geographic region includes a first base station having mobile wireless links to a plurality of subscribers of cellular telephone services in the first region, a first satellite communications terminal for communicating with the satellite from the first region, a base station controller with programming for controlling the first base station, and a first user terminal. Similarly, a second station located in a second remote geographic region includes a second satellite communications terminal for communicating with the satellite from the second region, and a single mobile switching center having a call processor for handling cellular telephone call switching between the first and second base stations. A packet data network between the satellite and satellite communications terminals, in turn, facilitates interactive data communications throughout the cellular network.

In accordance with yet another aspect of the disclosure is a distributed digital communications network for interactive communications, e.g., for cellular, wireless Internet access, digital television, and/or like multimedia services. The network comprises one or more global communications satellites positioned and adapted for receiving and relaying packet data communications encapsulating the interactive communications. A plurality of base stations is provided, each being located in a selected remote geographic region and having mobile wireless links to a plurality of subscribers of communications services. Also provided is a plurality of satellite communications terminals, each being located in the selected remote geographic region and associated with one or more of the base stations, for communicating with the satellite(s) from the region. The network additionally has a plurality of user terminals, each being located in the selected remote geographic region and associated with the base station(s) in the region. A base station controller is located remotely from, or locally with, the base stations and has programming for controlling the plurality of base stations. Furthermore, a mobile switching center is located remotely from, or locally with, the base station controller and the base stations and has a digital communications signal processor for handling digital signal switching between the plurality of base stations, wireline and/or other communications networks. Finally, a packet data network between the satellite and satellite communications terminals facilitates interactive data communications throughout the distributed network.

According to yet a further aspect of the disclosure there is provided a distributed digital communications network for interactive communications, e.g., cellular, wireless Internet access, digital television, and/or like multimedia services. One or more global communications satellites are positioned and adapted for receiving and relaying packet data communications encapsulating the interactive communications. A plurality of base stations is provided, each being located in a selected remote geographic region and having mobile wireless links to a plurality of subscribers of interactive digital communications services. Also provided is a plurality of satellite communications terminals, each being located in the selected remote geographic region and associated with one or more of the base stations, for communicating with the satellite from the region. In addition, each of a plurality of user terminals is located in the selected remote geographic region and associated with the base station(s) in the region. A base station controller is also located remotely from, or locally with, the base stations and has programming for controlling the plurality of base stations. A mobile switching center is positioned in proximity to the base station controller and has a digital communications signal processor for handling digital signal switching between the plurality of base stations, wireline, and/or wireless communications networks. Last, a packet data network between the satellite and satellite communications terminals facilitates interactive data communications throughout the network.

In accordance with a further aspect of the disclosure is a distributed digital communications network for enabling interactive communications, e.g., cellular, wireless Internet access, digital television, and/or like multimedia services, between a third party outside the network having first interactive digital communications services, and a subscriber to first or second interactive digital communications services at a selected remote location. The network comprises one or more global communications satellites positioned and adapted for receiving and relaying packet data communications encapsulating the interactive communications. A first station is located in a first remote geographic region, the first station including a first base station having mobile wireless links to a plurality of subscribers to first interactive digital communications services in the first region, a first satellite communications terminal for communicating with the satellite from the first region, and a first user terminal. A second station is located in a second remote geographic region, the second station including a second base station having mobile wireless links to a plurality of subscribers to first or second interactive digital communications services in the second region, a second satellite communications terminal for communicating with the satellite from the second region, and a second user terminal. In addition, a third station is located in a third remote geographic region, the third station including a third satellite communications terminal for communicating with the satellite from the third region, a base station controller with programming for controlling the first and second base stations, and a mobile switching center having a digital communications signal processor for handling digital signal switching between the first and second base stations. A land based, wireline communications network and/or one or more selected wireless communications network(s) is/are linked remotely and/or locally to the mobile switching center. The network(s) have at least one device for enabling the third party to transmit a communications signal to the subscriber. Finally, a packet data network is positioned between the satellite and satellite communications terminals for interactive data communications throughout the distributed network.

According to still a further aspect of the disclosure is a distributed digital communications network for enabling interactive communications, e.g., cellular, wireless Internet access, digital television, and/or like multimedia services, between a third party outside the network having first interactive digital communications services, and a subscriber to second interactive digital communications services at a selected remote location. One or more global communications satellites are positioned and adapted for receiving and relaying packet data communications encapsulating the interactive communications. A first station is located in a first remote geographic region, the first station including a first base station having mobile wireless links to a plurality of subscribers to first or second interactive digital communications services in the first region, a first satellite communications terminal for communicating with the satellite from the first region, a first base station controller with programming for controlling the first base station, and a first user terminal. A second station is located in a second remote geographic region, the second station including a second base station having mobile wireless links to a plurality of subscribers to second interactive digital communications services in the second region, a second satellite communications terminal for communicating with the satellite from the second region, a second base station controller with programming for controlling the second base station, and a second user terminal. In addition, a third station is located in a third remote geographic region, the third station including a third satellite communications terminal for communicating with the satellite from the third region, and a mobile switching center having a digital communications signal processor for handling digital signal switching between the first and second base stations. Also provided is a land based communications network, and/or wireline and/or one or more selected wireless communications network(s) linked remotely and/or locally to the mobile switching center. The network has at least one device for enabling the third party to transmit a communications signal to the subscriber. Last, a packet data network is positioned between the satellite and satellite communications terminals for interactive data communications throughout the distributed network.

In accordance with another aspect of the disclosure is a distributed digital communications network for enabling interactive communications, e.g., cellular, wireless Internet access, digital television, and/or like multimedia services, between a third party outside the network having first interactive digital communications services, and a subscriber to second interactive digital communications services at a selected remote location. The network includes one or more global communications satellites positioned and adapted for receiving and relaying packet data communications encapsulating the interactive communications. A first station is located in a first remote geographic region, the first station including a first base station having mobile wireless links to a plurality of subscribers to first interactive digital communications services in the first region, a first satellite communications terminal for communicating with the satellite from the first region, and a first user terminal. A second station is located in a second remote geographic region, the second station including a second base station having mobile wireless links to a plurality of subscribers to second interactive digital communications services in the second region, a second satellite communications terminal for communicating with the satellite from the second region, a base station controller with programming for controlling the first and second base stations, and a second user terminal. In addition, a third station is located in a third remote geographic region, the third station including a third satellite communications terminal for communicating with the satellite from the third region, and a mobile switching center having a digital communications signal processor for handling digital signal switching between the first and second base stations. Also provided is a third party, wireless and/or wireline-based, interactive communications network linked remotely and/or locally to the mobile switching center. The network has at least one device for enabling the third party to transmit a communications signal to the subscriber. Last, a packet data network is positioned between the satellite and satellite communications terminals for interactive data communications throughout the distributed network.

According to yet another aspect of the disclosure is a distributed digital communications network for enabling interactive communications, e.g., cellular, wireless Internet access, digital television, and/or like multimedia services, between a first interactive digital communications services subscriber at a first remote location and a second interactive digital communications services subscriber at a second remote location. One or more global communications satellites are positioned and adapted for receiving and relaying packet data communications encapsulating the interactive communications. A first station is located in a first remote geographic region, the first station including a first base station having mobile wireless links to a plurality of subscribers to first interactive digital communications services in the first region, a first satellite communications terminal for communicating with the satellite from the first region, and a first user terminal. A second station is located in a second remote geographic region, the second station including a second base station having mobile wireless links to a plurality to subscribers of second interactive digital communications services in the second region, a second satellite communications terminal for communicating with the satellite from the second region, and a second user terminal. Additionally, a third station is located in a third remote geographic region, the third station including a third satellite communications terminal for communicating with the satellite from the third region, a base station controller with programming for controlling the first and second base stations, and a mobile switching center having a digital communications signal processor for handling digital signal switching between the first and second base station. Finally, a packet data network between the satellite and satellite communications terminals facilitates interactive data communications throughout the distributed network.

Still another aspect of the disclosure relates to a distributed digital communications network for enabling interactive communications, e.g., cellular, wireless Internet access, digital television, and/or like multimedia services, between a first interactive digital communications services subscriber at a first remote location and a second interactive digital communications services subscriber at a second remote location, which comprises one or more global communications satellites positioned and adapted for receiving and relaying packet data communications encapsulating the interactive communications. A first station is located in a first remote geographic region, the first station including a first base station having mobile wireless links to a plurality of subscribers to first interactive digital communications services in the first region, a first satellite communications terminal for communicating with the satellite from the first region, a first base station controller with programming for controlling the first base station, and a first user terminal. A second station is located in a second remote geographic region, the second station including a second base station having mobile wireless links to a plurality of subscribers to second interactive digital communications services in the second region, a second satellite communications terminal for communicating with the satellite from the second region, a second base station controller with programming for controlling the second base station, and a second user terminal. Also provided is a third station located in a third remote geographic region, the third station including a third satellite communications terminal for communicating with the satellite from the third region, and a mobile switching center having a digital communications signal processor for handling digital signal switching between the first and second base stations. Last, a packet data network is provided between the satellite and satellite communications terminals for interactive data communications throughout the distributed network.

Yet another aspect of the disclosure relates to a distributed digital communications network for enabling interactive communications, e.g., cellular, wireless Internet access, digital television, and/or like multimedia services, between a first digital communications services subscriber at a first remote location and a second digital communications services subscriber at the first remote location. The network includes one or more global communications satellites positioned and adapted for receiving and relaying packet data communications encapsulating the interactive communications. A first station is located in a first remote geographic region, the first station including a first base station having mobile wireless links to a plurality of subscribers to the first and second digital communications services in the region, a first satellite communications terminal for communicating with the satellite from the first region, a first base station controller with programming for controlling the first base station, and a first user terminal. A second station is located in a second remote geographic region, the second station including a second satellite communications terminal for communicating with the satellite from the second region, and a mobile switching center having a digital communications signal processor for handling digital signal switching between the first and second base stations. Last, a packet data network is located between the satellite and satellite communications terminals for interactive data communications throughout the distributed network.

According to still a further aspect of the disclosure is a method of providing distributed interactive digital communications services, e.g., cellular, wireless Internet access, digital television, and/or like multimedia services, to a plurality of subscribers at selected remote geographic regions. The method comprises the steps of: (i) positioning one or more global communications satellites at one or more selected locations for receiving and relaying packet data communications encapsulating the interactive communications services to at least one of the remote geographic regions; (ii) locating one or more base stations in each of the remote geographic regions, each base station having mobile wireless links to the plurality of subscribers to the communications services; (iii) providing a satellite communications terminal in each of the remote geographic regions, each satellite terminal being associated with one or more of the base stations, for communicating with the satellite from the corresponding region; (iv) locating a user terminal in each of the remote geographic regions, each user terminal being associated with the base station(s) in the region; (v) providing a base station controller remotely from the base stations, the base station controller having programming for controlling each of the base stations; (vi) positioning a mobile switching center in proximity to the base station controller, the switching center having a digital communications signal processor for handling digital signal switching between the base stations; and (vii) providing a packet data network between the satellite and satellite communications terminals for interactive data communications throughout the network.

In accordance with yet another aspect of the disclosure is a method of providing distributed interactive digital communications services, e.g., cellular, wireless Internet access, digital television, and/or like multimedia services, to a plurality of subscribers at selected remote geographic regions. Initially, one or more global communications satellites are positioned at one or more selected locations for receiving and relaying packet data communications encapsulating the interactive communications services to at least one of the remote geographic regions. One or more base stations are then located in each of the remote geographic regions. Each base station has mobile wireless links to the plurality of subscribers to the communications services. Next, a satellite communications terminal is located in each of the remote geographic regions, each satellite terminal being associated with one or more of the base stations, for communicating with the satellite from the corresponding region. Similarly, a user terminal is located in each of the remote geographic regions. Each user terminal is associated with the base station(s) in the region. Thereafter, a base station controller is provided remotely from at least one of the base stations, the base station controller having programming for controlling each of the base stations. A mobile switching center is positioned remotely from the base stations and the base station controller. The switching center has a digital communications signal processor for handling digital signal switching between the base stations. Finally, a packet data network is provided between the satellite and satellite communications terminals for interactive data communications throughout the network.

According to another aspect of the disclosure is a method of providing distributed interactive digital communications services, e.g., cellular, wireless Internet access, digital television, and/or like multimedia services, to a plurality of subscribers at selected remote geographic regions. First, one or more global communications satellites are positioned at one or more selected locations for receiving and relaying packet data communications encapsulating the communications services to at least one of the remote geographic regions. A first station is located in a first remote geographic region, the first station including a first base station having mobile wireless links to a plurality of subscribers to the communications services in the first region, a first satellite communications terminal for communicating with the satellite from the first region, and a first user terminal. A second station is then located in a second remote geographic region. The second station includes a second base station having mobile wireless links to a plurality of subscribers to the communications services in the second region, a second satellite communications terminal for communicating with the satellite from the second region, and a second user terminal. Next, a third station is provided in a third remote geographic region, the third station including a third satellite communications terminal for communicating with the satellite from the third region, a base station controller with programming for controlling the first and second base stations, and a mobile switching center having a digital communications signal processor for handling digital signal switching between the first and second base stations. Thereafter, a land based communications network, and/or wireline and/or other selected wireless communications network(s), is linked remotely and/or locally to the mobile switching center. The network has at least one device for enabling the third party to transmit a communications signal to the subscriber. Last, a packet data network is provided between the satellite and satellite communications terminals for interactive data communications throughout the distributed network.

Yet a further aspect of the disclosure is directed to a method of providing distributed interactive digital communications services, e.g., cellular, wireless Internet access, digital television, and/or like multimedia services, to a plurality of subscribers at selected remote geographic regions. Initially, one or more global communications satellites are positioned at one or more selected locations for receiving and relaying packet data communications encapsulating the communications services to at least one of the remote geographic regions. A first station is then located in a first remote geographic region, the first station including a first base station having mobile wireless links to a plurality of subscribers to the communications services in the first region, a first satellite communications terminal for communicating with the satellite from the first region, a first base station controller with programming for controlling the first base station, and a first user terminal. Next, a second station is located in a second remote geographic region, the second station including a second base station having mobile wireless links to a plurality of subscribers to the communications services in the second region, a second satellite communications terminal for communicating with the satellite from the second region, a second base station controller with programming for controlling the second base station, and a second user terminal. A third station is, in turn, provided in a third remote geographic region, the third station including a third satellite communications terminal for communicating with the satellite from the third region, and a mobile switching center having a digital communications signal processor for handling digital signal switching between the first and second base stations. Thereafter, a land based communications network, and/or wireline and/or other selected wireless communications network(s), is linked remotely and/or locally to the mobile switching center, the network having at least one device for enabling the third party to transmit a communications signal to the subscriber. Finally, a packet data network is provided between the satellite and satellite communications terminals for interactive data communications throughout the distributed network.

In accordance with an additional aspect of the disclosure is a method of providing distributed interactive digital communications services, e.g., cellular, wireless Internet access, digital television, and/or like multimedia services, to a plurality of subscribers at selected remote geographic regions. First, one or more global communications satellites are positioned at one or more selected locations for receiving and relaying packet data communications encapsulating the communications services to at least one of the remote geographic regions. A first station is then located in a first remote geographic region, the first station including a first base station having mobile wireless links to a plurality of subscribers to the communications services in the first region, a first satellite communications terminal for communicating with the satellite from the first region, and a first user terminal. Similarly, a second station is located in a second remote geographic region, the second station including a second base station having mobile wireless links to a plurality of subscribers to the communications services in the second region, a second satellite communications terminal for communicating with the satellite from the second region, a base station controller with programming for controlling the first and second base stations, and a second user terminal. A third station is then located in a third remote geographic region, the third station including a third satellite communications terminal for communicating with the satellite from the region, and a mobile switching center having a digital communications signal processor for handling digital signal switching between the first and second base stations. Next, a land based communications network, and/or wireline and/or other selected wireless communications network(s), is linked remotely and/or locally to the mobile switching center, the network having at least one device for enabling the third party to transmit a communications signal to the subscriber. Last, a packet data network is located between the satellite and satellite communications terminals for interactive data communications throughout the distributed network.

In accordance with still another aspect of the disclosure is a method of providing distributed interactive digital communications services, e.g., cellular, wireless Internet access, digital television, and/or like multimedia services, to a plurality of subscribers between selected remote geographic regions. Initially, one or more global communications satellites are positioned at one or more selected locations for receiving and relaying packet data communications encapsulating the communications services to at least one of the remote geographic regions. A first station is then located in a first remote geographic region, the first station including a first base station having mobile wireless links to a plurality of subscribers to the communications services in the first region, a first satellite communications terminal for communicating with the satellite from the first region, and a first user terminal. Next, a second station is located in a second remote geographic region, the second station including a second base station having mobile wireless links to a plurality of subscribers to the communications services in the second region, a second satellite communications terminal for communicating with the satellite from the second region, and a second user terminal. In turn, a third station is located in a third remote geographic region, the third station including a third satellite communications terminal for communicating with the satellite from the region, a base station controller with programming for controlling the first and second base stations, and a mobile switching center having a digital communications signal processor for handling digital signal switching between the first and second base stations. Finally, a packet data network is provided between the satellite and satellite communications terminals for interactive data communications throughout the distributed network.

According to a further aspect of the disclosure is a method of providing distributed interactive digital communications services, e.g., cellular, wireless Internet access, digital television, and/or like multimedia services, to a plurality of subscribers between selected remote geographic regions. First, one or more global communications satellites are positioned at one or more selected locations for receiving and relaying packet data communications encapsulating the communications services to at least one of the remote geographic regions. A first station is located in a first remote geographic region, the first station including a first base station having mobile wireless links to a plurality of subscribers to the communications services in the first region, a first satellite communications terminal for communicating with the satellite from the first region, a first base station controller with programming for controlling the first base station, and a first user terminal. Next, a second station is located in a second remote geographic region, the second station including a second base station having mobile wireless links to a plurality of subscribers to the communications services in the second region, a second satellite communications terminal for communicating with the satellite from the second region, a second base station controller with programming for controlling the second base station, and a second user terminal. A third station is then located in a third remote geographic region, the third station including a third satellite communications terminal for communicating with the satellite from the region, and a mobile switching center having a digital communications signal processor for handling digital signal switching between the first and second base stations. Finally, a packet data network is provided between the satellite and satellite communications terminals for interactive data communications throughout the distributed network.

In accordance with yet another aspect of the disclosure is a method of providing distributed interactive digital communications services, e.g., cellular, wireless Internet access, digital television, and/or like multimedia services, to a plurality of subscribers between selected remote geographic regions. First, one or more global communications satellites are positioned at one or more selected locations for receiving and relaying packet data communications encapsulating the communications services to at least one of the remote geographic regions. Second, a first station is located in a first remote geographic region, the first station including a first base station having mobile wireless links to a plurality of subscribers to the communications services in the first region, a first satellite communications terminal for communicating with the satellite from the first region, and a first user terminal. Third, a second station is located in a second remote geographic region, the second station including a second base station having mobile wireless links to a plurality of subscribers to the communications services in the second region, a second satellite communications terminal for communicating with the satellite from the second region, a base station controller with programming for controlling the first and second base stations, and a second user terminal. Next, a third station is located in a third remote geographic region, the third station including a third satellite communications terminal for communicating with the satellite from the third region, and a mobile switching center having a digital communications signal processor for handling digital signal switching between the first and second base stations. Last, a packet data network is positioned between the satellite and satellite communications terminals for interactive data communications throughout the distributed network.

Still another aspect of the disclosure is directed to a distributed interactive digital communications network for enabling interactive transmission of one or more communications signal(s), e.g., cellular, wireless Internet access, digital television, and/or like multimedia services, between a third party outside the network and a communications services subscriber at a selected remote location. One or more global communications satellites are positioned and adapted for receiving and relaying packet data communications encapsulating the interactive transmission. A first station is located in a first remote geographic region, the first station including a first base station having mobile wireless links to a plurality of subscribers to communications services in the first region including those for interactive transmission, a first satellite communications terminal for communicating with the satellite from the first region, and a first user terminal. Also, a second station is located in a second remote geographic region, the second station including a second base station having mobile wireless links to a plurality of subscribers to communications services in the second region including those for interactive transmission, a second satellite communications terminal for communicating with the satellite from the second region, and a second user terminal. In addition, a third station is located in a third remote geographic region, the third station including a third satellite communications terminal for communicating with the satellite from the third region, a plurality of base station controllers with programming for controlling the first and second base stations, and a single mobile switching center having a digital communications signal processor for handling digital signal switching between the first and second base stations. A land based communications network, and/or wireline and/or other wireless communications network(s), is linked remotely and/or locally to the mobile switching center and has at least one device for enabling the third party to transmit a communications signal to the subscriber. Finally, a packet data network between the satellite and satellite communications terminals facilitates interactive data communications throughout the distributed network.

Yet another aspect of the disclosure relates to a distributed interactive digital communications network for enabling interactive transmission of one or more communications signal(s), e.g., cellular, wireless Internet access, digital television, and/or like multimedia services, between a third party outside the network and a communications services subscriber at a selected remote location. One or more global communications satellites are positioned and adapted for receiving and relaying packet data communications encapsulating the interactive transmission. A first station is located in a first remote geographic region, the first station including a first base station having mobile wireless links to a plurality of subscribers to communications services in the first region which include those for interactive transmission, a first satellite communications terminal for communicating with the satellite from the first region, one or more first base station controllers with programming for controlling the first base station, and a first user terminal. A second station is, in turn, located in a second remote geographic region, the second station including a second base station having mobile wireless links to a plurality of subscribers to the communications services in the second region including those for interactive transmission, a second satellite communications terminal for communicating with the satellite from the second region, one or more second base station controllers with programming for controlling the second base station, and a second user terminal. A third station is then located in a third remote geographic region, the third station including a third satellite communications terminal for communicating with the satellite from the third region, and a single mobile switching center having a digital communications signal processor for handling digital signal switching between the first and second base stations. In addition, a land based telephone network, and/or wireline and/or other selected wireless communications network(s), is linked remotely and/or locally to the mobile switching center and has at least one device for enabling the third party to transmit a communications signal to the subscriber. A packet data network between the satellite and satellite communications terminals facilitates interactive data communications throughout the distributed network.

Yet a further aspect of the disclosure relates to a distributed interactive digital communications network for enabling transmission of one or more communications signal(s), e.g., cellular, wireless Internet access, digital television, and/or like multimedia services, between a third party outside the network and a communications services subscriber at a selected remote location. One or more global communications satellites are positioned and adapted for receiving and relaying packet data communications encapsulating the interactive transmission. A first station is located in a first remote geographic region, the first station including a first base station having mobile wireless links to a plurality of subscribers to communications services in the first region including those for interactive transmission, a first satellite communications terminal for communicating with the satellite from the first region, and a first user terminal. Similarly, a second station is located in a second remote geographic region, the second station including a second base station having mobile wireless links to a plurality of subscribers to communications services in the second region including those for interactive transmission, a second satellite communications terminal for communicating with the satellite from the second region, one or more base station controllers with programming for controlling the first and second base stations, and a second user terminal. In addition, a third station is located in a third remote geographic region, the third station including a third satellite communications terminal for communicating with the satellite from the third region, and a single mobile switching center having a digital communications signal processor for handling digital signal switching between the first and second base stations. In turn, a third party, wireless and/or land based, interactive communications network is linked remotely and/or locally to the mobile switching center and has at least one device for enabling the third party to transmit a communications signal to the subscriber. A packet data network between the satellite and satellite communications terminals facilitates interactive data communications throughout the distributed network.

Still a further aspect of the disclosure is a distributed interactive digital communications network for enabling interactive communications, e.g., cellular, wireless Internet access, digital television, and/or like multimedia services, between a first digital communications services subscriber at a first remote location and a second digital communications services subscriber at a second remote location. In particular, one or more global communications satellites are positioned and adapted for receiving and relaying packet data communications encapsulating the interactive communications. A first station is located in a first remote geographic region. The first station includes a first base station having mobile wireless links to a plurality of subscribers to first digital communications services in the first region, a first satellite communications terminal for communicating with the satellite from the first region, and a first user terminal. Likewise, a second station is located in a second remote geographic region. The second station includes a second base station having mobile wireless links to a plurality of subscribers to second digital communications services in the second region, a second satellite communications terminal for communicating with the satellite from the second region, and a second user terminal. A third station is located in a third remote geographic region, the third station including a third satellite communications terminal for communicating with the satellite from the third region, a plurality of base station controllers with programming for controlling the first and second base stations, and a single mobile switching center having a digital communications signal processor for handling digital signal switching between the first and second base stations. A packet data network is located between the satellite and satellite communications terminals for interactive data communications throughout the distributed network.

According to another aspect of the disclosure is a distributed interactive digital communications network for enabling interactive communications, e.g., cellular, wireless Internet access, digital television, and/or like multimedia services, between a first digital communications services subscriber at a first remote location and a second digital communications services subscriber at a second remote location. In particular, one or more global communications satellites are positioned and adapted for receiving and relaying packet data communications encapsulating the interactive communications. A first station is located in a first remote geographic region. The first station includes a first base station having mobile wireless links to a plurality of subscribers to first digital communications services in the first region, a first satellite communications terminal for communicating with the satellite from the first region, one or more first base station controllers with programming for controlling the first base station, and a first user terminal. A second station is similarly located in a second remote geographic region. The second station includes a second base station having non-mobile wireline links to a plurality of subscribers to second digital communications services in the second region, a second satellite communications terminal for communicating with the satellite from the second region, one or more second base station controllers with programming for controlling the second base station, and a second user terminal. A third station located in a third remote geographic region includes a third satellite communications terminal for communicating with the satellite from the third region, and a single mobile switching center having a digital communications signal processor for handling digital signal switching between the first and second base stations. A packet data network is provided between the satellite and satellite communications terminals for interactive data communications throughout the distributed network.

In accordance with a further aspect of the disclosure is a distributed interactive digital communications network for enabling interactive communications, e.g., cellular telephone, wireless Internet access, digital television, and/or like multimedia services, between a first digital communications services subscriber at a first remote location and a second digital communications services subscriber at the first remote location. The network includes one or more global communications satellites positioned and adapted for receiving and relaying packet data communications encapsulating the interactive communications. Also provided is a first station located in a first remote geographic region, the first station including a first base station having mobile wireless links to a plurality of subscribers to first digital communications services in the first region, a first satellite communications terminal for communicating with the satellite from the first region, a base station controller with programming for controlling the first base station, and a first user terminal. A second station is located in a second remote geographic region, the second station including a second satellite communications terminal for communicating with the satellite from the first region, and a single mobile switching center having a digital communications signal processor for digital signal switching between the first and second base stations. A packet data network positioned between the satellite and satellite communications terminals facilitates interactive data communications throughout the distributed network.

Yet a further aspect of the disclosure concerns a distributed cellular network, which comprises a plurality of global communications satellites positioned and adapted for receiving and relaying packet data communications encapsulating cellular telephone communications to and from, respectively, one or more selected remote geographic region(s). A plurality of base stations is also provided, each station being located in the one or more selected remote geographic region(s) and having mobile wireless links to a plurality of subscribers of cellular telephone services in the region. The network includes a plurality of satellite communications terminals, each being located in the one or more selected remote geographic region(s) and associated with one or more of the base stations, for communicating with the plurality of satellites from the region(s). Likewise, a plurality of user terminals is provided, each being located in the one or more selected remote geographic region(s) and being associated with the base station(s) in the region(s). In addition, a base station controller is located remotely from, or locally with, the base stations and has programming for controlling the plurality of base stations. Furthermore, a mobile switching center is located remotely from, or locally with, the base station controller and the base stations and has a call processor for handling cellular telephone call switching between the plurality of base stations, and/or wireline and/or or other cellular telephone network(s). Finally, a packet data network is provided between one or more of the satellite(s) and satellite communications terminals for interactive data communications throughout the network.

Still another aspect of the disclosure relates to a distributed interactive digital communications network for multimedia services, which comprises a plurality of global communications satellites positioned and adapted for receiving and relaying packet data communications encapsulating interactive communications to and from, respectively, one or more selected remote geographic region(s). Also provided is a plurality of base stations, each being located in the one or more selected remote geographic region(s) and having mobile wireless links to a plurality of subscribers to interactive digital communications services. In addition, a plurality of satellite communications terminals, each being located in the one or more selected remote geographic region(s) and associated with one or more of the base stations, for communicating with the plurality of satellites from the region(s). Similarly, a plurality of user terminals is provided, each being located in the one or more selected remote geographic region(s) and associated with the base station(s) in the region(s). A base station controller is located remotely from, or locally with, the base stations and has programming for controlling the plurality of base stations. Furthermore, a mobile switching center is located remotely from, or locally with, the base station controller and the base stations and has a digital communications signal processor for handling digital signal switching between the plurality of base stations, wireline and/or other communications networks. Last, a packet data network between one or more of the satellite(s) and satellite communications terminals for interactive data communications throughout the network.

Accordingly, it is an object of the disclosure to provide an efficient and economical communications network for cellular telephones or the like.

It is another object of the disclosure to provide an improved cellular telephone network that is durable, versatile and reliable.

A further object of the disclosure is to provide for the introduction of cellular telephone service to regions of the world that are currently underserved or unreachable by telephone service providers.

Yet another object of the disclosure is to reduce the cost of providing full-featured cellular telephone service in remote geographic areas and/or in small population densities.

Still another object of the disclosure is to provide a packet data network using Internet Protocol and/or other communications protocols between all elements of a satellite based network so as to allow the elements of a cellular network to be located anywhere in the coverage area of global communications satellites.

Yet a further object of the disclosure is to provide a simple, practical network architecture both for reducing the expense of providing cellular telephone service to existing customers, and for improving and adding service in remote geographic regions.

Still a further object of the disclosure is to utilize the global coverage of satellites to improve cellular telephone services worldwide.

Another object of the disclosure is to enable base station controllers and mobile switching centers to be located separately from base stations of service areas for cellular networks.

Yet another object of the disclosure is to provide a novel network architecture for allowing new services and/or providers to be added to existing cellular telephone networks with relatively low incremental cost.

Still another object of the disclosure is to provide a cellular telephone network with control and switching elements that are fully digital for reduced implementation and operational costs.

A further object of the disclosure is the marriage or integration of packet network, packet data satellite network and packet gateway technology using existing communications equipment and standards, and relatively low cost, high production equipment readily available from suppliers.

Yet a further object of the disclosure is to provide a very small aperture terminal (VSAT)-based multi-service Internet Protocol communications network to a particular nation or geographic region that will fundamentally change its social and economic fabric.

Another object of the disclosure is to provide a communications network that enables third world nations to become an active participant in the new world economy.

Still another object of the disclosure is to provide cost effective multiple voice, data, and video services over a single communications platform.

A further object of the disclosure is to combine terrestrial and satellite technologies into robust networks that are effective, reliable and economical.

Yet a further object of the disclosure is to provide a reliable satellite based network that supplies global system for mobile communications (GSM) telephony, fixed wireless access, private wideband data access, Internet access, television and/or other digital entertainment media services.

Another object of the disclosure is to supply GSM telephony, fixed wireless access, wideband data access, Internet access and entertainment and/or digital media services to geographically disperse, low density populations that are economical for the customer and profitable to the service provider.

A further object of the disclosure is to provide a satellite based network having a network and network services for providing a relatively high level of scalability and flexibility for ready expansion by an operation and, thereby, ease in the operator's business growth and evolution.

Still another object of the disclosure is to provide an efficient trunking or transport solution for gaining access to the world's public networks (e.g., PSTN, Internet, or the like).

Yet another object of the disclosure is to provide a global communications network that simultaneously utilizes conventional transmission media (e.g., fiber optics, satellite) and traditional transport technology/protocol (e.g., Internet Protocol).

Still a further object of the disclosure is to enable convergence of multiple services including, e.g., cellular telephone, wireless Internet access, digital television and/or like media services, onto a single transport backbone via Internet Protocol technology.

Yet another object of the disclosure is to provide service delivery to the end user that is cost effective and easy to maintain.

Another object of the disclosure is to provide a full service communications network that utilizes wireless rather than wireline delivery and, thereby, yield relatively lower maintenance requirements.

A further object of the disclosure is to provide a distributed communications network that utilizes standards based solutions (e.g., GSM telephony—mobile and fixed).

Still another object of the disclosure is to provide manageable operations and customer service, namely, network operations and maintenance (O&M) and billing, as a function of network size while accommodating and supporting the special requirements of different services.

Yet a further object of the disclosure is to provide billing suitable for financial success of the network, including both prepaid and postpaid billing services.

Another object of the disclosure is to provide a VSAT-based Internet Protocol network for disaster recovery applications that includes a distributed GSM cellular network.

Still a further object of the disclosure is to provide a next generation ready, distributed satellite-based network with optimized Internet Protocol traffic capability for voice data.

The network and method of the disclosure will now be further described by reference to the following drawings which are not intended to limit the accompanying claims.

BRIEF DESCRIPTION OF THE DRAWINGS

FIG. 29 is a detail schematic of a tradition network architecture (L-M) shown in FIG. 26 as incorporated into a network, according to the disclosure.

DETAILED DESCRIPTION

Figure 1:
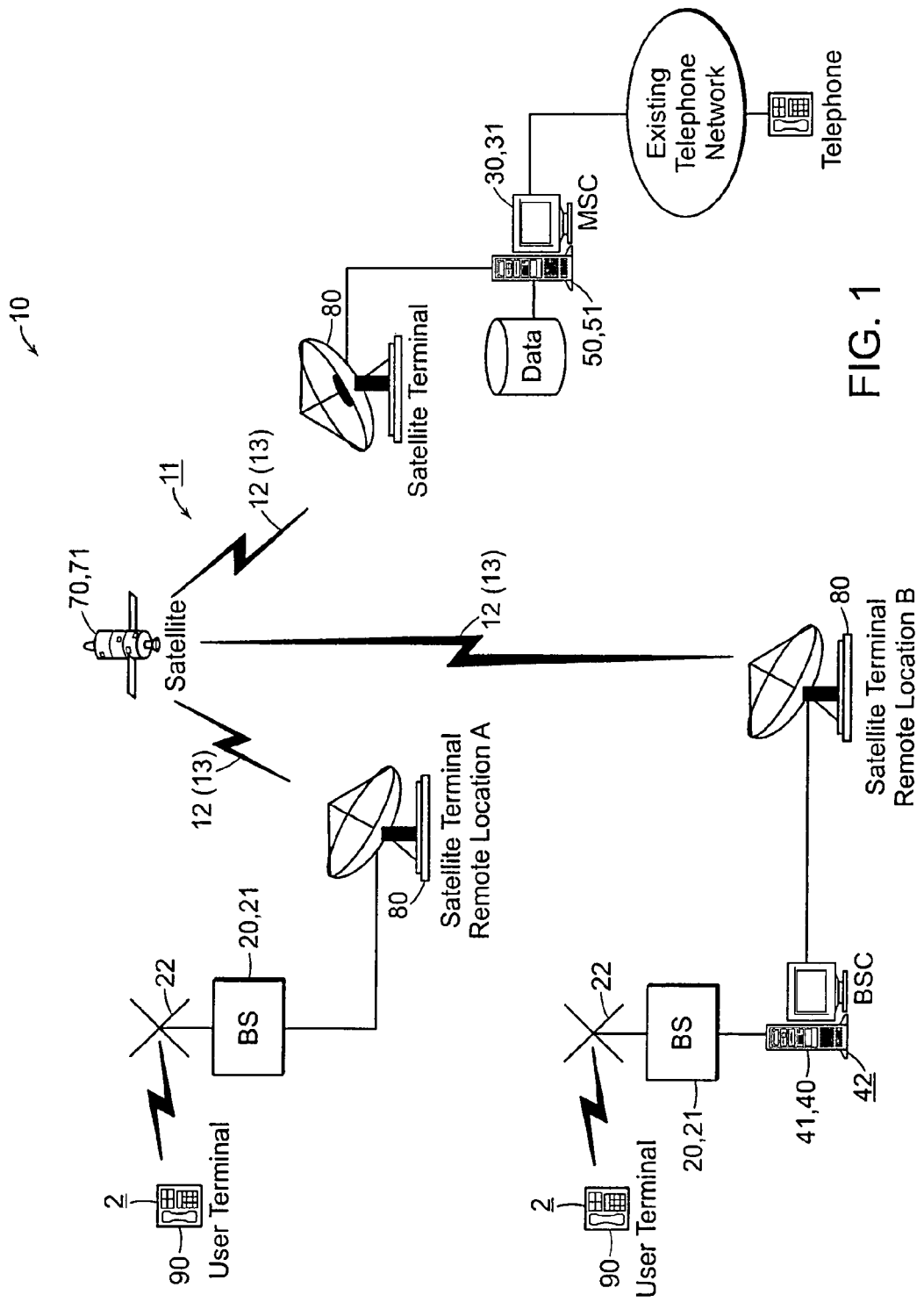
FIG. 1 is a schematic diagram of a distributed cellular network, according to one embodiment of the disclosure.

Conventional satellite communication networks have found widespread applications ranging from television networks and telephone companies to telecommunications companies and the like. In recent years, with the advent of digital electronics, satellite communications have become more readily available to individuals. Of particular interest has been the linkage between remote computers and global computer network systems, such as the Internet.

Digital satellite communications systems typically involve a hub terminal for communicating with multiple remote terminals, such terminals including, for instance, personal computers or other digital data-processing devices. One or more modems are connected to each terminal for modulating and demodulating data to be transmitted in the satellite's frequency band. To accommodate more than one remote terminal at a time, the hub terminal communicates with each remote terminal on a different frequency or channel of the satellite's transponder spectrum. Alternatively, a method known as "time division multiple access" (or TDMA) is utilized, in which many different remote terminals operate on the same frequency, but transmit data in packets arranged in selected time slices of the data stream.

To effect multiple communications, the hub terminal broadcasts and receives various control signals for commanding the remote modem. Examples include signals for tuning to a particular channel for data transfer. Control signals also permit the hub terminal to monitor usage of the remote terminals. This feature has been found particular useful for billing remote terminal users for satellite usage time. In addition, one remote terminal of the network communicates with another without using the hub terminal. More specifically, by this arrangement, commonly known as a "mesh" network, any terminal within the network may communicate directly with any other terminal.

As for cellular network technologies, they are considered well defined by international standards. Two example standards/technologies are GSM (Global System for Mobile communications) and CDMA (Code Division Multiple Access). Traditional network architectures deploy GSM over satellite. This is usually done by functionally combining a centralized mobile switching center (MSC)/base station controller (BSC) with increased delay due to the distance or length of the satellite transmission path. For instance, a hand full of base stations are connected to an existing BSC/MSC over a satellite link, using satellite channels for traffic, call setup and Application Binary Interface Standard (Abis) signaling.

The foregoing description is provided for purposes of illustration and not to limit the intended environment or application of the network and method of the disclosure. The remaining structural and functional aspects of satellite communications networks are known by those skilled in the art and further description is considered unnecessary for illustration of the disclosure.

Referring now to the drawings and, more particularly, to FIGS. 1-29, there is shown a specific, illustrative, distributed cellular network 10 for enabling (i) calls between a third party 1, e.g., outside the network, and a cellular telephone subscriber 2 at a selected remote location, (ii) calls between a first cellular telephone subscriber 3 at a first remote location and a second cellular telephone subscriber 4 at a second remote location, and/or (iii) calls between the first cellular telephone subscriber at the first remote location and the second cellular telephone subscriber at the first location. At the kernel of the this disclosure is a unique satellite-based network architecture that enables base station controllers 40 and mobile switching centers 30 to be located separately from base stations 20 of service areas for cellular networks. In this manner, full-featured cellular telephone services and the like may now be provided in remote geographic areas and/or in small population densities that were underserved or unreachable by prior networks. A flexible and scalable system 100 is also provided for Internet access, private data services as well as television/entertainment.

Also at the core of the disclosure are conventional software based switches (or softswitches) 50 which enable deployment of small scale and distributed cellular networks. More specifically, softswitch architecture has been found particularly well-suited for efficient deployment of these networks over satellite. In this manner, a next generation softswitch network 60 is provided that operates over satellite, according to various aspects of the disclosure.

Figure 2:
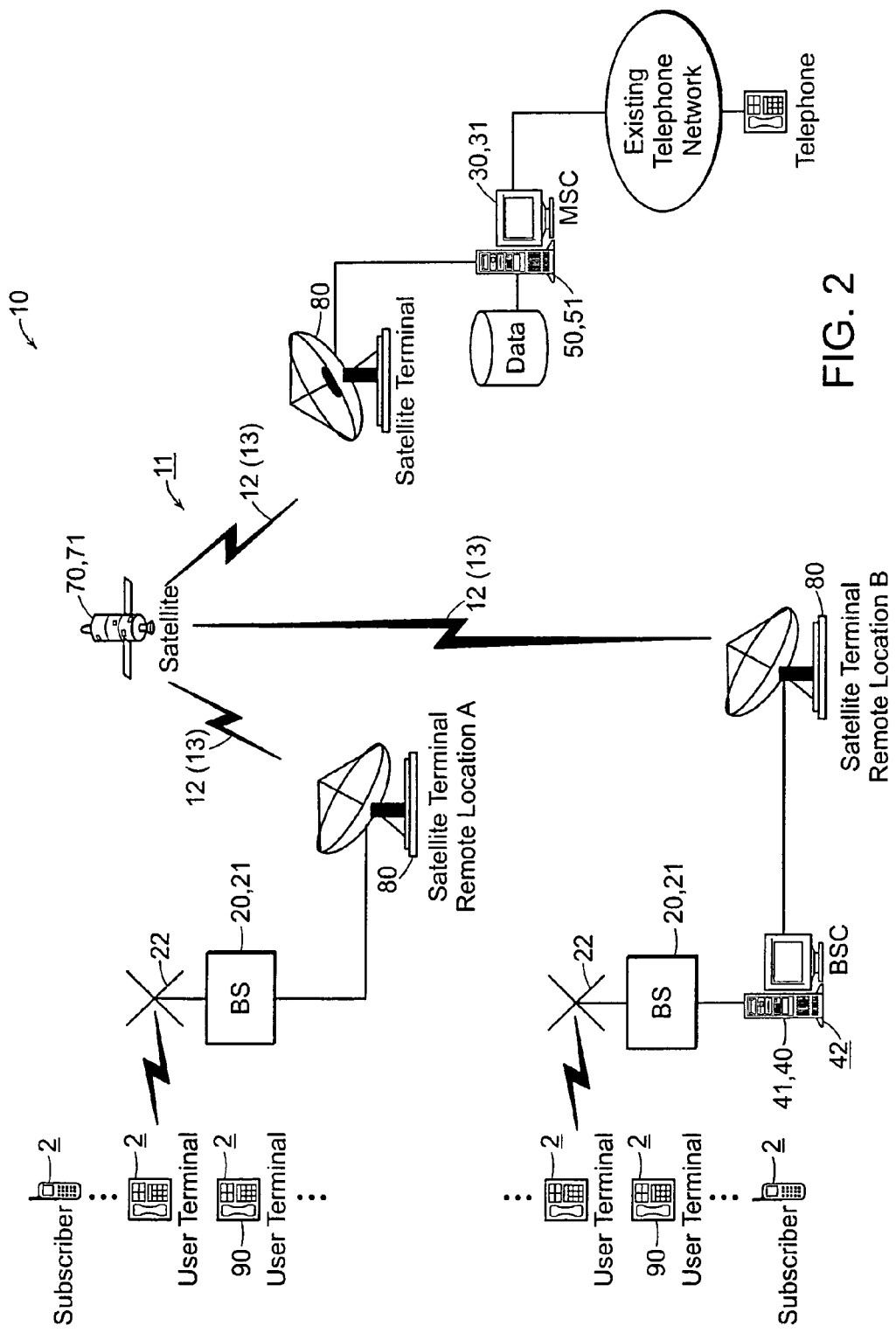
FIG. 2 is a schematic diagram of a distributed cellular network, according to another embodiment of the disclosure.

In one embodiment, as shown in FIGS. 1 and 2, a distributed, satellite-based cellular network 11 is provided that includes one or more global communications satellites 70, e.g., one or more conventional digitally equipped satellites that transmit over the usual satellite frequencies and bandwidths, or multiple global communications satellites. The satellite(s) are positioned and adapted for receiving and relaying packet data communications 12 encapsulating cellular telephone communications 13 to the user. It is preferred that the satellite be of a conventional geosynchronous type with multiple transponders for operating within the band selected. Also provided is/are one or more earth base stations 21, located in each of a plurality of selected remote geographic regions, e.g., a rural location, with mobile wireless links 22 to a plurality of subscribers 2 of cellular telephone services in the region. Alternatively or concurrently, a plurality of base stations 21 are provided, each base station being located in a selected and distinct remote geographic region, e.g., each region being separate from the others, and having mobile wireless links to a plurality of subscribers of the cellular telephone services.

A plurality of satellite communications terminals 80 is also provided for communicating with satellite(s) 71 from the region. Each terminal 80 is located in the selected remote geographic region and associated with one or more of base station(s) 21 in the region. The satellite terminal (which is also known as a satellite earth station, earth station or very small aperture terminal (VSAT)) is desirably a conventional device that permits communications between ground-based systems via radio communication with a satellite.

While the network and method of the disclosure are shown and described with reference to selected satellite terminals, given that there are many varieties of satellite terminals, such arrangement is not intended to be limited to any particular set, subset or subclass of such terminals, giving consideration to the purpose for which the disclosure is intended. For example, it is considered desirable that the terminal have a suitable digital data interface for interfacing with a packet data communication device. Demonstrative interfaces are described in further detail below.

In addition, a plurality of user terminals 90 are preferably utilized, each being located in the selected remote geographic region and associated with the base station(s) in the region. Alternatively or concurrently, as best seen in FIG. 2, each base station is associated with a plurality of user terminals.

According to one embodiment of the disclosure, the user terminal (also known as the subscriber terminal, subscriber, cellular telephone, mobile phone, or handset) is the device a caller uses to place a call. Suitable terminals include, but are not limited to, those manufactured by Nokia, Motorola and Ericsson, their compatibility for the applications state being considered to be in accordance with and well defined by international standards. As will be appreciated by those skilled in the art, compatibility of the disclosure with international standards, in this connection, is preferred.

Figure 3:
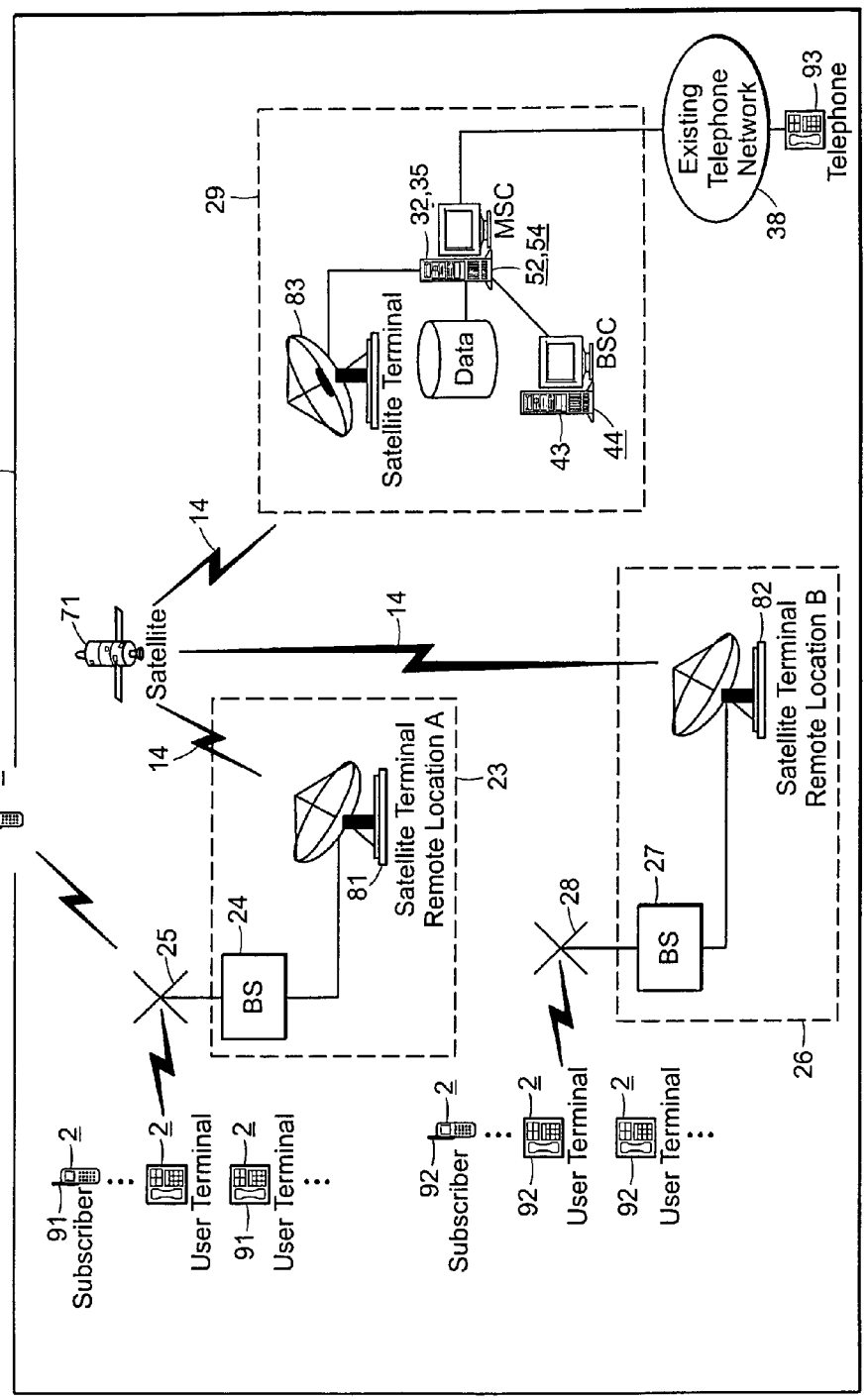
FIG. 3 is a schematic diagram of a distributed cellular network, according to a further embodiment of the disclosure.

Furthermore, a base station controller 41 is located remotely from, or locally with, the base station(s) 21, and has programming 42 for controlling the one or more base station (s) in the selected remote geographic regions and/or the plurality of base stations overall. Also, a mobile switching center 31, is located remotely both from the base station controller and the base station(s). The switching center is provided with a call processor 51 for handling cellular telephone call switching between the plurality of base stations, and/or wireline and/or other cellular telephone network(s), if present. Alternatively, as shown in FIG. 3, a mobile switching center 32 is located in proximity to the base station controller, such having a call processor 52 for handling cellular telephone call switching between the plurality of base stations, and/or wireline or other cellular telephone networks, if present. Finally, a packet data network 14 is utilized between the satellite and satellite communications terminals for interactive data communications throughout the network.

Generally speaking, the base station controller (BSC) is the control element of a cellular network responsible for management of the radio network and its related base stations. Its functions include, but are not limited to, (i) control and management of radio channels to base stations and user terminals, (ii) management of call handovers between base stations, and (iii) performance monitoring of the radio network, among many others. It also provides an interface between the radio network's base stations and the mobile switching center (MSC) for call setups and communications. As for the base station (BS), also known as the Base Transceiver System (BTS), it is the transmitter/receiver responsible for establishing the radio communications between the user terminal and the BSC and/or MSC.

Like the satellite terminals above, respective base station and base station controller functions and specifications are also considered well defined by international standards (i.e., GSM and CDMA as referenced above) such that interoperation between equipment of different vendors is not only made possible, but also required by most traditional cellular networks. It is, therefore, preferred that the disclosure be compatible with traditional base station and base station controller functions and specifications. Exemplary vendors of suitable equipment include Motorola, Interwave Communications, Ericsson, Siemens, and Alcatel, as will be appreciated by those skilled in the art. Also, it is preferred that the network and method of this disclosure be adaptable for use with, and/or be compatible with, selected next generation base station controller and base station products of vendors such as Telos Technology, Interwave Communications, and IP Access. It is believed that such next generation products will be the next standard for the applicable industry.

Figure 7:
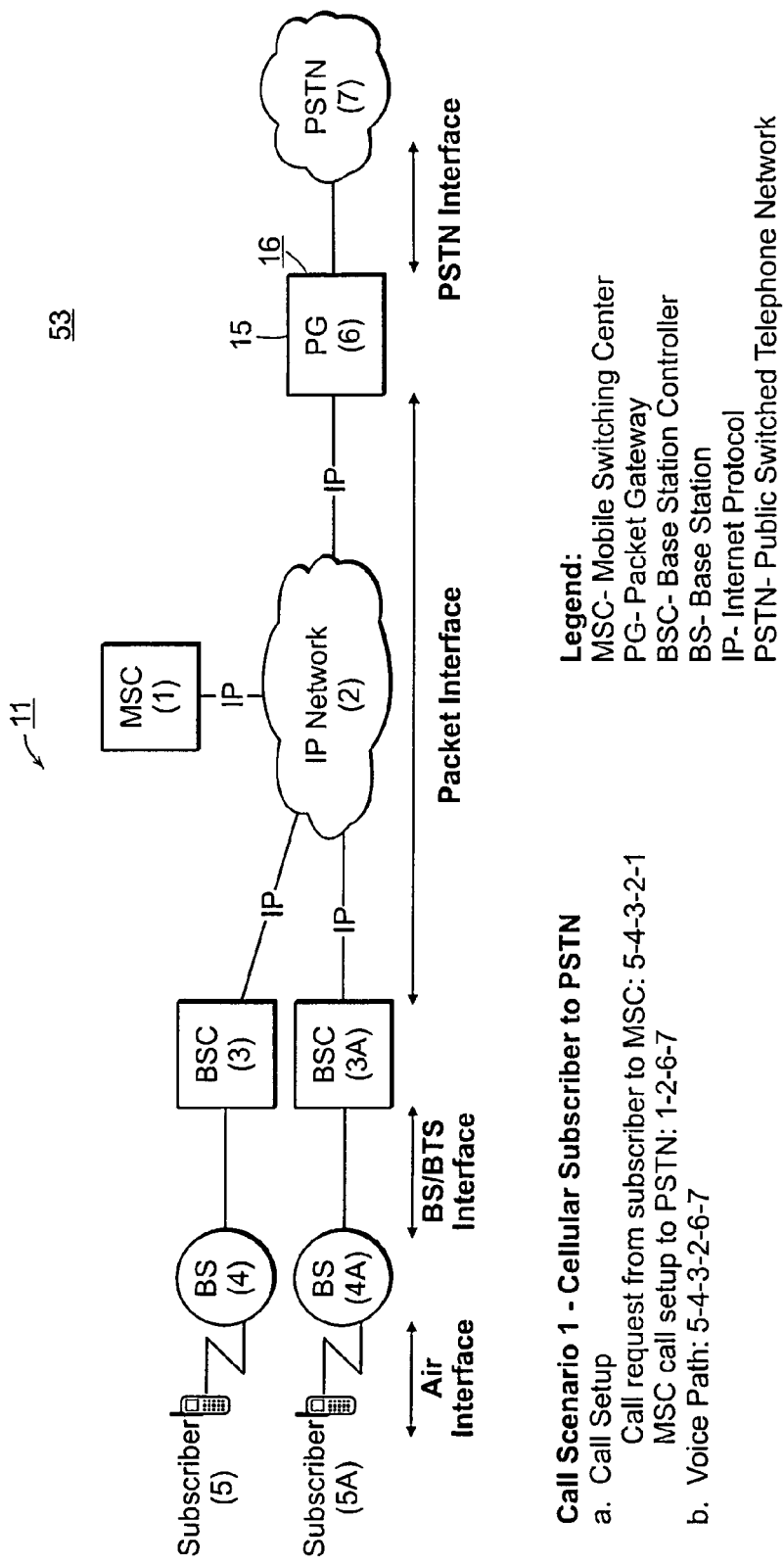
FIG. 7 is a schematic diagram of a distributed cellular network detailing operation of a packet based mobile network switch, according to one aspect of the disclosure.

As for the mobile switching center, it relates, for example, to a software based mobile network switch 53 (i.e., "softswitch" architecture) capable of packet-based communications, as shown in FIG. 7. According to one embodiment, the packet protocol utilized is Internet Protocol (IP). Inherent in the use of packet protocols (or an Internet Protocol data format) is the ability to share a common transmission medium between multiple Internet Protocol based services, such as the Internet. This enables communications to be carried out in an Internet Protocol format, allowing the elements of the network to interconnect via packet data network 11. As a result, all network elements can thereby make use of, and share, network resources regardless of their location. More specifically, by using standard open protocol equipment, e.g., an Internet Protocol softswitch in conjunction with GSM base station controller and base transceiver system (BTS) subsystems, service offerings maybe created. This common transmission backbone can, thereby, be shared with other Internet Protocol based services, such as those available on the Internet. The resulting packet network operating over a geostationary satellite, in turn, handles interconnection of the network elements. In this manner, the complexity and cost of deploying remote GSM Radio Access Networks (RANs) over satellite is reduced dramatically.

Also considered particularly desirable for the arrangement described herein is GSM telephony capability. This is not only because it (i) is presently the world standard for wireless phone service, (ii) supports value added services such as messaging, fax and data, and (iii) has GSM roaming which allows easy membership into the international mobile phone community, but also (iv) because GSM is well developed and has relatively inexpensive subscriber units. By conventional wisdom, however, many aspects of GSM have been considered barriers to development of low density applications. These aspects include a relatively expensive infrastructure, network operations and maintenance, centralized network architecture with all calls passing through a mobile switching center, and distance sensitive backhaul costs.

Accordingly, it is also preferred that the network and method of the disclosure utilize next generation GSM over Internet Protocol which provides GSM with an Internet Protocol based softswitch that (i) effectively distributes the switching function, thereby making service available anywhere within the Internet Protocol network, (ii) provides new remote service areas that can be readily added to the network at relatively low costs regardless of location via satellite technology, (iii) has network expansion costs that are incremental (i.e., a new service area does not require a new switch), and (iv) can provide managed services to other telecom entities from the same infrastructure, enabling sharing of infrastructure costs. It is noted, in this connection, that softswitch architectures, according to the disclosure, utilize satellite channels for call setup only, whereas conventional architectures use satellite channels for call traffic, call setup and Abis signaling.

According to another aspect of the disclosure, as also shown in FIG. 3, a distributed cellular network is provided for enabling calls between third party 1, e.g., outside the network, and cellular telephone subscriber 2 at a selected remote location. The network again comprises one or more global communications satellites 71 positioned and adapted for receiving and relaying packet data communications encapsulating the cellular telephone communications. A first earth station 23 is located in a first remote geographic region, the first station including a first base station 24 having mobile wireless links 25 to a plurality of subscribers 2 of cellular telephone services in the region, a first satellite communications terminal 81 for communicating with the satellite from the region, and a first user terminal 91. A second earth station 26 is, in turn, located in a second remote geographic region. The second station includes a second base station 27 with mobile wireless links 28 to a plurality of subscribers 2 of cellular telephone services in the region, a second satellite communications terminal 82 for communicating with the satellite from the region, and a second user terminal 92. In addition, a third station 29 is located in a third remote geographic region.

The third station comprises a third satellite communications terminal 83 for communicating with the satellite from the region, a base station controller 43 with programming 44 for controlling the first and second base stations 24, 27, respectively, and a mobile switching center 35 having a call processor 54 for handling cellular telephone call switching between the first and second base stations. A land based telephone network 38, and/or wireline or other cellular telephone network(s), if present, is linked, remotely and/or locally, to the mobile switching center and has at least one telephone 93 for enabling the third party to place a call to the subscriber. Finally, packet data network 14 is utilized between the satellite and satellite communications terminals for interactive data communications throughout the network.

Figure 4:
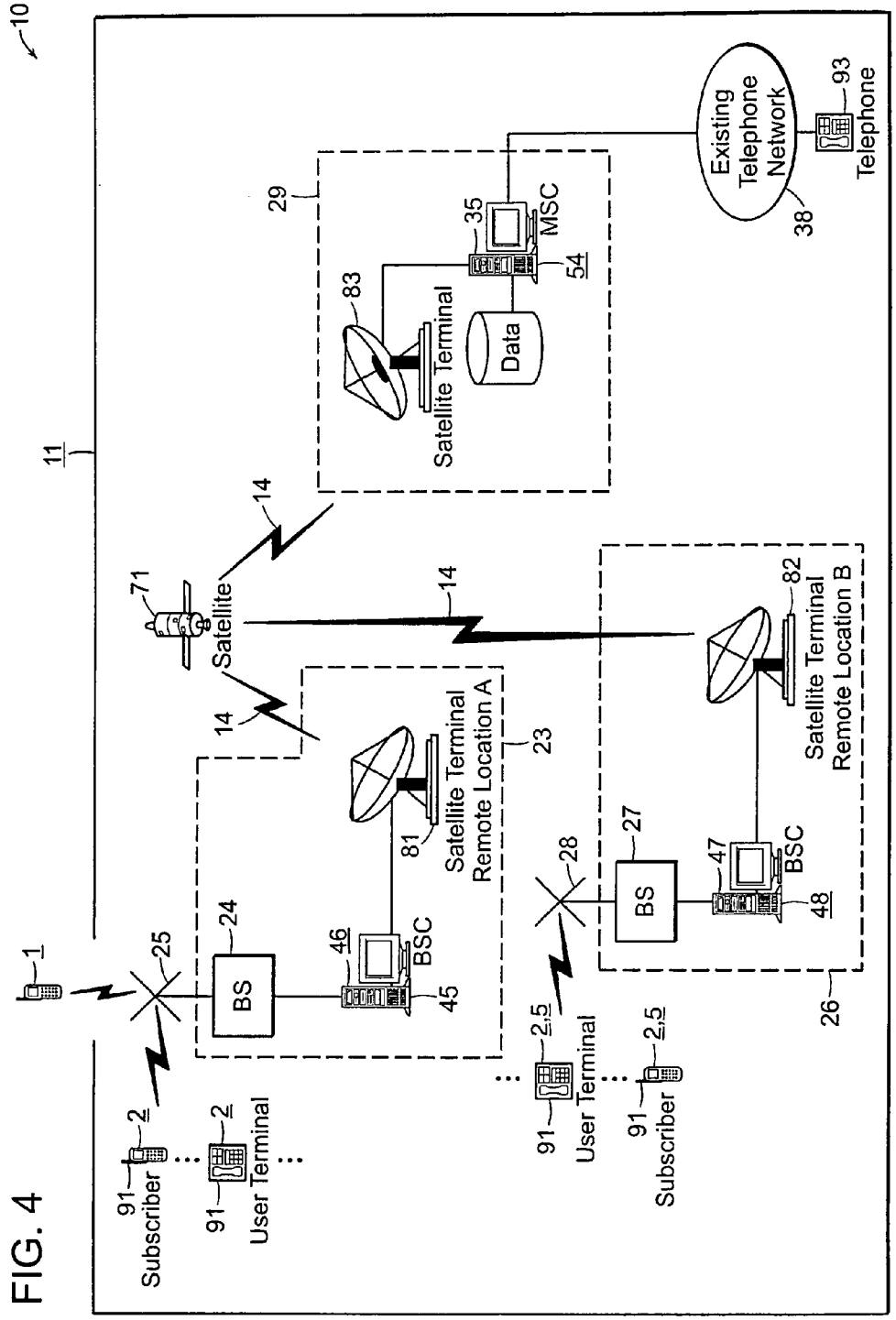
FIG. 4 is a schematic diagram of a distributed cellular network, in accordance with still another embodiment of the disclosure.

Alternatively, as provided in FIG. 4, the first station includes the first base station having mobile wireless links to the plurality of subscribers of cellular telephone services in the region, the first satellite communications terminal for communicating with the satellite from the region, a first base station controller 45 with programming 46 for controlling the first base station, and the first user terminal. Similarly, the second station is equipped with the second satellite communications terminal for communicating with the satellite from the region, a second base station controller 47 with programming 48 for controlling the second base station, and the second user terminal.

Figure 5:
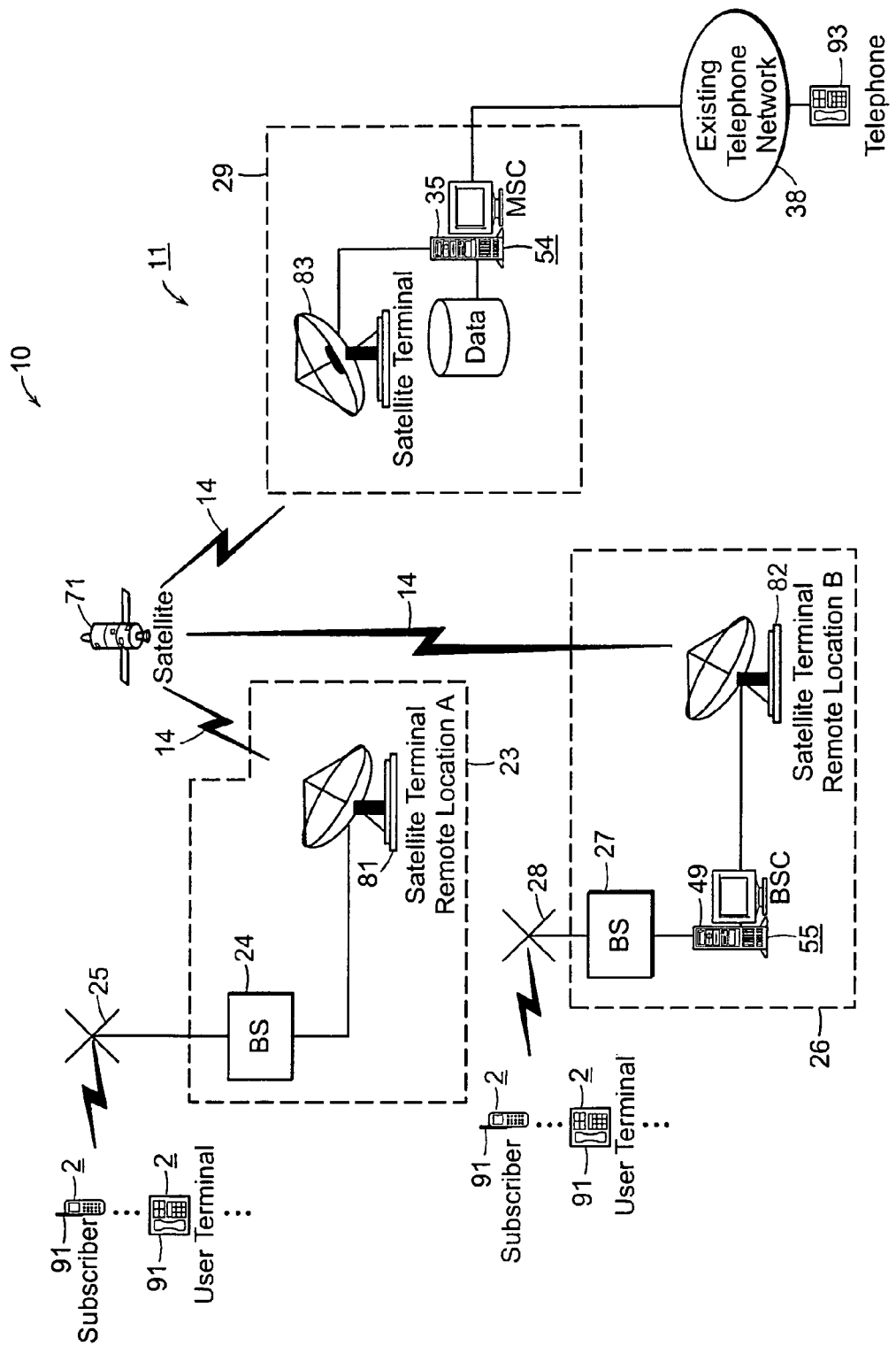
FIG. 5 is a schematic diagram of a distributed cellular network, according to yet another embodiment of the disclosure.

Further in the alternative or concurrently therewith, and as illustrated in FIG. 5, the first station includes the first base station having mobile wireless links 25 to the plurality of subscribers of cellular telephone services in the region, the first satellite communications terminal for communicating with the satellite from the first region, and the first user terminal. The second station is equipped with the second satellite communications terminal for communicating with the satellite from the second region, and a base station controller 49 having programming 55 for controlling the first and second base stations. The second station additionally has the second user terminal.

The third station, according to either of the foregoing arrangements, is located in the third remote geographic region and comprises the third satellite communications terminal for communicating with the satellite from the region. The mobile switching center includes call processor 54 for handling cellular telephone call switching between the first and second base stations. In addition, and as before, the land based telephone network, e.g., third party, and/or wireline and/or other cellular telephone network(s), if present, is linked remotely and/or locally to the mobile switching center and has at least one telephone 93 (or other communications device) for enabling third party 1 (see FIG. 3) to place a call to subscriber 2.

As best seen in FIG. 7, the above-described connection is enabled by a packet gateway 15, also known as a gateway, voice gateway, media gateway, packet data gateway, or Intelligent Media Gateway (IMG). By one definition, the packet gateway is essentially a device 16 which converts packet communications and its associated protocol(s), such as Internet Protocol, to traditional legacy communications (i.e., telephone network) and protocol(s), such as digital Pulse Code Modulated (PCM) voice and Signaling System Seven (SS7). In this connection, the network of the disclosure preferably utilizes the packet gateway product of Telos Technology. This product performs signaling and provides media bridging between the packet network, the legacy telephone network, other cellular networks, and traditional base station controllers. In addition, alternatively or concurrently, the packet gateway may be considered at least a part of the one or more selected base stations.

As set forth by a commonly preferred configuration, a first packet gateway is collocated with the mobile switching center. In addition, a second packet gateway is present at a remote location where connection to another telephone network may be desired. As in the case of base station controller/base station arrangements, i.e., where the base station controller and the base station are collocated (See FIG. 5), it is noted that standards for communications protocols between respective packet gateways are desirably adopted to enable vendor interoperation, such gateways being available from many well-known manufacturers (e.g., Cisco Systems, Inc.).

Figure 8:
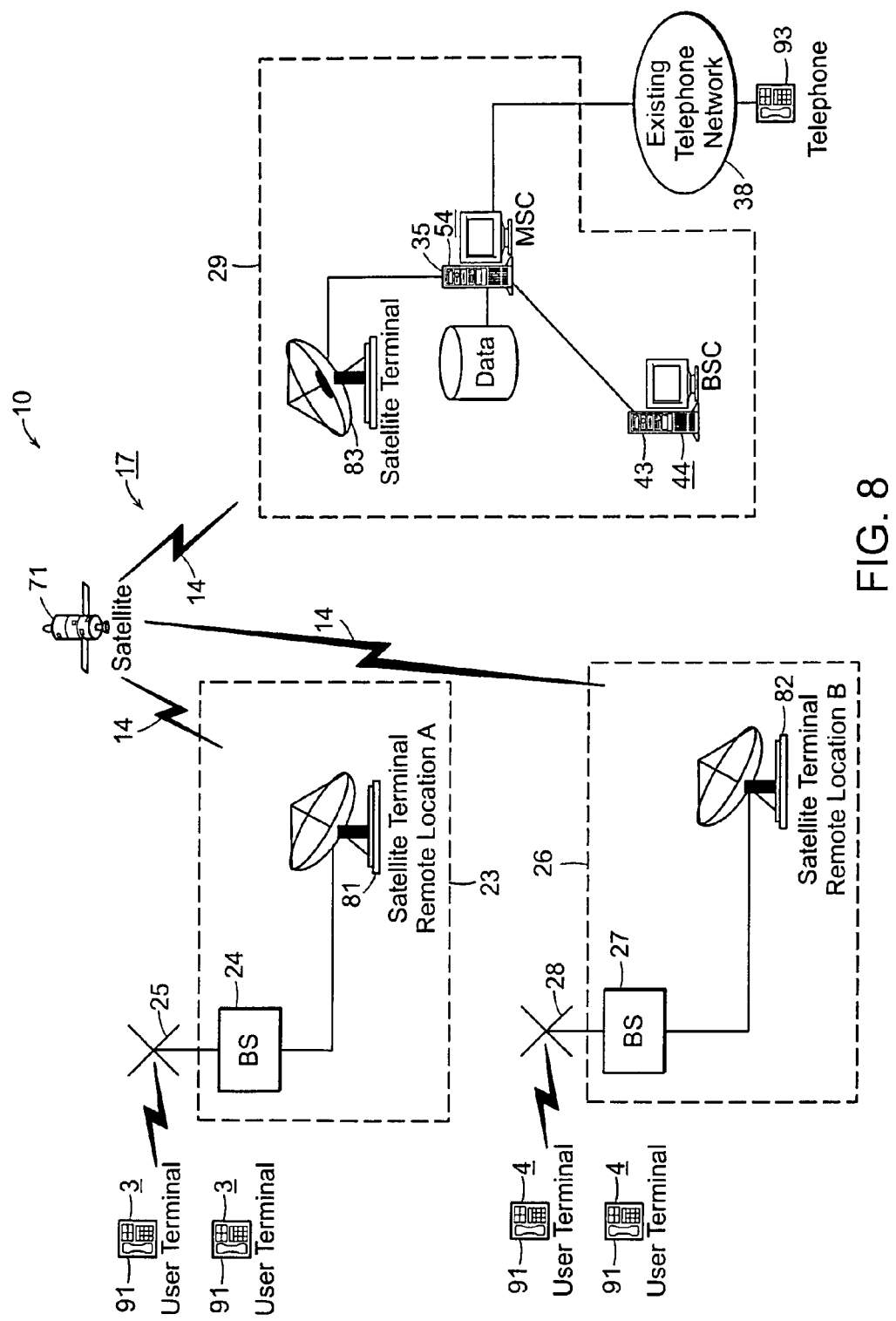
FIG. 8 is a schematic diagram of a distributed cellular network, according to still a further embodiment of the disclosure.
Figure 9:
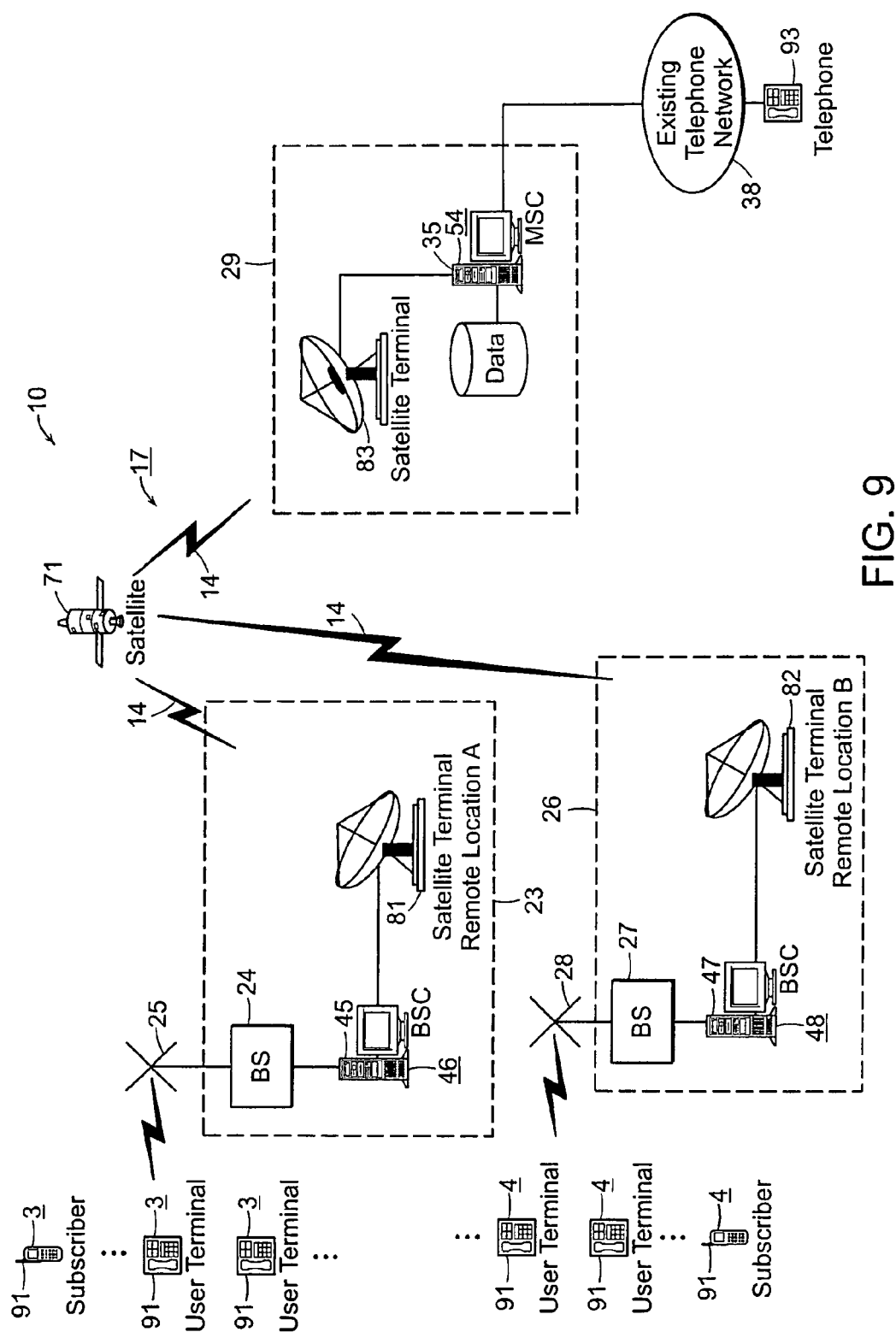
FIG. 9 is a schematic diagram of a distributed cellular network, in accordance with another embodiment of the disclosure.

According to a further aspect of the disclosure, as shown in FIG. 8, a distributed, satellite-based cellular network 17 is provided for enabling calls between a first cellular telephone subscriber 3 at the first remote location and a second cellular telephone subscriber 4 at the second remote location. The network includes one or more global communications satellites positioned and adapted for receiving and relaying packet data communications encapsulating cellular telephone communications. As before, the first station is located in the first remote geographic region, the first station including the first base station having mobile wireless links to the plurality of subscribers of cellular telephone services in the region, the first satellite communications terminal for communicating with the satellite from the first region, and the first user terminal. Also, the second station is provided and located in the second remote geographic region. The second station includes the second base station having mobile wireless links to the plurality of subscribers of cellular telephone services in the region, the second satellite communications terminal for communicating with the satellite from the second region, and the second user terminal.

In addition, the third station is located in the third remote geographic region. The third station includes the third satellite communications terminal for communicating with the satellite from the third region. It also utilizes base station controller 43 with programming 44 for controlling the first and second base stations, and mobile switching center 35 having call processor 54 for handling cellular telephone call switching between the first and second base stations. Last, packet data network 14 is used between the satellite and satellite communications terminals for interactive data communications throughout the network.

Alternatively or concurrently, the first station includes the first base station with mobile wireless links to the plurality of subscribers of cellular telephone services in the region, the first satellite communications terminal for communicating with the satellite from the region, first base station controller 45 with programming 46 for controlling the first base station, and the first user terminal. The second station, in turn, includes the second base station with mobile wireless links to the plurality of subscribers of cellular telephone services in the region, the second satellite communications terminal for communicating with the satellite from the region, second base station controller 47 with programming 48 for controlling the second base station, and the second user terminal. As for the third station, it includes the third satellite communications terminal for communicating with the satellite from the region, and the mobile switching center with call processor 54 for handling cellular telephone call switching between the first and second base stations. An arrangement of this general description is illustrated generally in FIG. 9.

Figure 10:
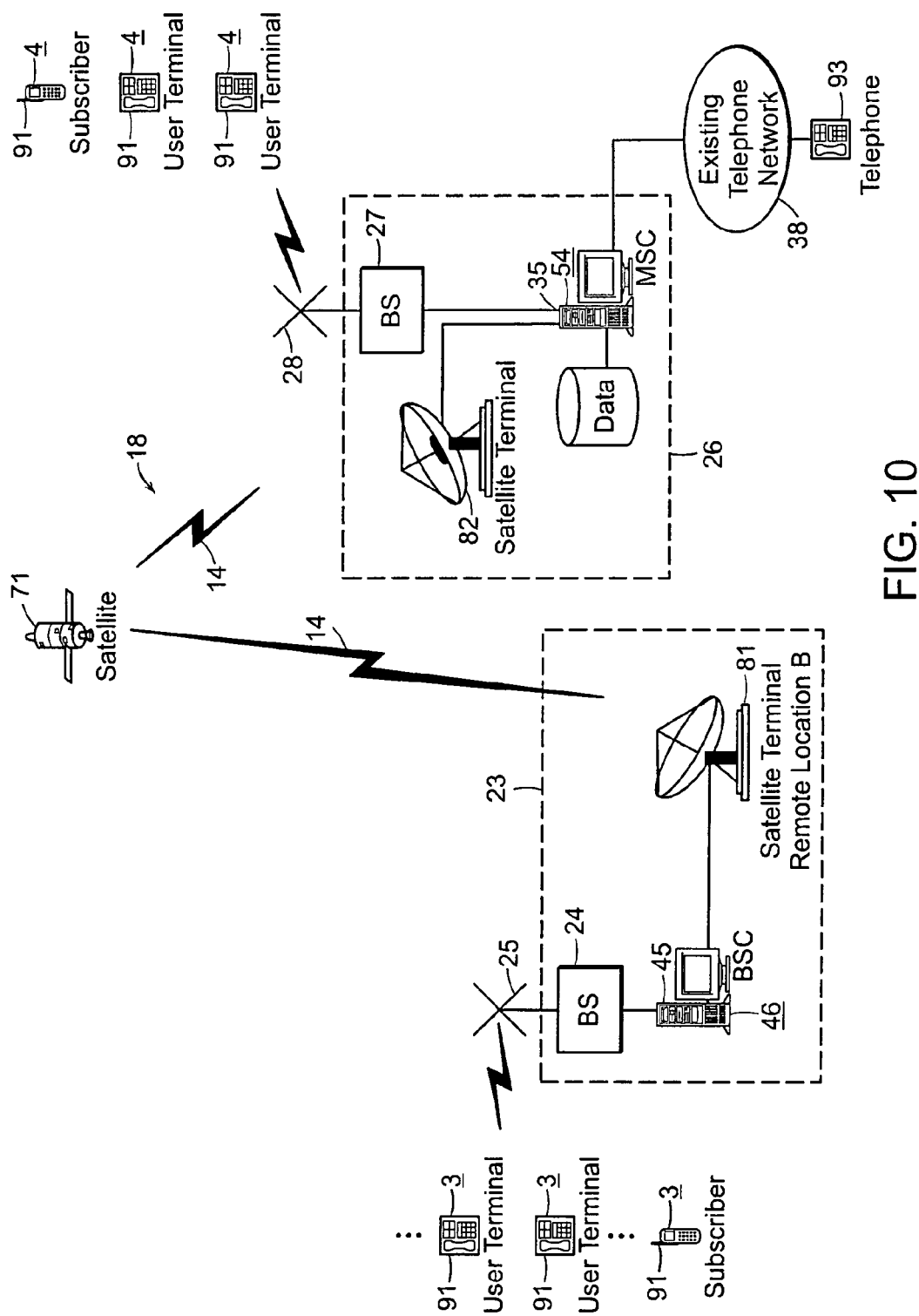
FIG. 10 is a schematic diagram of a distributed cellular network, according to still another aspect of the disclosure.

In still another embodiment, as shown in FIG. 10, a distributed cellular network 18 is provided for enabling calls between the first cellular telephone subscriber at the first remote location and the second cellular telephone subscriber at the first remote location. As before, one or more global communications satellites are positioned and adapted for receiving and relaying packet data communications encapsulating cellular telephone communications. The first station is located in the first remote geographic region, and includes the first base station having mobile wireless links to the plurality of subscribers of cellular telephone services in the first region, the first satellite communications terminal for communicating with the satellite from the first region, and the first base station controller with programming for controlling the first base station, and the first user terminal. Similarly, the second station is located in the first remote geographic region. The second station has the second satellite communications terminal for communicating with the satellite from the second region, and the mobile switching center is provided with the call processor for handling cellular telephone call switching between the first and second base stations. Last, the packet data network is used between the satellite and satellite communications terminals for interactive data communications throughout the network.

As provided with other embodiments set forth herein, the foregoing arrangement may similarly utilize a base station controller with the first base station with programming for controlling the first and second base stations, or a base station controller with the second base station with programming for controlling the first and second base stations. In yet a further arrangement, each of the first, second and third base stations is provided with a base station controller with programming for controlling the first and second base stations in the event of failure of one or more of the base station controllers of the other base stations.

Moreover, while the network and method of the disclosure have been shown and described as having one base station controller associated with a particular remote location or at multiple remote locations, it is understood that multiple base station controllers may be utilized at a single remote location. Likewise, multiple base station controllers may be installed at multiple remote locations. In either case, only one mobile switching center may be needed for operation, within the spirit and scope of the disclosure.

Now with respect to other arrangements made possible through implementation of the disclosure, a distributed cellular network is provided for enabling calls between third party 1, e.g., outside the network, and cellular telephone subscriber 2 at a selected remote location. Again, the network has one or more global communications satellites positioned and adapted for receiving and relaying packet data communications encapsulating cellular telephone communications. Also provided is the first station located in the first remote geographic region. The first station includes the first base station having mobile wireless links to the plurality of subscribers of cellular telephone services in the first region, the first satellite communications terminal for communicating with the satellite from the first region, and the first user terminal. The second station is located in the second remote geographic region, the second station including the second base station having mobile wireless links to the plurality of subscribers of cellular telephone services in the second region. The second station additionally has the second satellite communications terminal for communicating with the satellite from the second region, and the second user terminal. Similarly, the third station is located in the third remote geographic region. The third station includes the third satellite communications terminal for communicating with the satellite from the third region.

Figure 11:
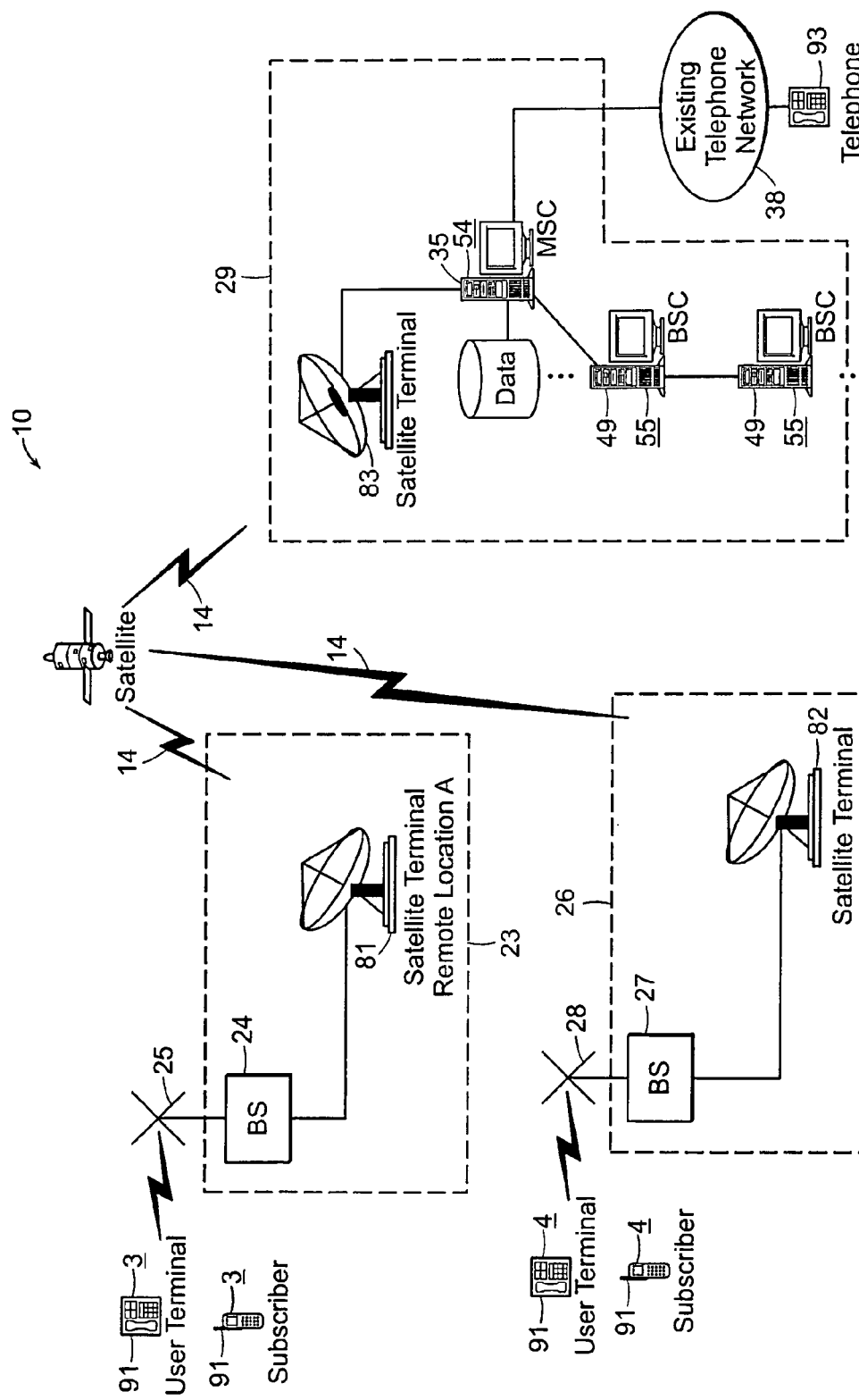
FIG. 11 is a schematic diagram of a distributed cellular network, in accordance with yet another aspect of the disclosure.

Distinguishing this embodiment from the prior embodiments, and as shown generally in FIG. 11, is that the third station is provided with a plurality of base station controllers 49 with programming 55 for controlling the first and second base stations. Another difference is the provision of a single mobile switching center 35 with call processor 54 for handling cellular telephone call switching between the first and second base stations. As with certain of the other embodiments, however, a land based telephone network, and/or wireline and/or other cellular telephone network(s), is utilized, linked remotely and/or locally to the mobile switching center and having at least one telephone for enabling the third party to place a call to the subscriber. Finally, as before, a packet data network between the satellite and satellite communications terminals facilitates interactive data communications throughout the cellular network.

Alternatively or concurrently therewith, the first station is additionally provided with one or more first base station controllers with programming for controlling the first base station, and the second station includes one or more second base station controllers with programming for controlling the second base station, and the second user terminal. While the third station of this alternative arrangement utilizes a single mobile switching center having the call processor for handling cellular telephone call switching between the first and second base station, it need not have one or more base station controllers for controlling the first and second base stations.

In another alternative embodiment, the second station comprises the second base station with mobile wireless links to the plurality of subscribers of cellular telephone services in the second region, the second satellite communications terminal for communicating with the satellite from the second region, one or more second base station controllers with programming for controlling the first and second base stations, and the second user terminal. The third station, according to this embodiment, utilizes a single mobile switching center having the call processor for handling cellular telephone call switching between the first and second base station, but neither the first nor the third stations require one or more base station controllers for controlling the first base station, the second base station, or both the first and second base stations.

Similarly, according to yet another embodiment, the first base station instead has mobile wireless links to the plurality of subscribers of cellular telephone services in the first region, the first satellite communications terminal for communicating with the satellite from the first region, one or more first base station controllers 45 with programming 46 (See FIG. 4) for controlling the first base station, and the first user terminal. The second base station instead has non-mobile wireline links to a plurality of subscribers 5 of wireline telephone services in the second region, the second satellite communications terminal for communicating with the satellite from the second region, one or more second base station controllers 47 with programming 48 (See FIG. 4 again) for controlling the second base station, and the second user terminal. In addition, third station 29 is located in a third remote geographic region. The third station, in turn, has the third satellite communications terminal for communicating with the satellite from the third region, and the single mobile switching center with call processor for handling cellular telephone call switching between the first and second base stations. As provided by such arrangement, the third station need not have program control over the first and second base stations.

As for the distributed cellular network which enables calls between the first cellular telephone subscriber at the first remote location and the second cellular telephone subscriber at the first remote location, the first base station is provided with mobile wireless links to the plurality of subscribers of cellular telephone services in the first region, the first satellite communications terminal for communicating with the satellite from the first region, a first user terminal, and base station controller 45 with programming 46 for controlling the first base station. The second station has the second satellite communications terminal for communicating with the satellite from the second region, and a single mobile switching center having call processor 54 for handling cellular telephone call switching between the first and second base stations.

Figure 6:
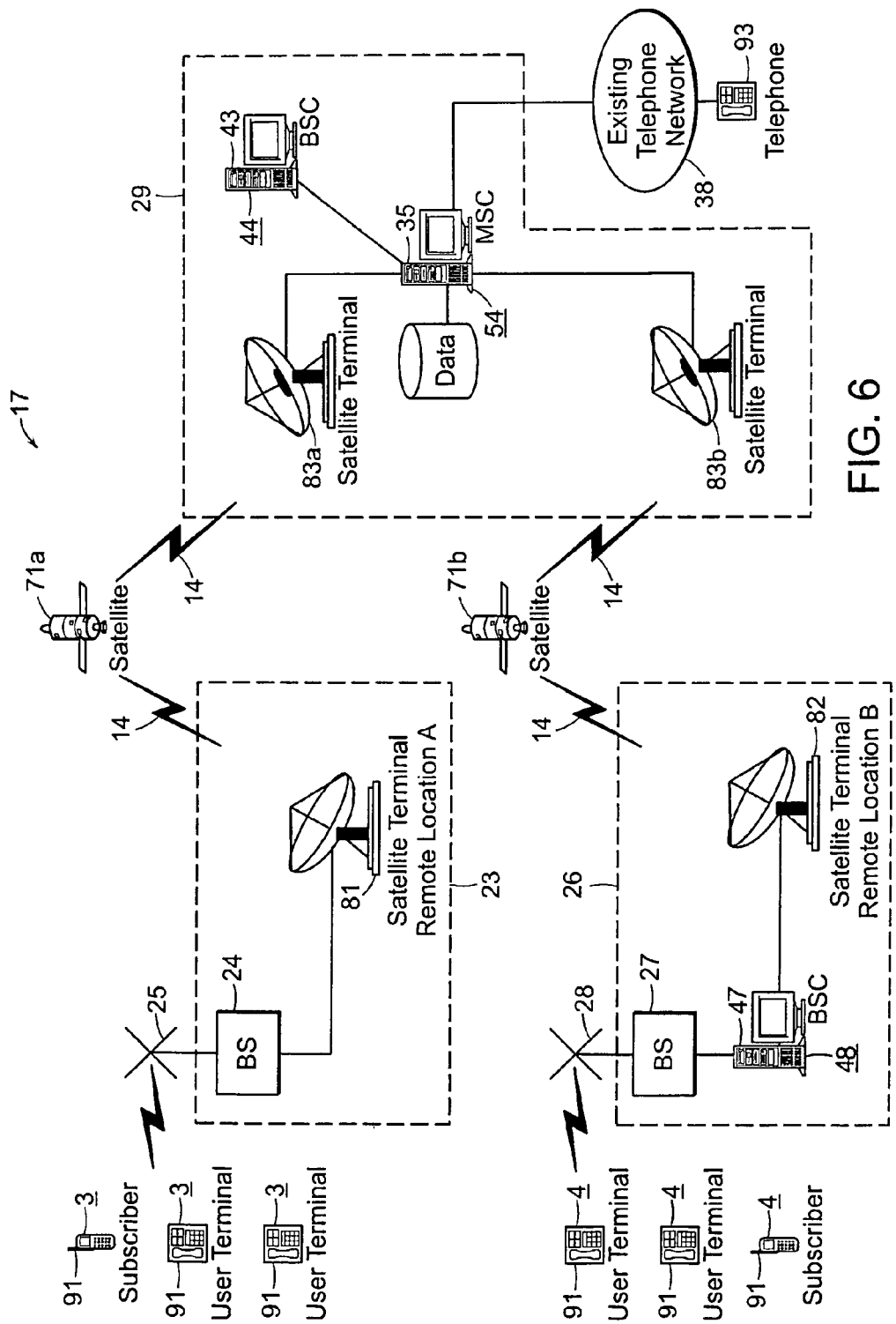
FIG. 6 is a schematic diagram of a distributed cellular network, in accordance with yet a further aspect of the disclosure.

With respect to the use of more than one global communications satellites, i.e., multiple satellite operation, according to various aspects of the disclosure, an arrangement of two (2) satellites 71*a* and 71*b* is illustrated in FIG. 6. The satellites are positioned and adapted for receiving and relaying packet data communications encapsulating cellular telephone communications 14. In the embodiment shown, distributed, satellite-based cellular network 17 is provided for enabling calls between first cellular telephone subscriber 3 at the first remote location and second cellular telephone subscriber 4 at the second remote location. First station 23 is located in the first remote geographic region, the first station including first base station 24 having mobile wireless links 25 to the plurality of first subscribers 3 of cellular telephone services in the first region, first satellite communications terminal 81 for communicating with the satellite from the first region, and first user terminal 91.

Also, second station 26 is provided and located in the second remote geographic region. The second station includes second base station 27 having mobile wireless links 28 to the plurality of second subscribers 4 of cellular telephone services in the second region, second satellite communications terminal 82 for communicating with the satellite from the second region, and second user terminal 91. Concurrently, the second station is further provided with second base station controller 47 with programming 48 for controlling the first and second base stations.

In addition, third station 29 is located in the third remote geographic region. The third station includes at least two third satellite communications terminals 83*a* and 83*b*, one for communicating with each of the satellites 71*a* and 7 lb. More particularly, when the first remote location and the second remote location are sufficiently close to one another as to be operable from, and communicable with, one another through their respective satellite communications terminals 81, 82 and 83*a*, the first and local satellite 71 *a* only is used. Thereby, one satellite 71 a is necessary for cellular telephone communications between first cellular telephone subscriber 3 at the first remote location and second cellular telephone subscriber 4 at the second remote location. On the other hand, should the second remote location be considerably distant from the first, namely, outside the communications footprint of a single satellite, the second and more distant satellite 71*b*, through satellite terminals 81, 82, 83*a* and 83*b*, is provided for enabling communications between first cellular telephone subscriber 3 at the first remote location and second cellular telephone subscriber 4 at the second remote location.

The third region also utilizes base station controller 43 with programming 44 for controlling the first and second base stations, and the mobile switching center having call processor 54 for handling cellular telephone call switching between the first and second base stations. Last, packet data network 14 is used between the satellites and the satellite communications terminals for interactive data communications throughout the network.

Figure 12:
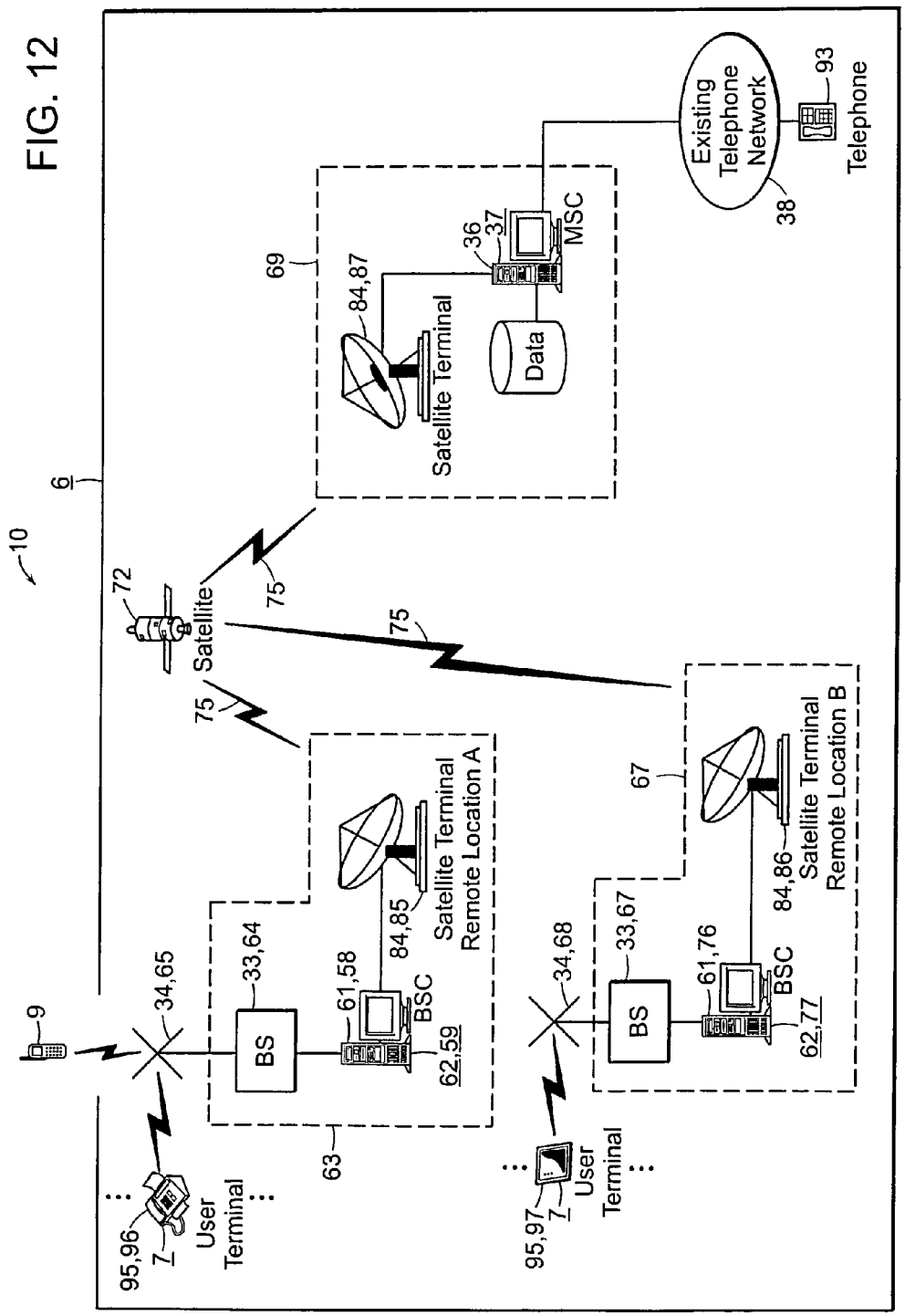
FIG. 12 is a schematic diagram of a distributed digital interactive communications network, according to one embodiment of the disclosure.

Turning now to even more diverse applications, according to the disclosure, a specific, illustrative distributed digital communications network 6 is provided for interactive communications, e.g., not only cellular telephone communications, but also wireless Internet access, digital television, and/or like multimedia services. As shown in FIG. 12, one or more global communications satellites 72 suitable for multimedia applications are positioned and adapted for receiving and relaying packet data communications encapsulating the interactive communications. A plurality of base stations 33 is provided, each being located in a selected remote geographic region and having mobile wireless links 34 to a plurality of subscribers 7 of multimedia communications services. Also provided is a plurality of satellite communications terminals 84, each being located in the selected remote geographic region and associated with one or more of base stations 33, for communicating with the satellite(s) from the region. The network additionally has a plurality of user terminals 95, each being located in the selected remote geographic region and associated with the base station(s) in the region. A multimedia base station controller 61 is located remotely from, or locally with, the base stations and has programming 62 for controlling the plurality of base stations. Furthermore, a multimedia mobile switching center 36 is located remotely from, or locally with, the base station controller and the base stations and has a digital communications signal processor 37 for handling digital signal switching between the plurality of base stations, wireline and/or other communications networks. Finally, a packet data network 75 between the satellite and satellite communications terminals facilitates interactive data communications throughout the distributed network.

Figure 13:
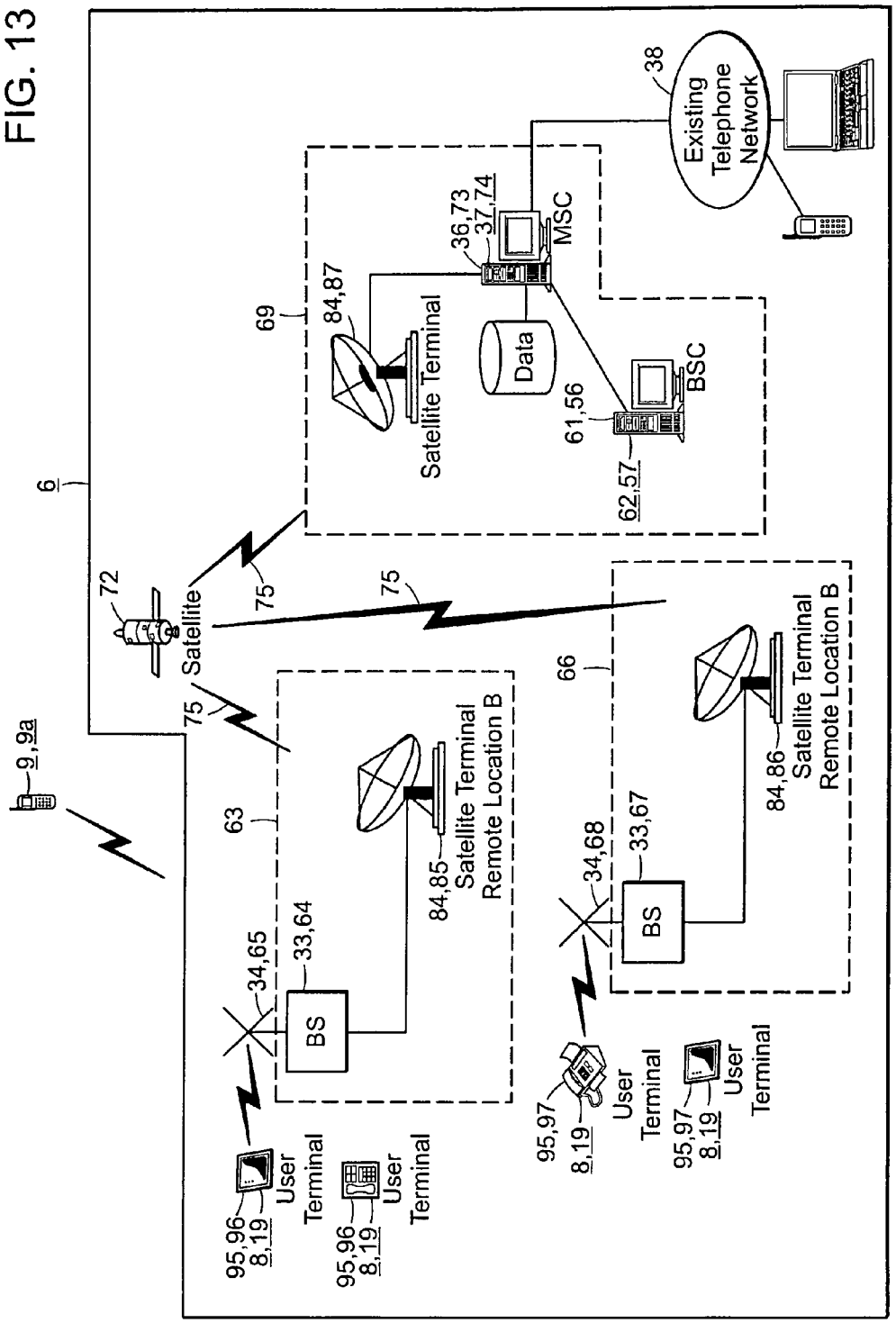
FIG. 13 is a schematic diagram of a distributed digital interactive communications network, according to another embodiment of the disclosure.

Alternatively or concurrently therewith, as illustrated in FIG. 13, the plurality of base stations has mobile wireless links to a plurality of subscribers of interactive digital communications services 8. In addition, the mobile switching center is positioned in proximity to the base station controller, and the digital communications signal processor handles digital signal switching between the plurality of base stations, wireline, and/or wireless communications networks.

In accordance with a further aspect of the disclosure, the distributed digital communications network enables interactive communications, e.g., cellular, wireless Internet access, digital television, and/or like multimedia services, between third party subscriber 9 outside the network to first interactive digital communications services, and a subscriber 19 (see FIG. 13) to first or second interactive digital communications services at a selected remote location. Again, the network comprises one or more global communications satellites positioned and adapted for receiving and relaying packet data communications encapsulating the interactive communications. A first station 63 is located in the first remote geographic region, the first station including a first base station 64 having mobile wireless links 65 to the plurality of subscribers to first interactive digital communications services in the first region, a first satellite communications terminal 85 for communicating with the satellite from the first region, and a first user terminal 96. Likewise, a second station 66 is located in the second remote geographic region, the second station including a second base station 67 having mobile wireless links 68 to the plurality of subscribers to first or second interactive digital communications services in the second region, a second satellite communications terminal 86 for communicating with the satellite from the second region, and a second user terminal 97. In addition, a third station 69 is located in the third remote geographic region. The third station includes a third satellite communications terminal 87 for communicating with the satellite from the third region, a multi-media base station controller 56 with programming 57 for controlling the first and second base stations, and a mobile multimedia switching center 73 having a digital communications signal processor 74 for handling digital signal switching between the first and second base stations. A land based, wireline communications network 38 and/or one or more selected wireless communications network(s) is/are linked remotely and/or locally to the mobile switching center. The network(s) have at least one device 98 for enabling the third party to transmit a communications signal to the subscriber. As before, the packet data network is positioned between the satellite and satellite communications terminals for interactive data communications throughout the distributed network.

In the alternative, and as set forth in FIG. 12, the first station instead has the mobile wireless links to a plurality of subscribers to first or second interactive digital communications services in the first region, the first satellite communications terminal for communicating with the satellite from the first region, a first multimedia base station controller 58 with programming 59 for controlling the first base station, and the first user terminal. The base station has mobile wireless links to a plurality of subscribers to second interactive digital communications services in the second region, the second satellite communications terminal for communicating with the satellite from the second region, a second multimedia base station controller 76 with programming 77 for controlling the second base station, and the second user terminal. Moreover, the third station includes third satellite communications terminal 87 for communicating with the satellite from the third region. It also has the mobile switching center with digital communications signal processor for handling digital signal switching between the first and second base station, but need not have a multimedia base station controller with programming for controlling the first and/or second base stations.

In accordance with another alternative embodiment of the disclosure is a distributed digital communications network for enabling interactive communications, e.g., cellular telephone, wireless Internet access, digital television, and/or like multimedia services, between third party 9 outside the network having first interactive digital communications services, and a subscriber 9a (see FIG. 13) to second interactive digital communications services at a selected remote location. As above, the network includes the one or more global communications satellites positioned and adapted for receiving and relaying packet data communications encapsulating the interactive communications. The first station is located in the first remote geographic region, and includes the first base station having mobile wireless links to the plurality of subscribers to first interactive digital communications services in the first region, the first satellite communications terminal for communicating with the satellite from the first region, and the first user terminal. Similarly, the second station is located in the second remote geographic region. The second station includes the second base station having mobile wireless links to the plurality of subscribers to second interactive digital communications services in the second region, the second satellite communications terminal for communicating with the satellite from the second region, a base station controller 78 with programming 79 for controlling the first and second base stations, and the second user terminal. In addition, the third station is located in the third remote geographic region, the third station including the third satellite communications terminal for communicating with the satellite from the third region, and the mobile switching center with digital communications signal processor for handling digital signal switching between the first and second base stations. Also provided is a third party, wireless and/or wireline-based, interactive communications network 39 linked remotely and/or locally to the mobile switching center. As with the above-described embodiments, the network has at least one device for enabling the third party to transmit a communications signal to the subscriber, and the packet data network is positioned between the satellite and satellite communications terminals for interactive data communications throughout the distributed network. An arrangement of this general description is shown, for instance, in FIG. 15.

Figure 16:
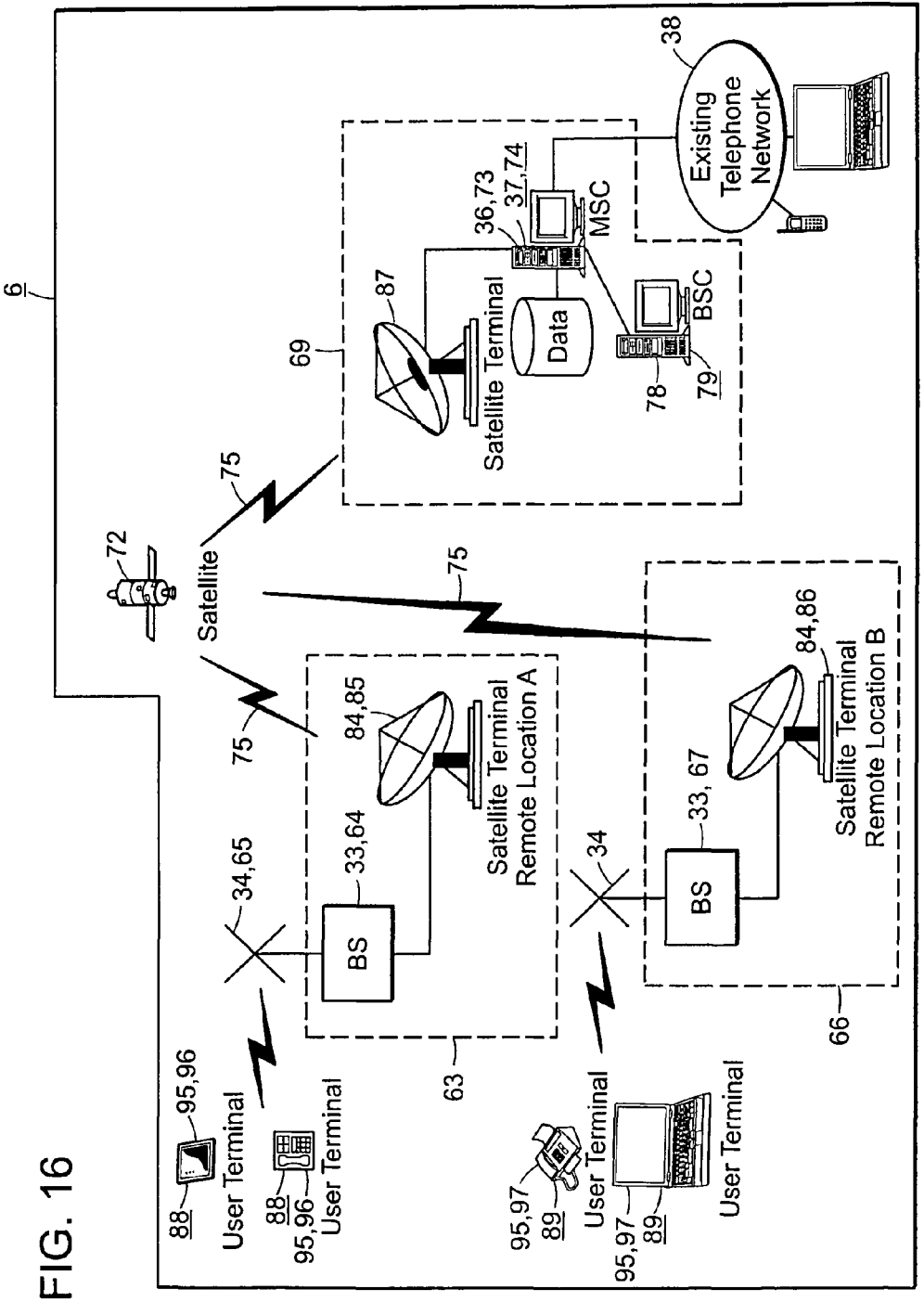
FIG. 16 is a schematic diagram of a distributed digital interactive communications network, according to yet another embodiment of the disclosure.
Figure 17:
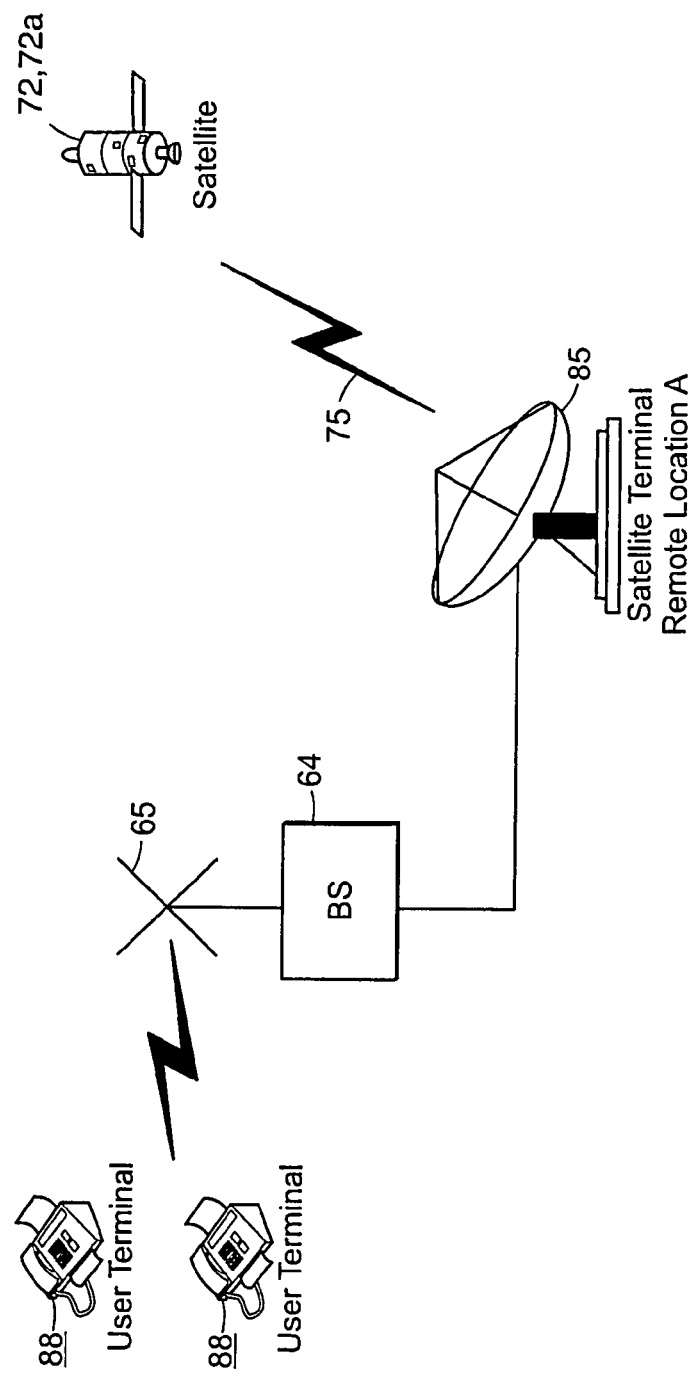
FIG. 17 is a schematic diagram of a distributed digital interactive communications network, in accordance with yet a further aspect of the disclosure.

Yet a further arrangement for providing digital multimedia services, set forth in FIG. 16, relates to a distributed digital communications network for enabling interactive communications between a first interactive digital communications services subscriber 88 at a first remote location and a second interactive digital communications services subscriber 89 at a second remote location. First station 63 located in the first remote geographic region includes first base station 64 having mobile wireless links to the plurality of subscribers 88 (see also FIG. 17) to first interactive digital communications services in the first region, first satellite communications terminal 85 for communicating with the satellite from the first region, and first user terminal 96. Second station 66 located in the second remote geographic region includes second base station 67 having mobile wireless links to a plurality to subscribers 89 of the second interactive digital communications services in the second region, second satellite communications terminal 86 for communicating with the satellite from the second region, and second user terminal 97. Additionally, third station 69 is located in a third remote geographic region, the third station including third satellite communications terminal 87 for communicating with the satellite from the third region, a base station controller 78 with programming 79 for controlling the first and second base stations, and the mobile switching center with digital communications signal processor for handling digital signal switching between the first and second base station.

Figure 14:
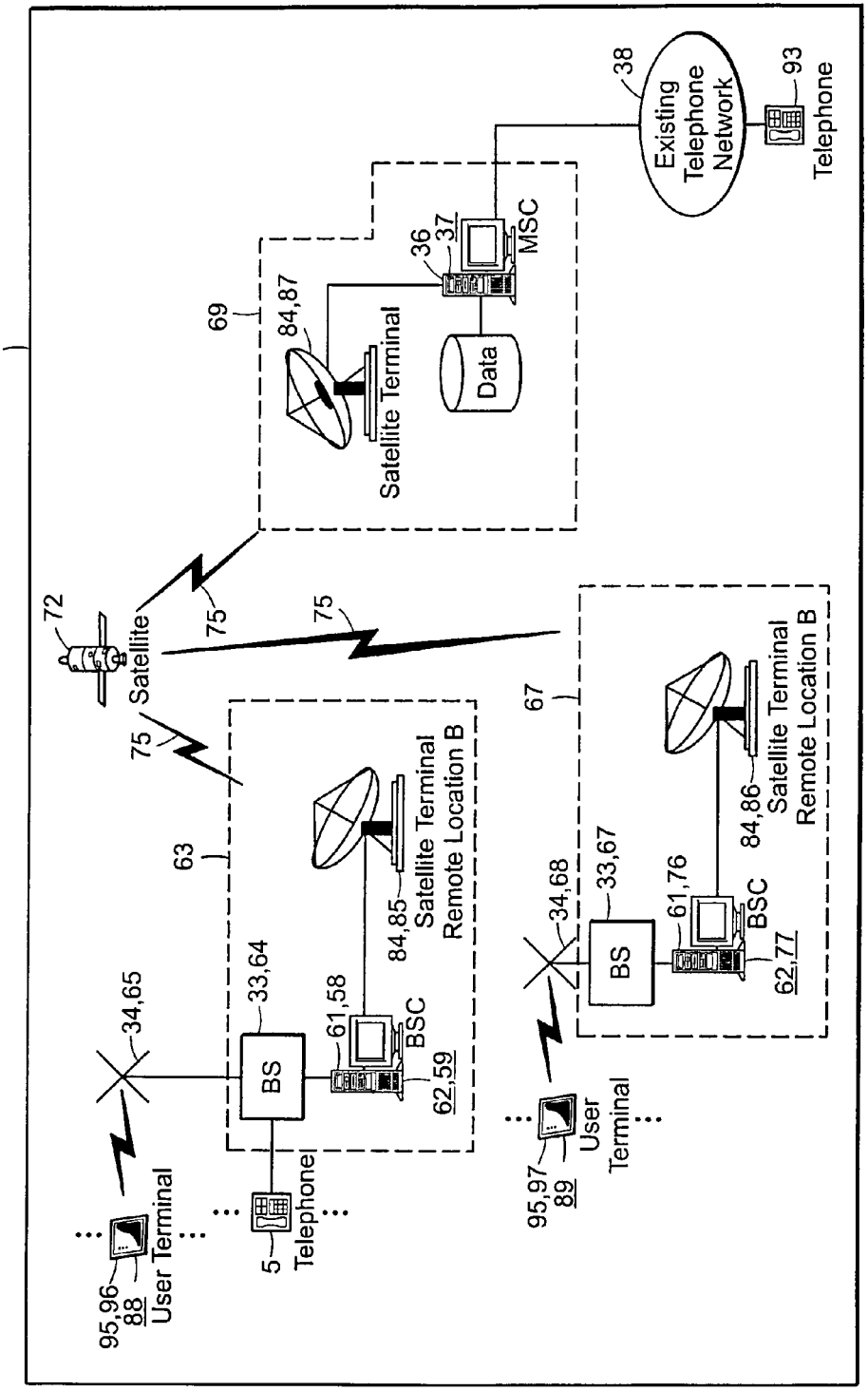
FIG. 14 is a schematic diagram of a distributed digital interactive communications network, according to a further embodiment of the disclosure.
Figure 15:
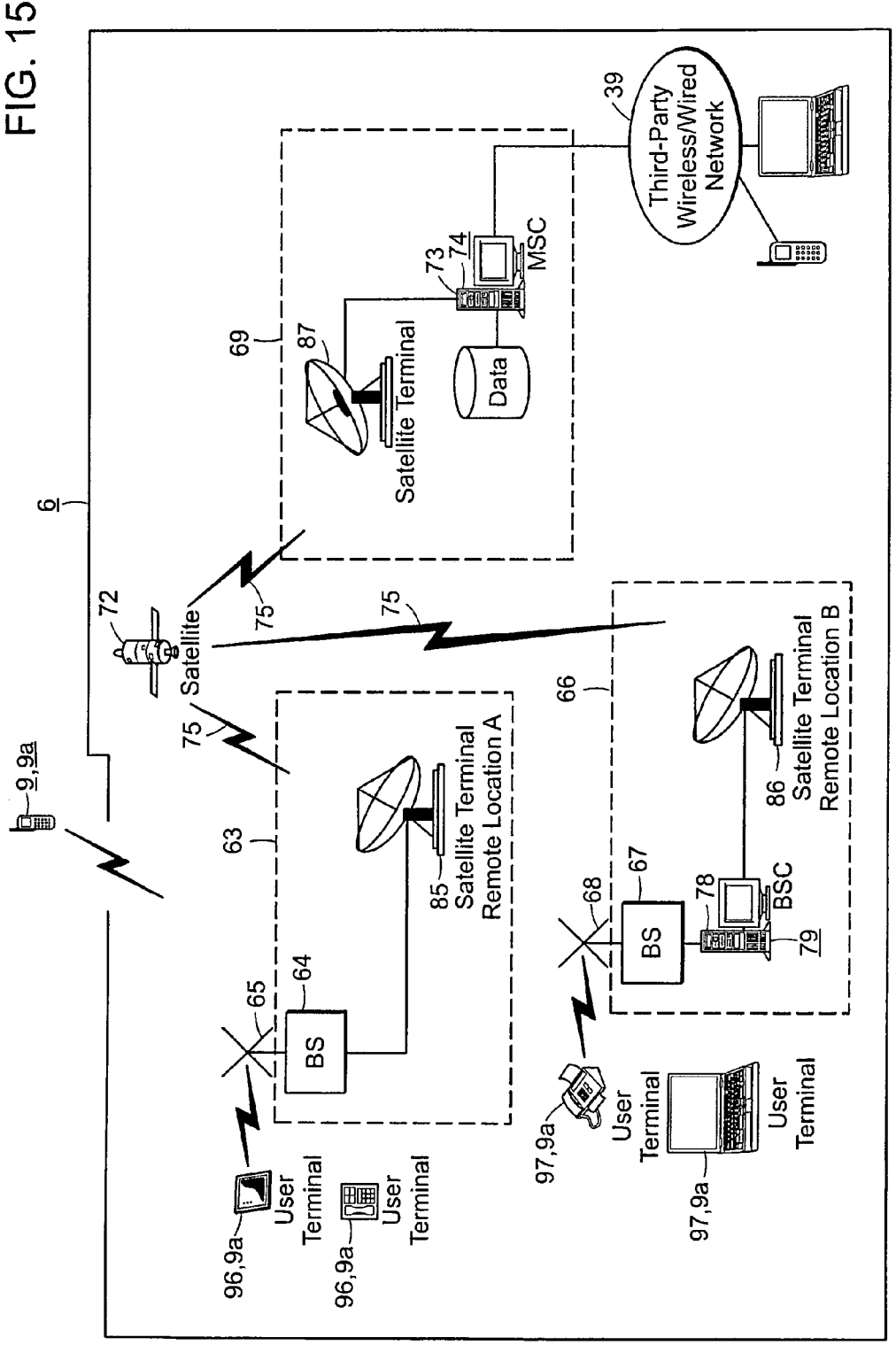
FIG. 15 is a schematic diagram of a distributed digital interactive communications network, in accordance with still another embodiment of the disclosure.

Alternatively, as provided in FIG. 14, the first base station has the first base station controller with programming for controlling the first base station, and the second base station has the second base station controller with programming for controlling the second base station, the third station need not having a base station controller for controlling the first base station, the second base station, or both the first and second base stations.

As in the previously described scenario regarding cellular telephone applications, the foregoing distributed digital communications network is suitable for enabling interactive communications between the first digital communications services subscriber at the first remote location and the second digital communications services subscriber at the first remote location. In such arrangement, the first base station has a first base station controller with programming for controlling the first base station only. This aspect of the disclosure is illustrated also in FIG. 16. Neither the second station nor the third need be equipped with base station controllers.

Alternatively or concurrently therewith, or with any of the other foregoing aspects of the disclosure and any of those which follow, mobile wireless links of the first and/or second base stations to one or more subscribers to communications services in the first and/or second region(s) may include suitable links for interactive transmissions. Moreover, and further alternatively or concurrently, each of the first, second and/or third stations may include a plurality of base station controllers with programming like that of the prior embodiments for controlling the first and second base stations, and for handling switching from one base station controller to the other upon failure of the one or more operative station controllers.

Figure 18:
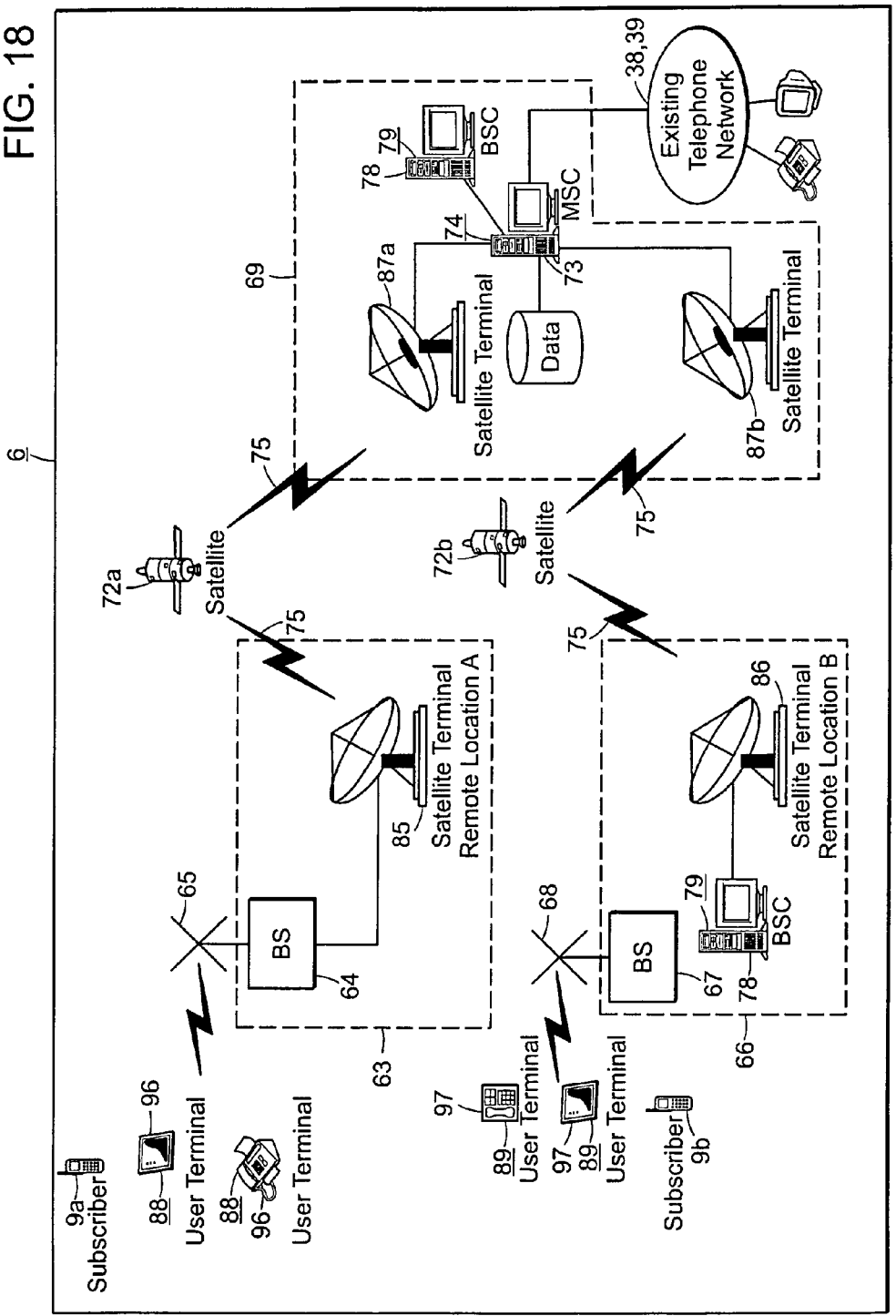
FIG. 18 is a schematic diagram of a distributed digital interactive communications network, according to another aspect of the disclosure.

In the context of multiple satellite operation with digital interactive multimedia communications services, according to various aspects of the disclosure, an arrangement of two (2) satellites 72a and 72b is shown in FIG. 18. The satellites are suitably positioned and adapted for receiving and relaying packet data communications encapsulating cellular telephone communications 75. In the arrangement shown, distributed, satellite-based cellular network 6 is provided for enabling calls between first cellular telephone subscriber 9a at the first remote location and second cellular telephone subscriber 9b at the second remote location. First station 63 is located in the first remote geographic region, the first station including first base station 64 having mobile wireless links 65 to the plurality of first subscribers 9a of cellular telephone services in the first region, first satellite communications terminal 85 for communicating with the satellite from the first region, and first user terminal 96.

In addition, second station 66 is provided and located in the second remote geographic region. The second station comprises second base station 67 with mobile wireless links 68 to the plurality of second subscribers 9b of cellular telephone services in the second region, second satellite communications terminal 86 for communicating with the satellite from the second region, and second user terminal 97. The second station is further provided with second base station controller 78 with programming 79 for controlling the first and second base stations.

Moreover, third station 69 is located in the third remote geographic region. The third station includes at least two third satellite communications terminals 87a and 87b, one for communicating with each of the satellites 72a and 72b. More specifically, when the first remote location and the second remote location are sufficiently close to one another as to be operable from, and communicable with, one another through their respective satellite communications terminals 85, 86 and 87a, the first and local satellite 72a is used. Accordingly, only one satellite 72a is necessary for cellular telephone communications between first cellular telephone subscriber 9a at the first remote location and second cellular telephone subscriber 9b at the second remote location. On the other hand, should the second remote location be considerably distant from the first, namely, outside the communications footprint of a single satellite, the second and more distant satellite 72b, through satellite terminals 85, 86, 87a and 87b, is provided for enabling communications between first cellular telephone subscriber 9a at the first remote location and second cellular telephone subscriber 9b at the second remote location.

The third region, in addition, utilizes base station controller 78 with programming 79 for controlling the first and second base stations, and mobile switching center 73 having a call processor 74 for handling cellular telephone call switching between the first and second base stations. Last, packet data network 75 is used between the satellites and the satellite communications terminals for interactive data communications throughout the network.

Overall, there are at least several techniques and technologies for implementing satellite communications in the context of this disclosure. Preferably, the network and method of the disclosure are implemented using mesh TDMA technology and/or other common implementations (e.g., hub and remote). Mesh TDMA technology has been found particularly well-suited for this application because it not only enables single satellite hop communications between all network nodes, but also dynamic sharing of bandwidth among all communications sites. This results in reduced delay, higher quality voice communications as well as bandwidth savings and simplified bandwidth operations management. Exemplary mesh TDMA products include, but are not limited to, LINKWAY, a product of ViaSat, Inc.

EXAMPLE

Figure 19:
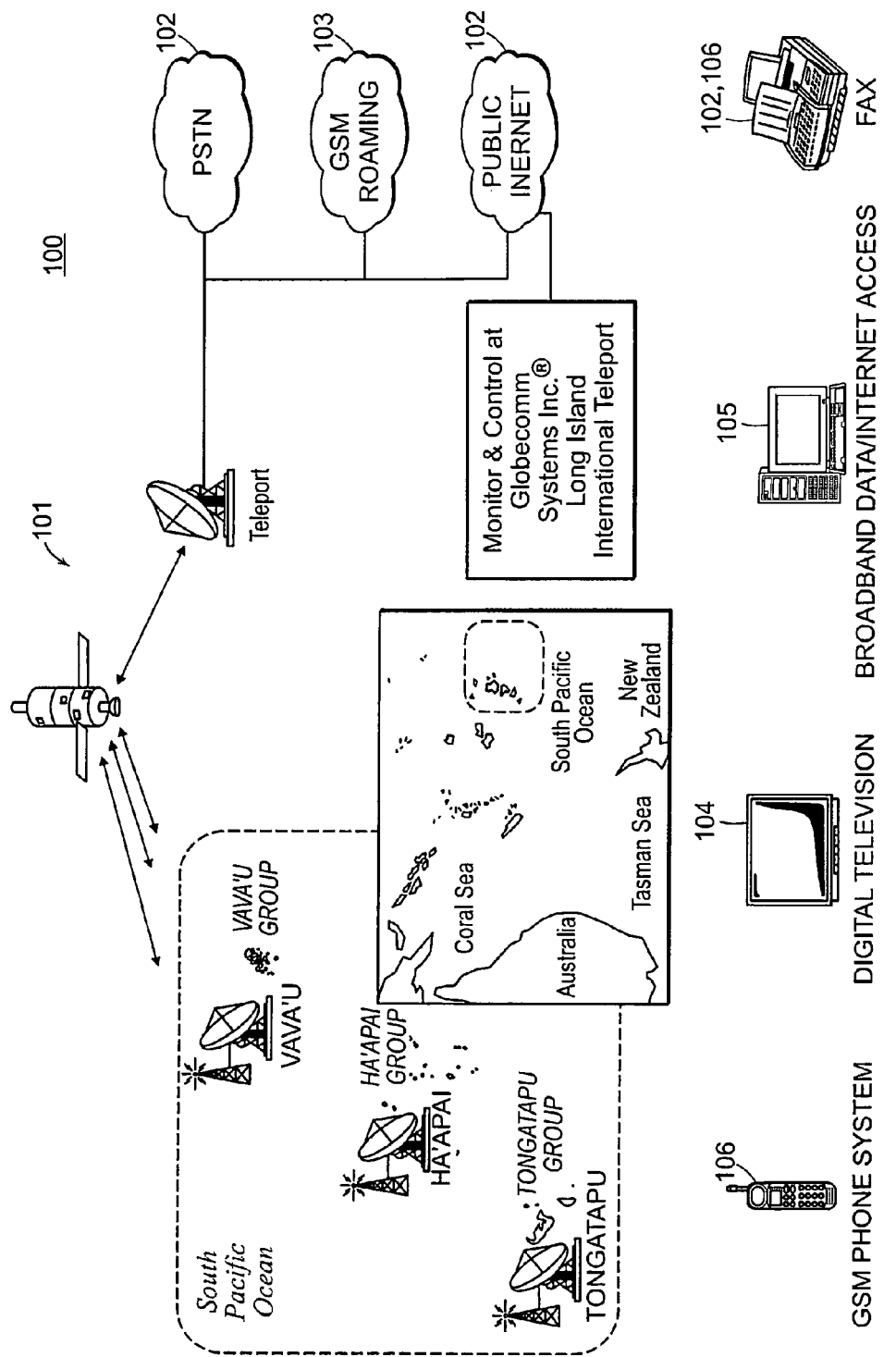
FIG. 19 is a schematic diagram of a full spectrum wireless service VSAT-based network including on-demand satellite Internet Protocol (IP) trunking between disbursed geographic regions, a distributed global system for mobile communications (GSM) cellular network with international roaming, according to the disclosure, digital television distribution, and broadband wireless data delivery.

A network 100, according to one embodiment, is implemented for servicing a relatively large group of islands in a remote ocean region, such as the South Pacific. The group comprises over 100 islands, 45 of which are inhabited by approximately 100,000 people. An additional 100,000 people, who are former residents of the islands, now live abroad (i.e., as expatriates). The main island has a population of approximately 66,660 people with about 33,340 additional inhabitants occupying the other 44 islands. The islands have approximately 7000 wired phone lines. The network has components, as described above, including Internet Protocol based transport. The network is also wireless, distributed and utilizes a hub based in North America. A multi-service Internet Protocol network of this general description is shown, for instance, in FIG. 19. Specifically, FIG. 19 illustrates schematically a full spectrum, wireless service, VSAT-based system or network 101 including on-demand satellite Internet Protocol trunking 102 between disbursed geographic regions, a distributed global system for mobile communications (GSM) cellular network 106 with international roaming 103, digital television distribution services 104, and broadband wireless data delivery services 105, available to all consumers and enterprises throughout the island region. In this manner, a network according to the disclosure offers the following new wireless services to the islands: GSM telephone 106 (mobile and fixed), digital television 104, Internet access 102 and broadband data services 105.

By the distributed architecture of the disclosure, the GSM elements may be located where they best suit the requirements of the network. This means that, in the example above, the mobile switching center may be located in any city on the North American continent or elsewhere within the coverage area of the satellite (or satellites) being utilized, as long as suitable base station elements are provided on each of the serviced islands. (See FIG. 25) In this manner, alternate architectures are also made possible within the same network.

Through use of a satellite transmission medium, the network of the disclosure advantageously enables delivery of communications services anywhere within a selected satellite footprint (e.g., in the above example, the remote ocean region). Since distance alone is not a factor, the full spectrum of wireless services may now be expanded incrementally throughout the coverage area, without added delivery costs associated with conventional arrangements where incremental expansion requires more hardware.

INTERNET PROTOCOL (IP) TRANSPORT OVER SATELLITE

Internet Protocol transport over satellite, in accordance with the disclosure, allows a selected satellite communications backbone to be used for providing all services in Internet Protocol format. Internet Protocol format is particularly beneficial because it not only allows the use of standard open protocol equipment to create service offering, but also creates, in combination with the Internet, a fully meshed network that permits single hop communications between any two network nodes. In simultaneously also providing bandwidth-on-demand (or BOD) service, satellite bandwidth is readily shared between the various services offered over the network including, but not limited to, GSM telephone (mobile and fixed), digital television, Internet access and/or broadband data services.

GLOBAL SYSTEM FOR MOBILE COMMUNICATIONS (GSM) OVER INTERNET PROTOCOL (IP) OVER SATELLITE

Another distinctive characteristic of the disclosure is the provision of GSM over Internet Protocol over satellite. This feature provides call processing that is both distributed and intelligent. More specifically, as the voice path requires no satellite bandwidth, the network of the disclosure enables any local call(s) to connect locally. Like Internet Protocol transport over satellite as referenced above, GSM over Internet Protocol over satellite utilizes a mesh network that allows all long distance calls (e.g., off island calls) to occur in a single hop. GSM over Internet Protocol over satellite additionally permits the GSM transport bandwidth to be shared with other Internet Protocol services. In this manner, virtually all value added services are made possible over the same network as cellular telephone communications including, but not limited to, short message service (SMS), fax and data/Internet access.

DIGITAL TELEVISION SERVICES

In the context of providing digital television services, it is preferred that the network of the disclosure provide terrestrial broadcast via DVB-T Standard, transmission in VHF and/or UHF band, and/or utilize a television standard such as PAL and/or NTSC. In addition, DVB-T preferably allows up to 10 television programs per terrestrial channel (or approximately 22 Mbps). Since Internet Protocol data can also be multiplexed into DVB transmission to create high speed Internet Protocol broadcast services, the DVB-T channel is considered especially beneficial in occupying the same general bandwidth as a single analog channel (6-8 MHz).

As for television distribution, the disclosure advantageously utilizes conventional distribution techniques including, but not limited to, local distribution via terrestrial transmitter, distribution that is readily extendable via terrestrial microwave repeaters, and regional distribution desirably operated via satellite to remote transmitters with conventional programming and conditional access controlled from a main broadcast center.

BROADBAND FIXED WIRELESS NETWORK

According to one aspect of the disclosure, a broadband fixed wireless network of an Internet Protocol based point-to-multipoint wireless distribution network is provided to fixed subscribers. The wireless network is preferably based on cable modem technology, is available in numerous frequency bands (e.g., MMDS, LMDS, 3.5 GHz, 10.5 GHz, and UHF), and provides high speed IP delivery (up to 30 Mbps/5 Mbps downstream/upstream per channel). Optionally, it is desired that the wireless network have suitable capability for common applications including enterprise data services, video conferencing, and telemedicine.

NETWORK SWITCHING SUBSYSTEM

Turning now to another characteristic of the disclosure, a single network switching subsystem (NSS) and operational support subsystem (OSS), also known as NSS/OSS, is preferably deployed at a hub location 107. From this location, Internet Protocol communications links are established with radio access networks. A system of this general description, in block diagram form, is shown, for instance, in FIG. 20 and, even more generally, in FIG. 26. Specifically, the diagram represents a system 108 for providing GSM cellular telephone service to select areas via satellite, i.e., a distributed GSM system, in accordance with the disclosure. The NSS/OSS desirably connects the hub location to virtually any number of radio access networks 109, 110 and 111 via Internet Protocol satellite connections. While these connections or links may also be established via leased wireline, fiber optic, cable or like media, satellite is considered to be the most reliable media for communications from the hub location. Each radio access network consists of the necessary equipment (e.g., base stations) for providing mobile telephone service in the selected local region. Optionally, the radio access network also provides an interface to other local wireline or wireless networks that may be present.

Once the link is in place, the network switching subsystem processes calls from, to and between the radio access networks. It is preferred that the network switching subsystem have intelligent call processing, i.e., desirably while call signaling goes to the network switching subsystem, the actual voice call is routed directly to its destination. For example, as a "local" call within a radio access network is switched locally, the voice path does not traverse the network switching subsystem nor does it make use of any Internet Protocol backbone bandwidth, the latter being of particular importance in restricted bandwidth applications such as satellite. As a result, this disclosure provides an extraordinarily high quality, low latency voice transmission.

Figure 20:
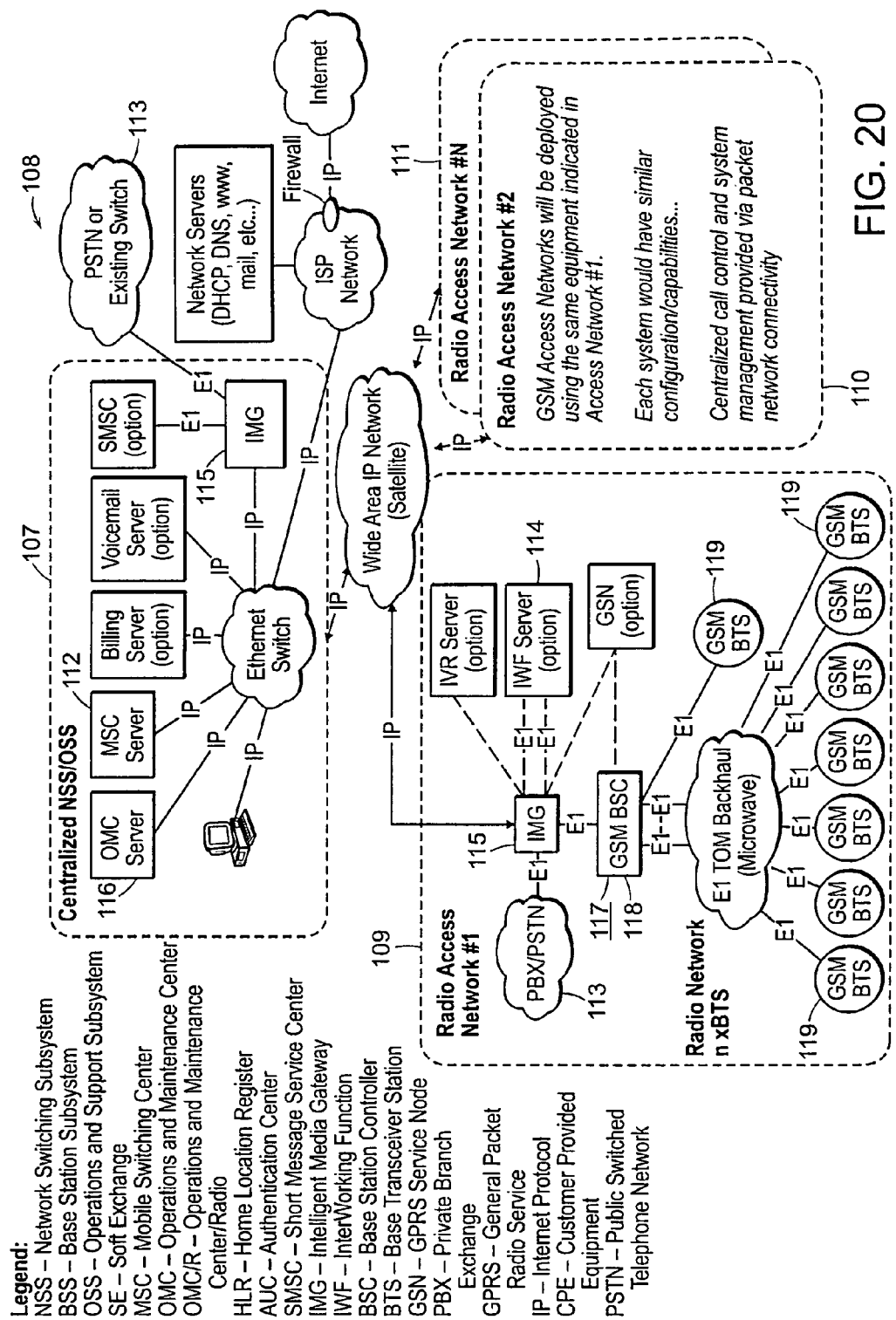
FIG. 20 is a network block diagram showing a system for providing GSM cellular telephone service to select areas via satellite, in accordance with the disclosure.
Figure 21:
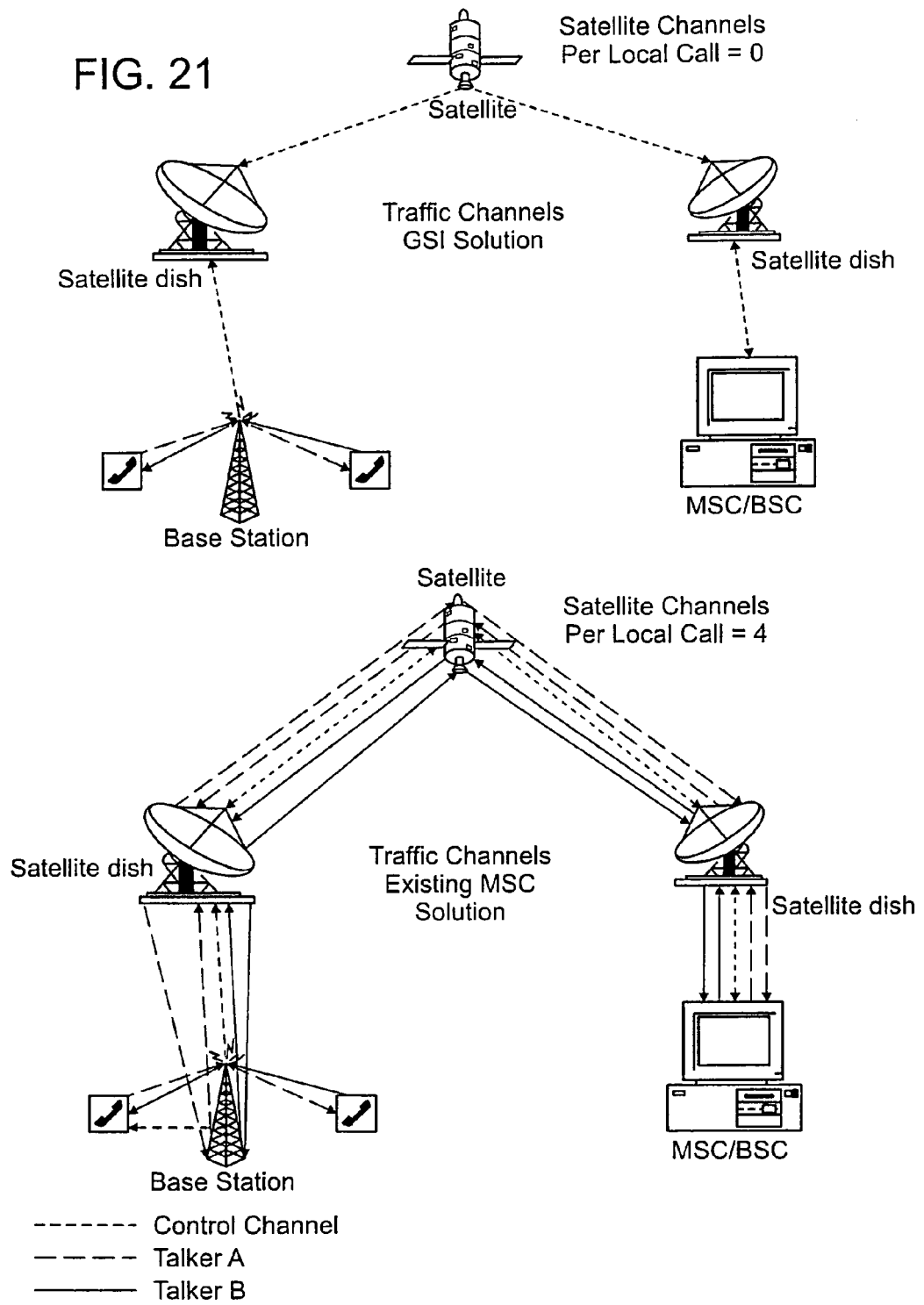
FIG. 21 is a schematic diagram showing traffic channels between system components according to the disclosure.
Figure 22:
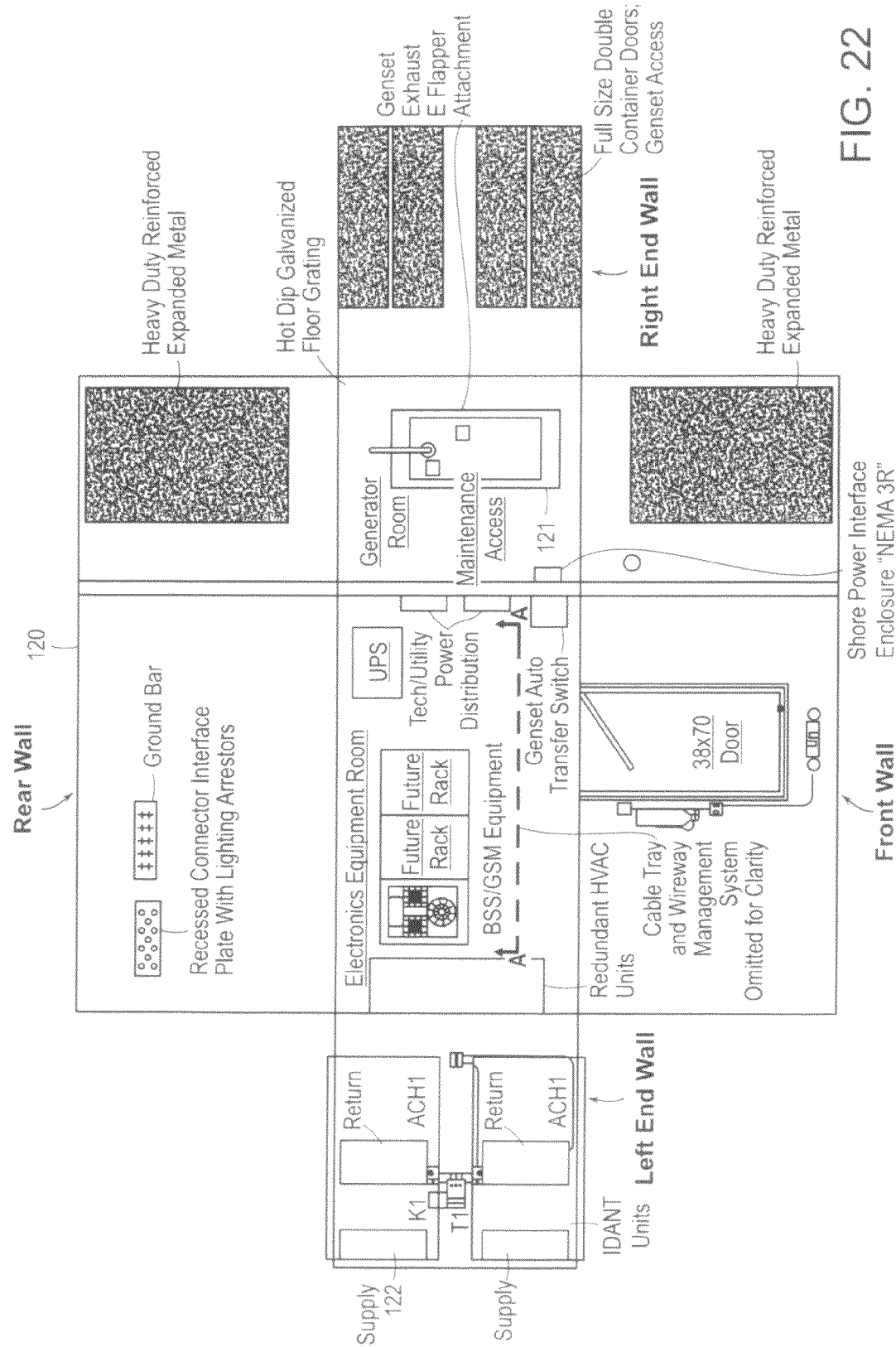
FIG. 22 shows a fully integrated containerized base station subsystem with associated power subsystems, according to one aspect of the disclosure.

As also shown in FIG. 20, the network switching subsystem comprises a number of elements, at the heart of which is a mobile switching center server 112 which performs GSM mobile switching center functions. The mobile switching center server provides MSC/VLR/HLR functionality to the network, and supports relatively important features of the network including, but not limited to, subscriber authentication, call processing, call control and elements of mobility management.

NETWORK SWITCHING SUBSYSTEM—LOCATION

In one embodiment, the network switching subsystem is desirably located at an operator's switching center for interfacing with an existing switching network, such as one of a conventional type. Alternatively, the network switching subsystem is located at a third party network operations and service center (e.g., a teleport). In this manner, the operator is provided with any of a number of value added services selected by him/her including, but not limited to, full GSM network operations, performance monitoring, billing, maintenance, equipment collocation, teleport services, a public switched telephone network (PSTN) 113 termination, and satellite bandwidth lease. By also utilizing third party network operations, facilities and services, the operator may reduce startup and in-country operational costs. This aspect of the disclosure is considered particularly advantageous for those operators offering service in rural and/or developing areas where the availability of qualified telecommunications resources is somewhat limited.

NETWORK SWITCHING SUBSYSTEM—EQUIPMENT AND TECHNOLOGY

The mobile switching center is typically based around the Sonata Soft Exchange (SE) platform, a software product of Telos Technology, Inc. The Sonata Soft Exchange is a full-featured, software based mobile network switch (or soft-switch). It is also a modular, scalable, and distributed switching platform based on Sun Scalable Processor Architecture (SPARC) communication servers and packet switching technology. The Sonata Soft Exchange utilizes a relatively powerful routing algorithm that conforms readily to regional or custom dialing plans, such plans being accommodated through configuration changes in the Soft Exchange platform. Hence, software upgrades and additional specialized hardware interface cards are not needed.

Furthermore, the Soft Exchange platform is a highly configurable call processing system employing state-of-the-art technologies such as high-speed processors, high capacity disk drives, and fast and dense telecommunications quality vocoders, resulting in a high call capacity with a relatively small system footprint. More specifically, it is designed to address distributed network requirements, and supports the key features of the network including subscriber authentication, call processing, call control and elements of mobility management. The Soft Exchange also offers a clear and future proof path for network expansion both in terms of network size and services. Further, use of such a mobile switching center enables distributed packet based cellular network operations/maintenance functions and value added services. These include billing, voicemail, and messaging functions, e.g., interworking function (IWF) 114 for fax and data, short message service (SMS), and general packet radio service (GPRS).

The mobile switching center is desirably packet based, according to various aspects of the disclosure. Generally speaking, a typical implementation of the packet data network uses an Internet Protocol format. Each remote location contains an Internet Protocol router configured for accepting and routing traffic between base station controllers/base stations/packet gateways and the satellite terminal. Routers, e.g., 7200 Series from Cisco Systems, Inc., are utilized. Specialized router configurations available on the Sonata Soft Exchange platform or from Cisco Systems, Inc. are used to properly route the traffic to its destination, to prioritize certain portions of the cellular network traffic to enable proper cellular network signaling and high quality of service (QOS), and for compressing certain traffic, as appropriate, in order to achieve maximum bandwidth efficiencies over satellite (a satellite network is inherently bandwidth limited since the bandwidth is a monthly recurring operational cost). These techniques also allow the Internet Protocol bandwidth to be shared with other independent services without reduction in service quality or decreased performance to the cellular network. Furthermore all traffic is packaged in optimum Internet Protocol format(s) for transmission over the satellite network.

INTELLIGENT MEDIA GATEWAY (IMG)

As additionally shown in FIG. 20, another element of the network switching subsystem, that works in conjunction with the mobile switching center server, is an intelligent media gateway (IMG) 115. The intelligent media gateway is a signaling and media gateway that provides a bridge from the packet based network to the public switched telephone network and SSN network. As a signaling gateway, it transports signaling messages to the mobile switching center using a standard SSN over Internet Protocol layer. In the context of GSM networks, GSM manufacturing application protocol (MAP) signaling is also used to support subscriber roaming. More particularly, when a mobile call signaling message arrives at the mobile switching center, a location update operation is performed to identify the subscriber. Applicable information relating to the subscriber is then stored. The mobile switching center directs the intelligent media gateway to switch the mobile call to the public switch telephone network and vocodes the associated Internet Protocol packet voice stream into 64 Kbps TDM format. Because the intelligent media gateway terminates connections, voice traffic need not traverse back to the mobile switching center, thereby leading to savings in backhaul costs. Stated differently, the network and method of the disclosure provide optimized Internet Protocol traffic for voice data. A comparison of traffic channels between system components, according to the disclosure, and those of conventional mobile switching center architectures is shown generally in FIG. 21.

OPERATIONS AND MAINTENANCE CENTER (OMC)

The network switching subsystem, in addition, has an operations and maintenance center (OMC) 116, as show in FIG. 20. The operations and maintenance center desirably comprises a server that provides centralized monitoring of network alarms and events, thereby allowing rapid isolation, diagnosis, and recovery of problems that can impact network services. The operations and maintenance center is an open, standards-based, and scalable element management system. Specifically, it provides one or more sets of forwarding interfaces for integrating fault, performance, configuration, and accounting capabilities with upstream back-office support systems, such as network management and network planning, and front-office support systems, for instance, customer relationship management, billing system, and work flow management. Operations and maintenance center system architecture complies with International Telecommunication Union—Telecommunications Management Network (ITU-TMN) and universal mobile telecommunications system third generation partnership project (UMTS 3GPP) standards for supporting future network evolution. It also resides in the element management layer of the ITU-TMN management system hierarchy for ready and concurrent operation.

BASE STATION SUBSYSTEM (BSS)

Yet another element of the network switching subsystem is a base station subsystem (BSS) 117. The base station subsystem includes base station controllers 118 and a base transceiver station 119, deployed at each of the radio access networks for providing the subscriber with radio access to the network. It is preferred that the base station controllers and base transceiver station elements be highly integrated with the Soft Exchange platform for providing cost effective radio service to the distributed networks. Optionally, the base station subsystem operates in at least three standard GSM bands including, but not limited to, 900 MHz, 1800 MHz and 1900 MHz. In accordance with various aspects of the disclosure, and as will be understood by those skilled in the art, choice of operating band is dependent upon licensing approval and frequency coordination. Additionally, it is desired that the radio access network include an intelligent media gateway capable of providing access to local landline facilities such as public switched telephone network or private branch exchange (PBX) as well as interface with the local base station controller.

For ease of deployment, support and logistics, a fully integrated containerized base station subsystem 120 is optionally provided. Such option may also include associated power subsystems such as a conventional diesel generator 121 and uninterruptible power supply (UPS) 122. These systems not only provide considerable simplification to site preparation, but also decrease installation time and reliance on local support. A containerized base station subsystem of this general description is shown, for example, in FIG. 22 including a base station subsystem shelter floor plan and interior foldout.

Finally, it is noted that conventional satellite links are used, as appropriate, to interconnect the radio access networks to the softswitch. Representative earth stations, such as those produced by Globecomm Systems, Inc. of Hauppauge, N.Y., are preferred for the hub station and Globecomm commercial terminal family (CTF) and commercial earth station (CES) product lines are also desired.

Preferably, a prepaid billing system, e.g., a full-featured mobile prepaid platform, is fully integrated with the softswitch platform, including real-time accounting, operator programmable rate plans, a variety of billing reports, and batch card generation for card printing.

Indicated below in TABLE I is a comparison of the effects of the satellite link "softswitch" to mobile switching centers of conventional network architectures. For each, examples are provided of the number of satellite voice channels required per type of call as well as the associated delay introduced into the voice path for these calls. Conventional architectures, it is noted, typically introduce a 500 ms delay in Abis signaling which impairs considerably the mobility of performance.

TABLE I

EFFECTS OF SATELLITE LINK

| | Softswitch Architecture | Traditional Mobile Switching Center Architecture |
|---|---|---|
| LOCAL CALLS | | |
| Satellite channels per call | 0 | 4 |
| Satellite delay (round trip) | 0 ms | 1000 ms |
| LONG DISTANCE CALLS | | |
| Satellite channels per call | 2 | 2 |
| Satellite delay (round trip) | 500 ms | 500 ms |

Conventional mobile switching center architectures typically require four (4) satellite voice channels, or two (2) full duplex satellite voice circuits, to complete a single local call (i.e., a call between two subscribers in the same local region), whereas the "softswitch" architecture of the disclosure requires none. This has a significant impact on the magnitude of satellite bandwidth required for the network. As satellite bandwidth is a recurring charge for network operation, operating costs upon expansions of the network are nominal or nonexistent.

Figure 23:
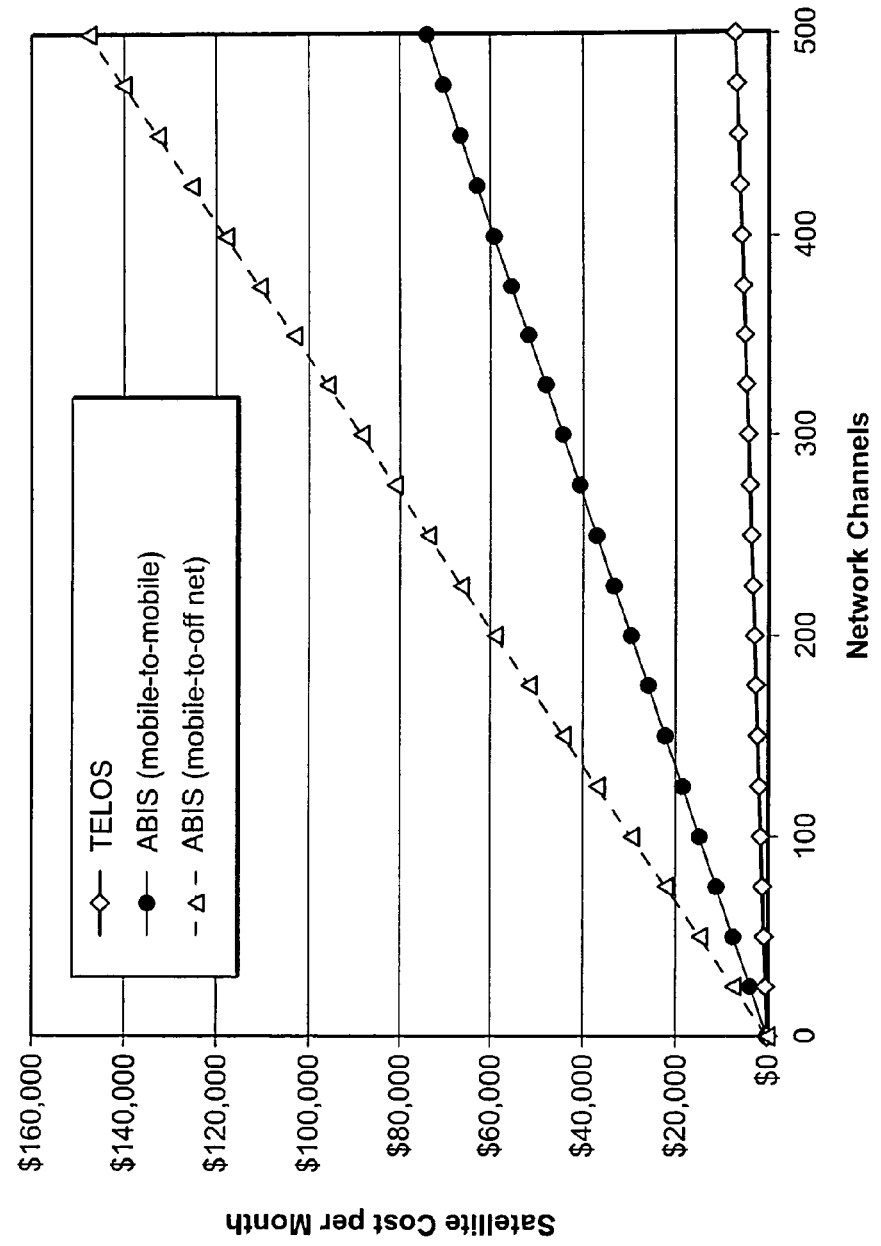
FIG. 23 is a graph showing monthly satellite cost as a function of GSM radio channels.
Figure 24:
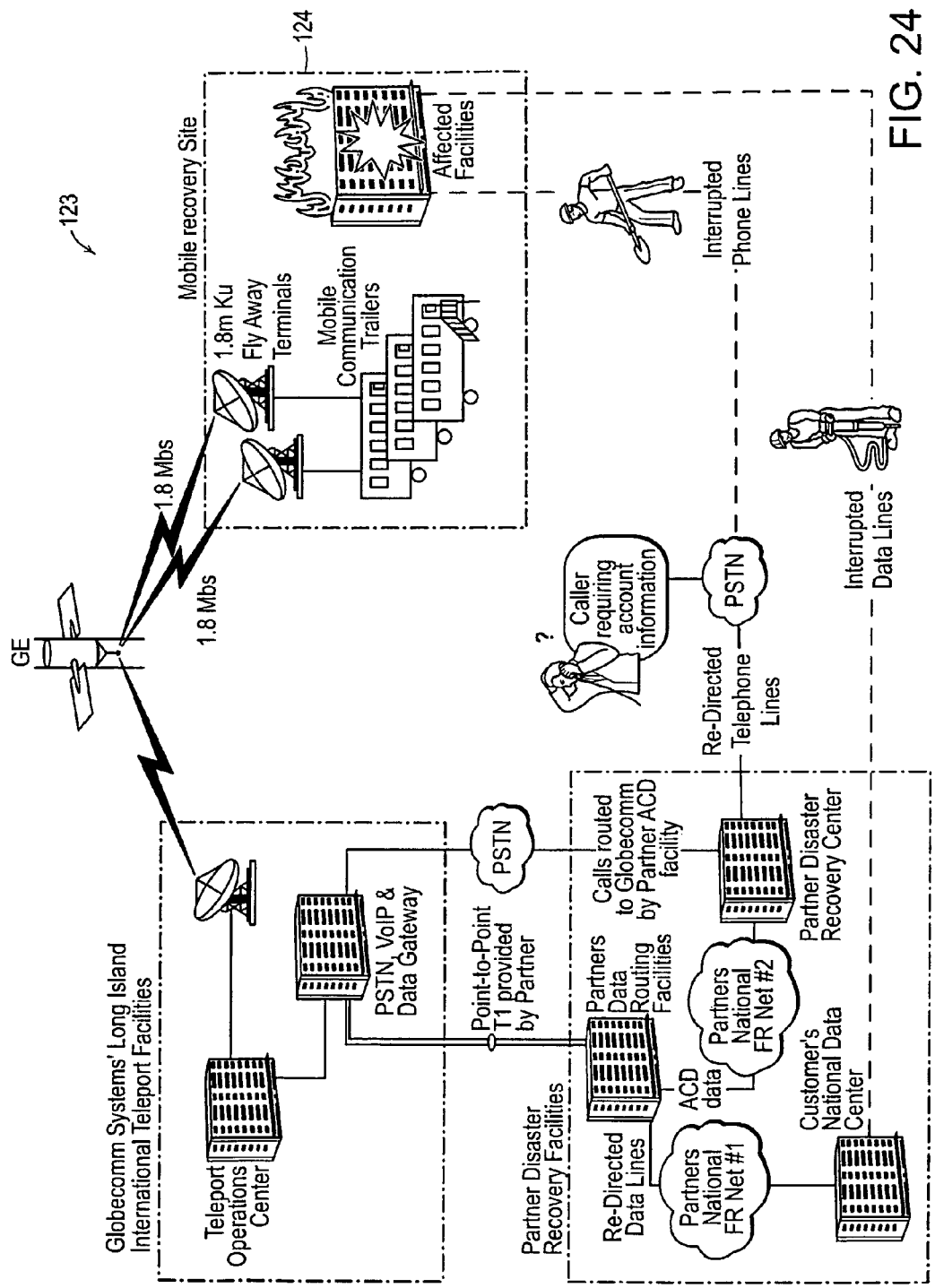
FIG. 24 is a schematic diagram of a VSAT-based Internet Protocol (IP) network for disaster recovery applications that includes a distributed GSM cellular network, in accordance with the disclosure.
Figure 25:
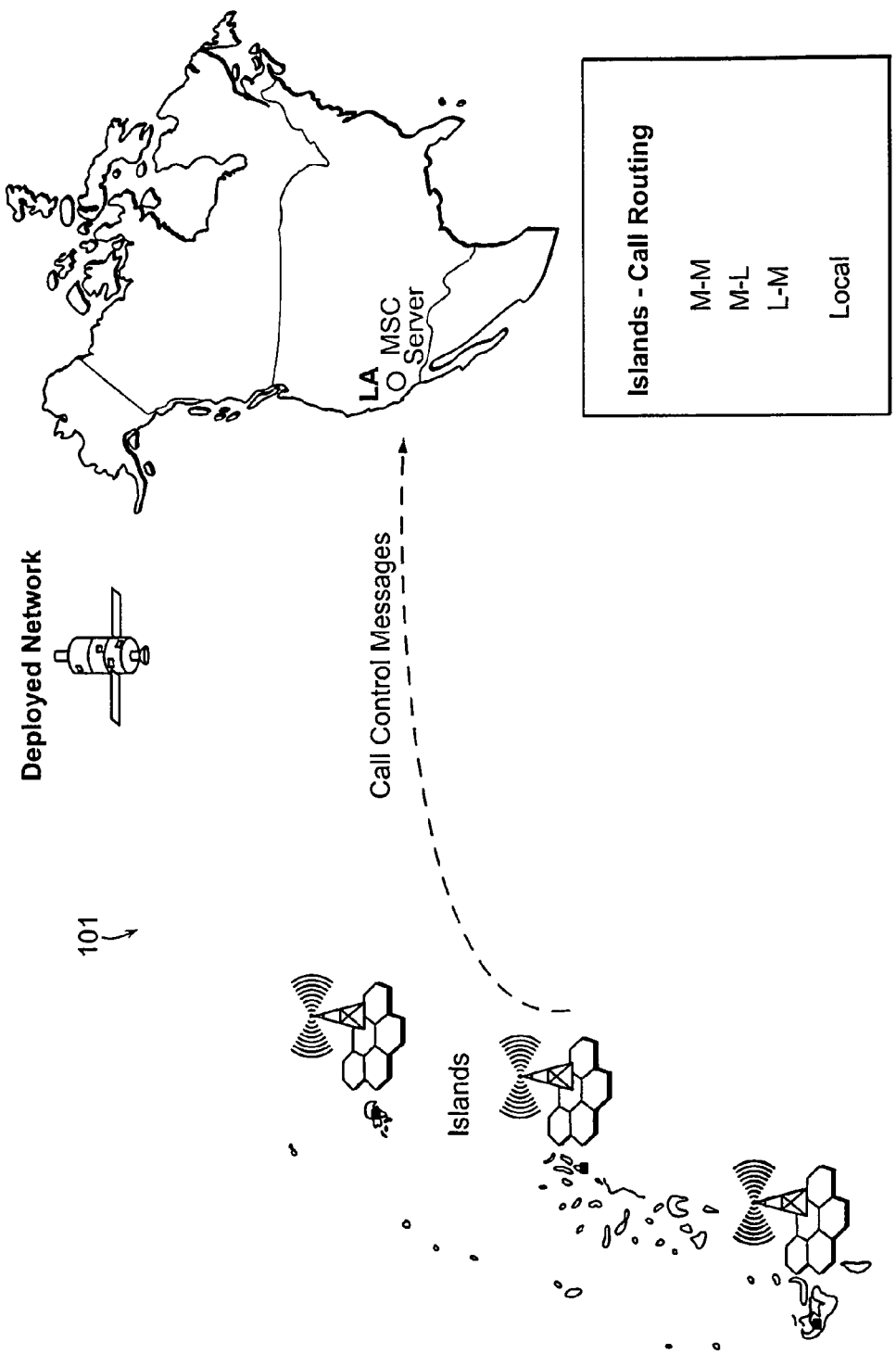
FIG. 25 is a schematic diagram showing a distributed digital communications network for enabling interactive communications, as an applied solution to the next generation network in accordance with the disclosure.
Figure 26:
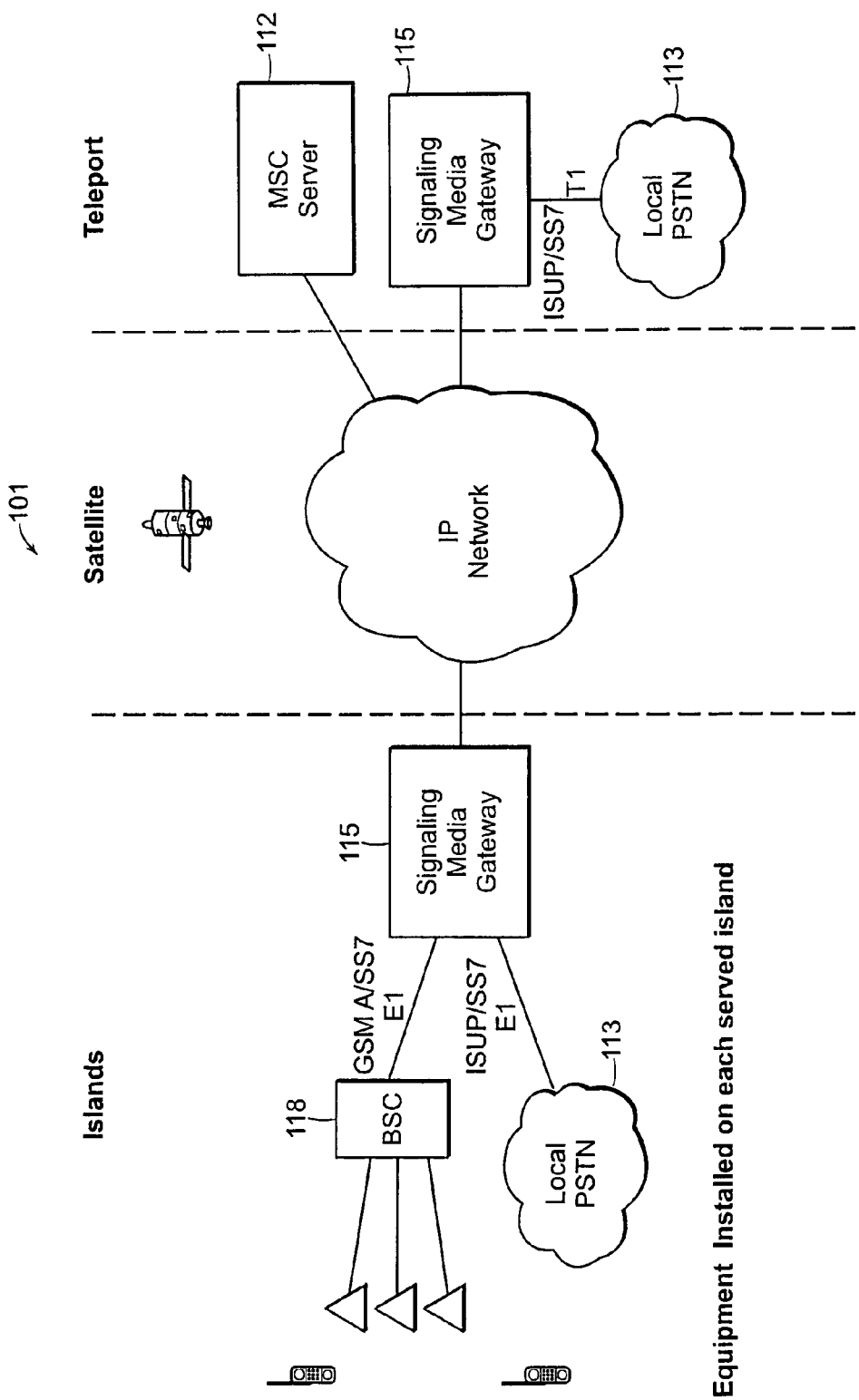
FIG. 26 is a schematic illustration of softswitch network architecture, according to one aspect of the disclosure.

More specifically, in terms of satellite bandwidth, each satellite channel, according to one aspect of the disclosure, typically requires at least two (2) 13.4 kbps of bandwidth on the satellite or 26.8 kbps per channel. The associated cost of this bandwidth for each of the two scenarios (i.e., the two extremes of all on-the-net and all off-the-net) is illustrated graphically in FIG. 23. FIG. 23 also shows monthly satellite cost as a function of GSM radio channels; the actual cost being found in the region between the two lines shown (which represent the two extremes). Other costs include earth station hardware costs associated with the additional satellite capacity required. As this demonstrates, the disclosure requires between about one tenth ($1/10^{th}$) and about one twentieth ($1/20^{th}$) the power and bandwidth needed to support conventional network architectures. Hence, bandwidth limitations are no longer a financial impediment to growing a remote radio access network.

Moreover, not only is voice quality no longer an issue as with conventional network architectures, but also mobility performance (e.g., location updates, handover performance) no longer degrades in proportion to radio access network growth. More particularly, using a network according to the disclosure, mobile base station controller signaling, namely, local calls, do not experience a considerable delay due to the double satellite hop necessitated by conventional systems. Such delays, which are often one (1) or more seconds, are generally greater than the frequency of updates between the mobile subscriber and base station controller. Accordingly, substantial degradation in voice quality also results.

Thus, by this disclosure, handover performance is improved considerably when the subscriber is mobile and/or where the radio access network consists of more than just a few base stations. As a result, remote radio access network performance and scalability are no longer limited by the network, nor are bandwidth limitations a financial impediment to growing a remote radio access network as in conventional network architectures.

Traditional architectures additionally require a duplex satellite channel at each end of the call. In order to make a local call that terminates on another network, at least two duplex satellite channels are required for each mobile channel are required. If a network has, for instance, 500 mobile radio channels and 10% long distance calling, and all local calls on the network are mobile to mobile: (i) 450 satellite channels on the network are required, (ii) 900 channels are needed to support those local calls terminating on another local network, and (iii) 50 satellite channels are necessary to support long distance calls. Using the disclosure according to this scenario, however, only 50 channels are required for long distance calls and no channels are needed for mobile to mobile service.

Although the network and method are disclosed as relating to a user placing calls via a cellular telephone, notably such call placement may take the form of a fax, data call, voice call or the like, within the spirit and scope of the disclosure.

VSAT-BASED TRANSMISSION INFRASTRUCTURE

Alternatively or concurrently, multiple services across a single VSAT-based transmission infrastructure are provided. The infrastructure, in this connection, includes a VSAT terminal desirably employed as both a termination node and a terrestrial distribution hub for a plurality of services including, but not limited to, GSM mobile voice services, video distribution, and high-speed Internet Protocol data services throughout a geographically dispersed region, e.g., a relatively large group of islands in the example given above. In this manner, a state-of-the-art Internet Protocol-based telecommunications network is provided that integrates satellite, terrestrial microwave, GSM cellular, fixed wireless and digital television broadcast technologies.

Specifically, a complete wireless system is provided having on-demand satellite Internet Protocol trunking between disbursed portions of the region and international locations, an Internet Protocol-based GSM cellular network with international roaming, digital television distribution, broadband wireless data delivery to support high-speed data requirements for the Internet, virtual private networks (VPNs), videoconferencing, distance learning and telemedicine applications. Billing and subscriber management systems for each service provided is included along with ongoing network operations and maintenance support. A system of this general description is shown, for instance, in FIG. 19.

A VSAT-based Internet Protocol network, in accordance with one aspect of the disclosure, has been found more cost effective than using leased or dedicated wirelines, i.e., telephone lines, to remote locations regardless of the number of sites to be accommodated. Such an arrangement further provides more robust data networks as compared to standard telephone lines. In addition, unlike terrestrial communications networks, VSAT-based Internet Protocol networks may be quickly implemented virtually anywhere in the world, regardless of the state of the location's communications infrastructure, and have minimal or no regulatory constraints. Network performance is also generally unaffected by distance or type of terrain.

Moreover, due to the considerable costs savings associated with these convergent networks, it has now been made economically feasible for private enterprises to own and operate their own multi-service network. This brings the added benefits of increased security and less reliance on hardware, software and personnel of local service providers. It also provides a significant advantage to multinational corporations in industries ranging from oil and investments to forestry and mining, all of which require state-of-the-art communications not only in remote locations, but also in developed locales.

Simultaneously, it enables local service providers, including both established and emerging carriers, to roll out a variety of services quickly and cost-effectively, even in remote areas in which the available terrestrial communications infrastructure is minimal or non-existent.

The network and method of the disclosure further enables communications infrastructure and service providers to develop highly customized, VSAT-based Internet Protocol networks for use over a wide range of applications, such as global intranets and wide area networks (WANs), voice over Internet Protocol (VoIP) services, video conferencing, distance learning and telemedicine. Such networks are flexible enough to include interfaces with legacy terrestrial networks. In this manner, a high degree of compatibility is provided with existing customer equipment and services. Additionally, interfaces can be made to public networks (e.g., the public switched telephone network) either on a selected customer's premises, or at a service provider's teleport facility through the use of satellite based services.

According to still a further embodiment of the disclosure, a VSAT-based Internet Protocol network solution is provided for selected applications, such as disaster recovery, in order to protect and quickly restore relatively critical voice and data information and communications. In one arrangement, a business restoration service is provided having satellite connectivity and automatic traffic rerouting in response to prolonged landline interruption. Should a communications system outage occur, a third party partner system is more or less instantaneously deployed to the affected site such as one or more Mobile Hot Sites (MHS) and Mobile End User (MES) units having trailers equipped with an Internet Protocol satellite system, e.g., provided by Globecomm Systems Inc. An exemplary system of this general description is shown schematically in FIG. 24, with a distributed GSM cellular network 123 in the context of a single site seat recovery. Such a system, it is noted, may be readily integrated with conventional dedicated terrestrial circuits such as fiber optic, frame relay, leased lines, microwave, radio and public networks. In this manner, business restoration services are brought directly to employees rather than those of conventional arrangements which require an affected company to move its employees to an offsite recovery center at the time of the outage.

Mobile Hot Sites telephone and data networks 124 are preferably linked transparently to the company's main infrastructure via satellite and a landline gateway or service provider's teleport facility through the use of satellite-based services. Alternatively, the disaster recovery service is directly terminated at the customer's headquarters, without use of the teleport. As a result of convergent, IP-network enhanced, VSAT satellite-based communications, according to the disclosure, companies can restore their business operations in significantly less time and at much less expense than has been possible using traditional methods of disaster recovery deployment.

From the perspective of content management and distribution, network convergence enabled by Internet Protocol technology and the shift toward merging digital communications into a single unified format, make VSAT-based Internet Protocol networks a solution of choice. In this connection, satellite-based content delivery networks (or CDNs) are provided that include all of the selected elements required of a fully convergent digital communications platform, including provision of return paths for interactive applications. As an example, a service provider teleport facility provides content delivery of video-on-demand (or VOD) media assets comprising video, audio, metadata and/or associated files that are processed into asset packages and, in turn, securely delivered via satellite to multi-service operator headends. At the headend, the assets are automatically loaded onto video-on-demand servers for consumer on-demand access.

VSAT-based Internet Protocol networks also enable the convergent content management and distribution of direct-to-home on-demand digital television, digital radio and interactive entertainment services over a single network. Similar applications for business television enable corporations and other organizations to better manage their operations, such as a content delivery network for a world-wide home improvement product retailer's business television and e-communications. In this respect, the network implements business television applications through a digital video transfer by satellite to the retailer's 1,300+ stores and store support centers.

Figure 27:
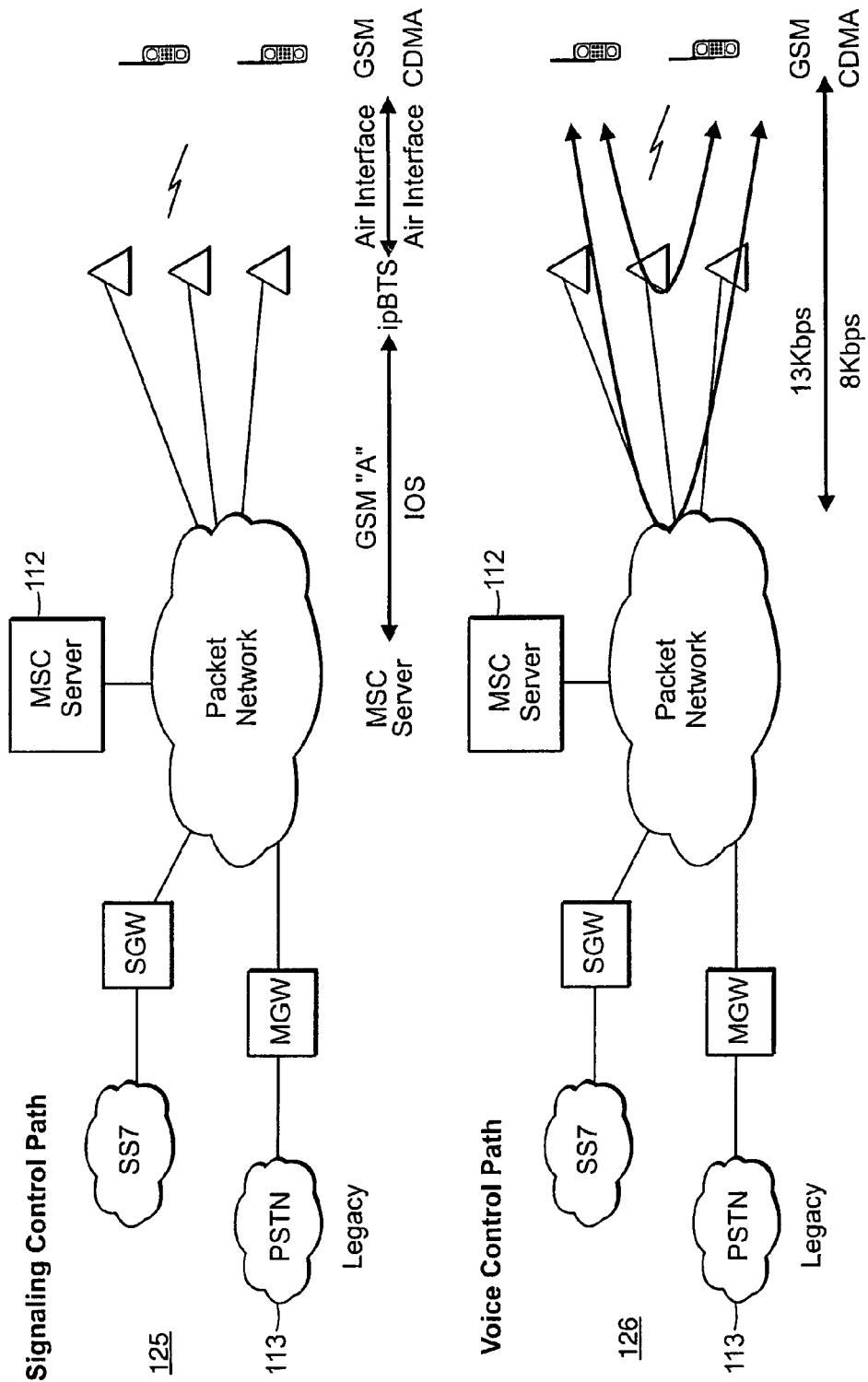
FIG. 27 is a detail schematic of the software network architecture (M-M) shown in FIG. 26.
Figure 28:
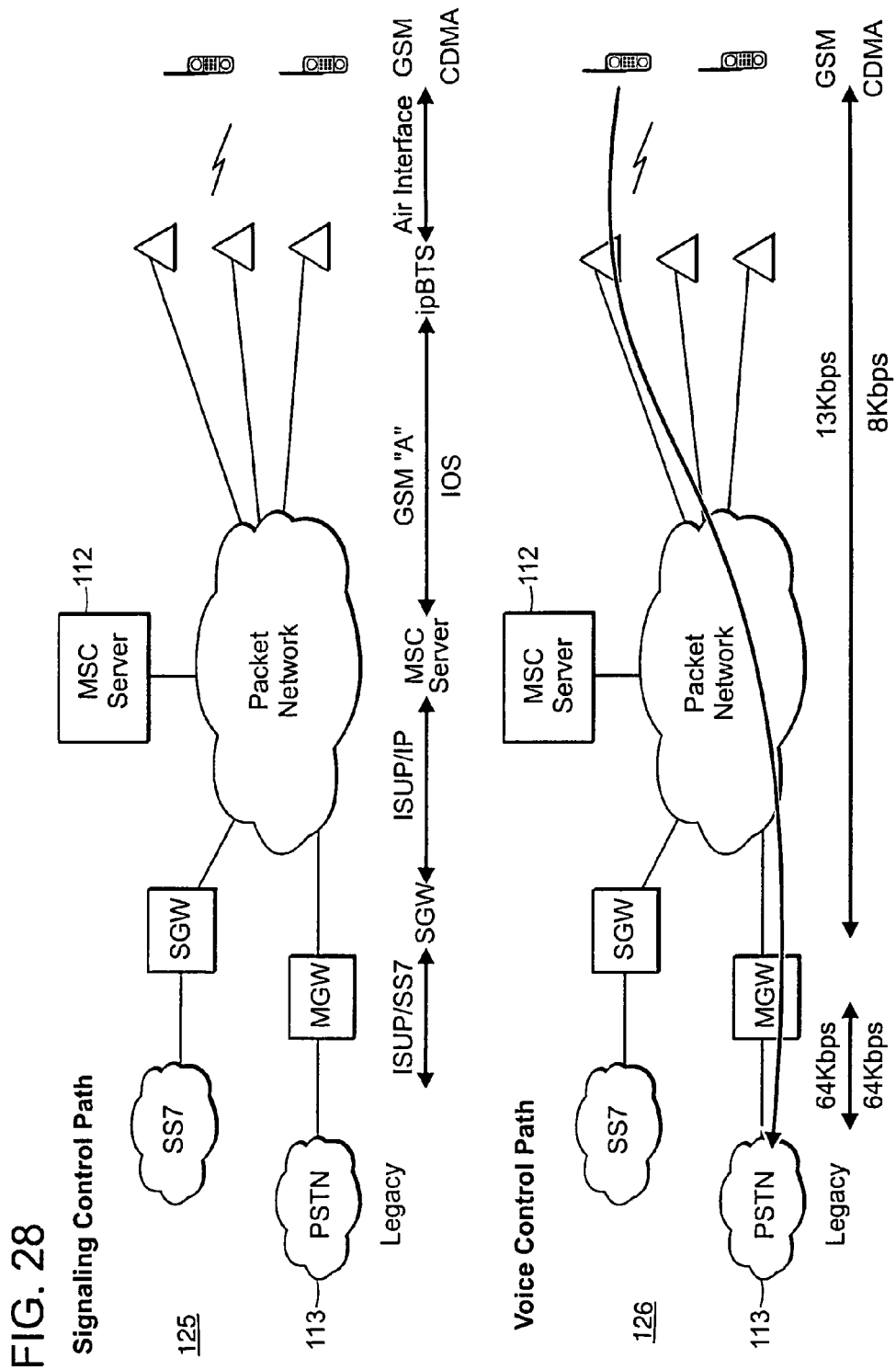
FIG. 28 is a detail schematic of the software network architecture (M-L) shown in FIG. 26.

Preferred network architectures and associated call routing operations, according to one aspect of the disclosure, are shown in FIGS. 20, 27 and 28. More particularly, as best seen in FIGS. 27 and 28, for each of signaling control path 125 and voice path 126, passage of packet data through the communications network is illustrated, from a wireless device such as a GSM cellular telephone, through the packet network, to the mobile switching center server and, finally, the public switch telephone network. FIG. 29 illustrates a traditional network architecture, as it may operate in association with the disclosure.

Now and hereinafter referring generally to the system architectures described previously, with respect to yet another aspect of the disclosure, there is provided a method of providing distributed cellular telephone services to a plurality of cellular telephone subscribers at selected remote geographic regions. Initially, one or more global communications satellites are positioned at one or more selected locations for receiving and relaying packet data communications encapsulating cellular telephone communications to at least one of the remote geographic regions. One or more base stations are then located in each of the remote geographic regions, each base station having mobile wireless links to the plurality of subscribers of cellular telephone services. Next, a satellite communications terminal is provided in each of the remote geographic regions, each satellite terminal being associated with one or more of the base stations, for communicating with the satellite from the corresponding region. A user terminal is located in each of the remote geographic regions such that each terminal is associated with the base station(s) in the region. Thereafter, a base station controller is positioned remotely from the base stations, the base station controller having programming for controlling each of the base stations. A mobile switching center is then positioned in proximity to the base station controller. The switching center has a call processor for handling cellular telephone call switching between the base stations. Finally, a packet data network is utilized between the satellite and satellite communications terminals for interactive data communications throughout the network.

In accordance with still another aspect of the disclosure is a method of providing distributed cellular telephone services to a plurality of cellular telephone subscribers at selected remote geographic regions. First, one or more global communications satellites are positioned at one or more selected locations for receiving and relaying packet data communications encapsulating cellular telephone communications to at least one of the remote geographic regions. A first station is then located in a first remote geographic region, the first station including a first base station having mobile wireless links to a plurality of subscribers of cellular telephone services in the region, a first satellite communications terminal for communicating with the satellite from the region, and a first user terminal. Next, a second station is located in a second remote geographic region, the second station including a second base station having mobile wireless links to a plurality of subscribers of cellular telephone services in the region, a second satellite communications terminal for communicating with the satellite from the region, and a second user terminal. A third station in a third remote geographic region is also provided, the third station including a third satellite communications terminal for communicating with the satellite from the region, a base station controller with programming for controlling the first and second base stations, and a mobile switching center having a call processor for handling cellular telephone call switching between the first and second base stations. Thereafter, a land based telephone network, and/or wireline and/or other cellular telephone network(s), if present, is linked (remotely or locally) to the mobile switching center, the network having at least one telephone for enabling the third party to place a call to the subscriber. Finally, a packet data network is provided between the satellite and satellite communications terminals for interactive data communications throughout the cellular network.

Alternatively, according to the aforementioned method, the first station includes a first base station having mobile wireless links to a plurality of subscribers of cellular telephone services in the region, a first satellite communications terminal for communicating with the satellite from the region, a first base station controller with programming for controlling the first base station, and a first user terminal. Likewise, the second station has a second base station having mobile wireless links to a plurality of subscribers of cellular telephone services in the region, a second satellite communications terminal for communicating with the satellite from the region, a second base station controller with programming for controlling the second base station, and a second user terminal. Furthermore, the third station includes a third satellite communications terminal for communicating with the satellite from the region, and a mobile switching center having a call processor for handling cellular telephone call switching between the first and second base stations.

According to still another aspect of the disclosure is a method of providing distributed cellular telephone services to a plurality of cellular telephone subscribers between selected remote geographic regions. One or more global communications satellites are positioned at one or more selected locations for receiving and relaying packet data communications encapsulating cellular telephone communications to at least one of the remote geographic regions. A first station is located in a first remote geographic region, the first station including a first base station having mobile wireless links to a plurality of subscribers of cellular telephone services in the region, a first satellite communications terminal for communicating with the satellite from the region, and a first user terminal. A second station is then located in a second remote geographic region, the second station including a second base station having mobile wireless links to a plurality of subscribers of cellular telephone services in the region, a second satellite communications terminal for communicating with the satellite from the region, and a second user terminal. Thereafter, a third station is positioned in a third remote geographic region, the third station including a third satellite communications terminal for communicating with the satellite from the region, a base station controller with programming for controlling the first and second base stations, and a mobile switching center having a call processor for handling cellular telephone call switching between the first and second base stations. As before, a packet data network is utilized between the satellite and satellite communications terminals for interactive data communications throughout the cellular network.

In yet another embodiment, distributed cellular telephone services are provided to a plurality of cellular telephone subscribers between selected remote geographic regions. Again, one or more global communications satellites are placed at one or more selected locations for receiving and relaying packet data communications encapsulating cellular telephone communications to at least one of the remote geographic regions. A first station is located in a first remote geographic region, the first station including a first base station having mobile wireless links to a plurality of subscribers of cellular telephone services in the region, a first satellite communications terminal for communicating with the satellite from the region, a first base station controller with programming for controlling the first base station, and a first user terminal. Similarly, a second station is located in a second remote geographic region, the second station including a second base station having mobile wireless links to a plurality of subscribers of cellular telephone services in the region, a second satellite communications terminal for communicating with the satellite from the region, a second base station controller with programming for controlling the second base station, and a second user terminal. A third station is located in a third remote geographic region, the third station including a third satellite communications terminal for communicating with the satellite from the region, and a mobile switching center having a call processor for handling cellular telephone call switching between the first and second base stations. Finally, a packet data network between the satellite and satellite communications terminals provides interactive data communications throughout the cellular network.

With respect to multimedia services or the like, the disclosure also relates to a method of providing distributed interactive digital multimedia communications services to a plurality of subscribers at selected remote geographic regions. Initially, as with the cellular telephone type applications described above, one or more global communications satellites are positioned at one or more selected locations for receiving and relaying packet data communications encapsulating the interactive communications services to at least one of the remote geographic regions. Subsequently or concurrently, one or more base stations are located in each of the remote geographic regions, each base station having mobile wireless links to the plurality of subscribers to the communications services. Next, a satellite communications terminal is provided in each of the remote geographic regions, each satellite terminal being associated with one or more of the base stations, for communicating with the satellite from the corresponding region. Furthermore, a user terminal is located in each of the remote geographic regions; each user terminal being associated with the base station(s) in the region. Thereafter, a base station controller is provided remotely from the base stations, the base station controller having programming for controlling each of the base stations. In addition, a mobile switching center is positioned in proximity to the base station controller, the switching center having a digital communications signal processor for handling digital signal switching between the base stations. Finally, a packet data network is located between the satellite and satellite communications terminals for interactive data communications throughout the network.

According to another embodiment is a method of providing distributed interactive digital multimedia communications services to a plurality of subscribers at selected remote geographic regions. First, one or more global communications satellites are positioned at one or more selected locations for receiving and relaying packet data communications encapsulating interactive communications services to at least one of the remote geographic regions. One or more base stations are located in each of the remote geographic regions. Each base station has mobile wireless links to the plurality of subscribers to the communications services. Next, a satellite communications terminal is located in each of the remote geographic regions, each satellite terminal being associated with one or more of the base stations, for communicating with the satellite from the corresponding region. A user terminal is then located in each of the remote geographic regions. Each user terminal is associated with the base station(s) in the region. Thereafter, a base station controller is provided remotely from at least one of the base stations. The base station controller preferably houses programming for controlling each of the base stations. In addition, a mobile switching center is positioned remotely from the base stations and the base station controller. The switching center has a digital communications signal processor for handling digital signal switching between the base stations. Last, a packet data network is provided between the satellite and satellite communications terminals for interactive data communications throughout the network.

In accordance with another arrangement of the disclosure is a method of providing distributed interactive digital multimedia communications services to a plurality of subscribers at selected remote geographic regions. Initially, one or more global communications satellites are positioned at one or more selected locations for receiving and relaying packet data communications encapsulating the communications services to at least one of the remote geographic regions. A first station is located in a first remote geographic region. The first station includes a first base station having mobile wireless links to a plurality of subscribers to the communications services in the first region, a first satellite communications terminal for communicating with the satellite from the first region, and a first user terminal. Next, a second station is provided in a second remote geographic region. The second station includes a second base station with wireless links to a plurality of subscribers to the communications services in the second region, a second satellite communications terminal for communicating with the satellite from the second region, and a second user terminal. Also provided is a third station in a third remote geographic region. The third station includes a third satellite communications terminal for communicating with the satellite from the third region, a base station controller with programming for controlling the first and second base stations, and a mobile switching center having a digital communications signal processor for handling digital signal switching between the first and second base stations. A land based communications network, and/or wireline and/or other selected wireless communications network(s), is/are linked remotely and/or locally to the mobile switching center, the network having at least one device for enabling the third party to transmit a communications signal to the subscriber. Finally, a packet data network is provided between the satellite and satellite communications terminals for interactive data communications throughout the distributed network.

Yet another embodiment of the disclosure concerns a method of providing distributed interactive digital multimedia communications services to a plurality of subscribers at selected remote geographic regions. One or more global communications satellites are positioned at one or more selected locations for receiving and relaying packet data communications encapsulating the communications services to at least one of the remote geographic regions. A first station is then located in a first remote geographic region; the first station including a first base station having mobile wireless links to a plurality of subscribers to the communications services in the first region, a first satellite communications terminal for communicating with the satellite from the first region, a first base station controller with programming for controlling the first base station, and a first user terminal. In turn, a second station is located in a second remote geographic region. The second station includes a second base station having mobile wireless links to a plurality of subscribers to the communications services in the second region, a second satellite communications terminal for communicating with the satellite from the second region, a second base station controller with programming for controlling the second base station, and a second user terminal. Next, a third station is provided in a third remote geographic region. The third station includes a third satellite communications terminal for communicating with the satellite from the third region, and a mobile switching center having a digital communications signal processor for handling digital signal switching between the first and second base stations. A land based telephone network, and/or wireline and/or other selected wireless communications network(s), is/are linked remotely and/or locally to the mobile switching center, the network having at least one device for enabling the third party to transmit a communications signal to the subscriber. Finally, a packet data network is provided between the satellite and satellite communications terminals for interactive data communications throughout the distributed network.

Referring now to yet another aspect of the disclosure is a method of providing distributed interactive digital multimedia communications services to a plurality of subscribers at selected remote geographic regions. The method comprises a first step of positioning one or more global communications satellites at one or more selected locations for receiving and relaying packet data communications encapsulating the communications services to at least one of the remote geographic regions. Second, a first station is located in a first remote geographic region, the first station including a first base station having mobile wireless links to a plurality of subscribers to the communications services in the first region, a first satellite communications terminal for communicating with the satellite from the first region, and a first user terminal. Next, a second station is located in a second remote geographic region. The second station includes a second base station having mobile wireless links to a plurality of subscribers to the communications services in the second region, a second satellite communications terminal for communicating with the satellite from the second region, a base station controller with programming for controlling the first and second base stations, and a second user terminal. Thereafter, a third station is located in a third remote geographic region, the third station including a third satellite communications terminal for communicating with the satellite from the region, and a mobile switching center having a digital communications signal processor for handling digital signal switching between the first and second base stations. A land based telephone network, and/or wireline and/or other selected wireless communications network(s), remotely and/or locally to the mobile switching center. The network has at least one device for enabling the third party to transmit a communications signal to the subscriber. Last, a packet data network is provided between the satellite and satellite communications terminals for interactive data communications throughout the distributed network.

Alternatively or concurrently, the second station is located in the second remote geographic region, wherein the second station includes a second base station with mobile wireless links to a plurality of subscribers to the communications services in the second region, a second satellite communications terminal for communicating with the satellite from the second region, and a second user terminal. The third station in the third remote geographic region includes a third satellite communications terminal for communicating with the satellite from the region, a base station controller with programming for controlling the first and second base stations, and a mobile switching center having a digital communications signal processor for handling digital signal switching between the first and second base stations. As before, a packet data network is provided between the satellite and satellite communications terminals for interactive data communications throughout the distributed network.

Further alternatively or concurrently, the first station located in the first remote geographic region has a first base station having mobile wireless links to a plurality of subscribers to the communications services in the first region, a first satellite communications terminal for communicating with the satellite from the first region, a first base station controller with programming for controlling the first base station, and a first user terminal. The second station in the second remote geographic region includes a second base station having mobile wireless links to a plurality of subscribers to the communications services in the second region, a second satellite communications terminal for communicating with the satellite from the second region, a second base station controller with programming for controlling the second base station, and a second user terminal. As for the third station in the third remote geographic region, it includes a third satellite communications terminal for communicating with the satellite from the region, and a mobile switching center having a digital communications signal processor for handling digital signal switching between the first and second base stations. The packet data network between the satellite and satellite communications terminals provides interactive data communications throughout the distributed network.

Yet a further aspect of the disclosure relates to a method of providing distributed interactive digital multimedia communications services to a plurality of subscribers between selected remote geographic regions, as follows. First, one or more global communications satellites are positioned at one or more selected locations for receiving and relaying packet data communications encapsulating the communications services to at least one of the remote geographic regions. A first station is located in a first remote geographic region. The first station comprises a first base station having mobile wireless links to a plurality of subscribers to the communications services in the first region, a first satellite communications terminal for communicating with the satellite from the first region, and a first user terminal. Next, a second station is located in a second remote geographic region, the second station including a base station having mobile wireless links to a plurality of subscribers to the communications services in the second region, a second satellite communications terminal for communicating with the satellite from the second region, a second base station controller with programming for controlling the first and second base stations, and a second user terminal. Third, a third station is located in a third remote geographic region. The third station includes a third satellite communications terminal for communicating with the satellite from the third region, and a mobile switching center having a signal processor for handling signal switching between the first and second base stations. Fourth, a packet data network is arranged between the satellite and satellite communications terminals for interactive data communications throughout the distributed network.

Although the various methods of the disclosure have been shown and described in connection with a particular sequence of operation, it is understood that the steps of each method is not order dependant, being capable of being practiced in any order, as practical, giving consideration to the purpose for which the disclosure is intended.

Overall, the disclosure provides a durable, versatile and reliable network that enables base station controllers and mobile switching centers to be located separately from base stations of service areas for cellular networks. The result is an efficient and economical communications network suitable for the introduction of full-featured cellular telephone service to those regions of the world, such as remote geographic areas and/or those with small population densities, currently underserved or unreachable by conventional telephone service providers.

The disclosure also provides a simple, practical network architecture both for reducing the expense of providing cellular telephone service to existing customers, as well as for improving and adding service in remote geographic regions. In addition, new services and/or providers may be readily added to existing cellular telephone networks with relatively low incremental costs. This is accomplished, in part, by utilizing global communications satellites in combination with a cellular telephone network and a packet data network (with Internet Protocol and/or other communications protocols) so that all elements of the cellular network can be located anywhere in the global coverage area of the satellites.

By sharing common resources, both in terms of infrastructure and operations, across multiple networks or radio access networks, additional cost savings are achieved. For example, a single centrally located network switching subsystem can support multiple radio access networks. This sharing also allows for significant savings in operating costs in that a single centralized staff is preferably used to support multiple networks, thereby reducing the number of people and the level of expertise required in the field.

Hence, Internet Protocol services can also be carried by the same satellite Internet Protocol network backbone. In this manner, Internet access may now be delivered to a radio access network at essentially no additional infrastructure cost, and then further distributed to all base station locations. This approach allows the operator to easily establish cyber cafes throughout the coverage region at minimal additional investment.

The fully meshed nature of an Internet Protocol satellite network additionally allows for "single hop" communications, e.g., long distance calls, between satellite network nodes (i.e., traffic is automatically routed to its destination via the shortest route). This, in turn, provides Internet Protocol communications having inherent bandwidth-on-demand and prioritization functions that allow sharing of bandwidth between the various services while still providing quality of service mechanisms. Since the Internet transmission medium is readily shared by other services, e.g., Internet access and multimedia applications, that are independent of the cellular network, highly bandwidth efficient communications are, therefore, also provided.

A further advantage of the disclosure is the distributed architecture of its Internet Protocol-based softswitch which allows network elements to be located virtually anywhere with the Internet Protocol "cloud". This means that network elements can be located where they best suit network requirements, for instance, a mobile switching center may be placed in one location, such as at a remote secure service provider facility, and that a base station controller/base transceiver system infrastructure must be deployed only as needed. Hence, network operations are also simplified and reduced, as the amount of remote infrastructure to be deployed is minimized, and key network infrastructure (es.g., mobile switching center, billing, and other support functions) need not be located centrally, and can be leveraged to manage numerous remote service areas.

As for call processing, according to the disclosure, it is both distributed and intelligent. For instance, although a satellite-based network is used, local calls connect locally (voice path requiring no satellite bandwidth), and satellite channels are used only for call setup. Moreover, with the disclosure there is no additional transponder cost per mobile channel deployed, unacceptable delays (e.g., 1+seconds) with local calling are eliminated, mobility performance is no longer compromised by delay in mobility signaling (Abis), satellite bandwidth is shared, and local gateway capabilities are provided.

Another feature of the disclosure is network expansion. More specifically, as satellite technology enables service availability anywhere within the Internet Protocol network, new remote service areas may readily be added to the network regardless of location. Because each new service area does not require a new switch, network expansion costs, accordingly, are incremental. The packet based nature of the disclosure architecture also offers a communications path ready for third generation wireless format (3G) networks and services.

Moreover, control and switching elements are fully digital for reduced implementation and operational costs. In this manner, a marriage or integration of packet network technology, packet data satellite network and a packet gateway is achieved using existing communications equipment and standards, and through relatively low cost, high production equipment is readily available from suppliers.

Various modifications and alterations may be appreciated based on a review of this disclosure. These changes and additions are intended to be within the scope and spirit of the disclosure as defined by the following claims.

What is claimed is:

1. A distributed cellular network for enabling calls between a third party outside the network and a cellular telephone subscriber at a selected remote location, the network comprising:
   one or more global communications satellites positioned and adapted for receiving and relaying packet data communications encapsulating cellular telephone communications;
   a first station located in a first remote geographic region, the first station including a first base station having mobile wireless links to a plurality of subscribers of cellular telephone services in the first region, a first satellite communications terminal for communicating with the satellite from the first region, and a first user terminal, the first station being stationary when in use but movable for deployment when not in use;
   a second station located in a second remote geographic region, the second station including a second base station having mobile wireless links to a plurality of subscribers of cellular telephone services in the second region, a second satellite communications terminal for communicating with the satellite from the second region, and a second user terminal, the second station being stationary when in use but movable for deployment when not in use;
   a third station located in a third remote geographic region, the third station including a third satellite communications terminal for communicating with the satellite from the third region, a base station controller with programming for controlling the first and second base stations, and a single mobile switching center that is stationary when in use but movable for deployment when not in use having a call processor for handling cellular telephone call switching between the first and second base stations;
   a land based telephone network, and/or wireline and/or other cellular telephone network(s) linked remotely and/or locally to the mobile switching center and having at least one telephone for enabling the third party to place a call to the subscriber; and
   a packet data network between the satellite and satellite communications terminals for interactive data communications throughout the cellular network.

2. The network set forth in claim 1, wherein the base station controller is located remotely from, or locally with, the first and second base stations.

3. The network set forth in claim 1, wherein the base station controller is located remotely from, or locally with, the first and second base stations and not at the third base station.

4. A distributed cellular network for enabling calls between a third party outside the network and a cellular telephone subscriber at a selected remote location, which comprises:
   one or more global communications satellites positioned and adapted for receiving and relaying packet data communications encapsulating cellular telephone communications;
   a first station located in a first remote geographic region, the first station including a first base station having mobile wireless links to a plurality of subscribers of cellular telephone services in the first region, a first satellite communications terminal for communicating with the satellite from the first region, a first base station controller with programming for controlling the first base station, and a first user terminal, the first station being stationary when in use but movable for deployment when not in use;

a second station located in a second remote geographic region, the second station including a second base station having mobile wireless links to a plurality of subscribers of cellular telephone services in the second region, a second satellite communications terminal for communicating with the satellite from the second region, a second base station controller with programming for controlling the second base station, and a second user terminal, the second station being stationary when in use but movable for deployment when not in use;

a third station located in a third remote geographic region, the third station including a third satellite communications terminal for communicating with the satellite from the third region, and a single mobile switching center that is stationary when in use but movable for deployment when not in use having a call processor for handling cellular telephone call switching between the first and second base stations;

a land based telephone network, and/or wireline and/or other cellular telephone network(s) linked remotely and/or locally to the mobile switching center and having at least one telephone for enabling the third party to place a call to the subscriber; and a packet data network between the satellite and satellite communications terminals for interactive data communications throughout the cellular network.

5. A distributed cellular network for enabling calls between a third party outside the network and a cellular telephone subscriber at a selected remote location, which comprises:

one or more global communications satellites positioned and adapted for receiving and relaying packet data communications encapsulating cellular telephone communications;

a first station located in a first remote geographic region, the first station including a first base station having mobile wireless links to a plurality of subscribers of cellular telephone services in the first region, a first satellite communications terminal for communicating with the satellite from the first region, and a first user terminal, the first station being stationary when in use but movable for deployment when not in use;

a second station located in a second remote geographic region, the second station including a second base station having mobile wireless links to a plurality of subscribers of cellular telephone services in the second region, a second satellite communications terminal for communicating with the satellite from the second region, a base station controller with programming for controlling the first and second base stations, and a second user terminal, the second station being stationary when in use but movable for deployment when not in use;

a third station located in a third remote geographic region, the third station including a third satellite communications terminal for communicating with the satellite from the third region, and a single mobile switching center that is stationary when in use but movable for deployment when not in use having a call processor for handling cellular telephone call switching between the first and second base stations;

a third party, cellular and/or wireline and/or land-based, telephone network linked remotely and/or locally to the mobile switching center and having at least one telephone for enabling the third party to place a call to the subscriber; and a packet data network between the satellite and satellite communications terminals for interactive data communications throughout the cellular network.

6. The network set forth in claim 5, wherein the base station controller is located remotely from, or locally with, the first and second base stations.

7. The network set forth in claim 5, wherein the base station controller is located remotely from, or locally with, the first and second base stations and not at the third base station.

8. A distributed cellular network for enabling calls between a first cellular telephone subscriber at a first remote location and a second cellular telephone subscriber at a second remote location, the network comprising:

one or more global communications satellites positioned and adapted for receiving and relaying packet data communications encapsulating cellular telephone communications;

a first station located in a first remote geographic region, the first station including a first base station having mobile wireless links to a plurality of subscribers of cellular telephone services in the first region, a first satellite communications terminal for communicating with the satellite from the first region, and a first user terminal, the first station being stationary when in use but movable for deployment when not in use;

a second station located in a second remote geographic region, the second station including a second base station having mobile wireless links to a plurality of subscribers of cellular telephone services in the second region, a second satellite communications terminal for communicating with the satellite from the second region, and a second user terminal, the second station being stationary when in use but movable for deployment when not in use;

a third station located in a third remote geographic region, the third station including a third satellite communications terminal for communicating with the satellite from the third region, a base station controller with programming for controlling the first and second base stations, and a single mobile switching center that is stationary when in use but movable for deployment when not in use having a call processor for handling cellular telephone call switching between the first and second base stations; and a packet data network between the satellite and satellite communications terminals for interactive data communications throughout the cellular network.

9. A distributed cellular network for enabling calls between a first cellular telephone subscriber at a first remote location and a second cellular telephone subscriber at a second remote location, which comprises:

one or more global communications satellites positioned and adapted for receiving and relaying packet data communications encapsulating cellular telephone communications;

a first station located in a first remote geographic region, the first station including a first base station having mobile wireless links to a plurality of subscribers of cellular telephone services in the first region, a first satellite communications terminal for communicating with the satellite from the first region, a first base station controller with programming for controlling the first base station, and a first user terminal, the first station being stationary when in use but movable for deployment when not in use;

a second station located in a second remote geographic region, the second station including a second base station having mobile wireless links to a plurality of subscribers of cellular telephone services in the second region, a second satellite communications terminal for communicating with the satellite from the second region, a second base station controller with programming for controlling the second base station, and a second user terminal, the second station being stationary when in use but movable for deployment when not in use;

a third station located in a third remote geographic region, the third station including a third satellite communications terminal for communicating with the satellite from the third region, and a single mobile switching center that is stationary when in use but movable for deployment when not in use having a call processor for handling cellular telephone call switching between the first and second base stations; and a packet data network between the satellite and satellite communications terminals for interactive data communications throughout the cellular network.

10. A method of providing distributed cellular telephone services to a plurality of cellular telephone subscribers at selected remote geographic regions, which comprises the steps of:

I. positioning one or more global communications satellites at one or more selected locations for receiving and relaying packet data communications encapsulating cellular telephone communications to at least one of the remote geographic regions;

ii. locating a first station in a first remote geographic region, the first station including a first base station having mobile wireless links to a plurality of subscribers of cellular telephone services in the first region, a first satellite communications terminal for communicating with the satellite from the first region, and a first user terminal, the first station being stationary when in use but movable for deployment when not in use;

iii. locating a second station in a second remote geographic region, the second station including a second base station having mobile wireless links to a plurality of subscribers of cellular telephone services in the second region, a second satellite communications terminal for communicating with the satellite from the second region, and a second user terminal, the second station being stationary when in use but movable for deployment when not in use;

iv. providing a third station in a third remote geographic region, the third station including a third satellite communications terminal for communicating with the satellite from the third region, a base station controller with programming for controlling the first and second base stations, and a single mobile switching center that is stationary when in use but movable for deployment when not in use having a call processor for handling cellular telephone call switching between the first and second base stations;

v. linking a land based telephone network, and/or wireline and/or other cellular telephone network(s), remotely and/or locally to the mobile switching center, the network having at least one telephone for enabling the third party to place a call to the subscriber; and vi. providing a packet data network between the satellite and satellite communications terminals for interactive data communications throughout the cellular network.

11. A method of providing distributed cellular telephone services to a plurality of cellular telephone subscribers at selected remote geographic regions, which comprises the steps of:

I. positioning one or more global communications satellites at one or more selected locations for receiving and relaying packet data communications encapsulating cellular telephone communications to at least one of the remote geographic regions;

ii. locating a first station in a first remote geographic region, the first station including a first base station having mobile wireless links to a plurality of subscribers of cellular telephone services in the first region, a first satellite communications terminal for communicating with the satellite from the first region, a first base station controller with programming for controlling the first base station, and a first user terminal, the first station being stationary when in use but movable for deployment when not in use;

iii. locating a second station in a second remote geographic region, the second station including a second base station having mobile wireless links to a plurality of subscribers of cellular telephone services in the second region, a second satellite communications terminal for communicating with the satellite from the second region, a second base station controller with programming for controlling the second base station, and a second user terminal, the second station being stationary when in use but movable for deployment when not in use;

iv. providing a third station in a third remote geographic region, the third station including a third satellite communications terminal for communicating with the satellite from the third region, and a single mobile switching center that is stationary when in use but movable for deployment when not in use having a call processor for handling cellular telephone call switching between the first and second base stations;

v. linking a land based telephone network, and/or wireline and/or other cellular telephone network(s), remotely and/or locally to the mobile switching center, the network having at least one telephone for enabling the third party to place a call to the subscriber; and vi. providing a packet data network between the satellite and satellite communications terminals for interactive data communications throughout the cellular network.

12. A method of providing distributed cellular telephone services to a plurality of cellular telephone subscribers at selected remote geographic regions, which comprises the steps of:

I. positioning one or more global communications satellites at one or more selected locations for receiving and relaying packet data communications encapsulating cellular telephone communications to at least one of the remote geographic regions;

ii. locating a first station in a first remote geographic region, the first station including a first base station having mobile wireless links to a plurality of subscribers of cellular telephone services in the first region, a first satellite communications terminal for communicating with the satellite from the first region, and a first user terminal, the first station being stationary when in use but movable for deployment when not in use;

iv. locating a second station in a second remote geographic region, the second station including a second base station having mobile wireless links to a plurality of subscribers of cellular telephone services in the second region, a second satellite communications terminal for communicating with the satellite from the second region, a base station controller with programming for controlling the first and second base stations, and a second user terminal, the second station being stationary when in use but movable for deployment when not in use;

v. providing a third station in a third remote geographic region, the third station including a third satellite communications terminal for communicating with the satellite from the third region, and a single mobile switching center that is stationary when in use but movable for deployment when not in use having a call processor for handling cellular telephone call switching between the first and second base stations;

vi. linking a land based telephone network, and/or wireline and/or other cellular telephone network(s), remotely and/or locally to the mobile switching center, the network having at least one telephone for enabling the third party to place a call to the subscriber; and vii. providing a packet data network between the satellite and satellite communications terminals for interactive data communications throughout the cellular network.

13. A method of providing distributed cellular telephone services to a plurality of cellular telephone subscribers between selected remote geographic regions, which comprises the steps of:

I. positioning one or more global communications satellites at one or more selected locations for receiving and relaying packet data communications encapsulating cellular telephone communications to at least one of the remote geographic regions;

ii. locating a first station in a first remote geographic region, the first station including a first base station having mobile wireless links to a plurality of subscribers of cellular telephone services in the first region, a first satellite communications terminal for communicating with the satellite from the first region, and a first user terminal, the first station being stationary when in use but movable for deployment when not in use;

iii. locating a second station in a second remote geographic region, the second station including a second base station having mobile wireless links to a plurality of subscribers of cellular telephone services in the second region, a second satellite communications terminal for communicating with the satellite from the second region, and a second user terminal, the second station being stationary when in use but movable for deployment when not in use;

iv. providing a third station in a third remote geographic region, the third station including a third satellite communications terminal for communicating with the satellite from the third region, a base station controller with programming for controlling the first and second base stations, and a single mobile switching center that is stationary when in use but movable for deployment when not in use having a call processor for handling cellular telephone call switching between the first and second base stations; and v. providing a packet data network between the satellite and satellite communications terminals for interactive data communications throughout the cellular network.

14. A method of providing distributed cellular telephone services to a plurality of cellular telephone subscribers between selected remote geographic regions, which comprises the steps of:

I. positioning one or more global communications satellites at one or more selected locations for receiving and relaying packet data communications encapsulating cellular telephone communications to at least one of the remote geographic regions;

ii. locating a first station in a first remote geographic region, the first station including a first base station having mobile wireless links to a plurality of subscribers of cellular telephone services in the first region, a first satellite communications terminal for communicating with the satellite from the first region, a first base station controller with programming for controlling the first base station, and a first user terminal, the first station being stationary when in use but movable for deployment when not in use;

iii. locating a second station in a second remote geographic region, the second station including a second base station having mobile wireless links to a plurality of subscribers of cellular telephone services in the second region, a second satellite communications terminal for communicating with the satellite from the second region, a second base station controller with programming for controlling the second base station, and a second user terminal, the second station being stationary when in use but movable for deployment when not in use;

iv. providing a third station in a third remote geographic region, the third station including a third satellite communications terminal for communicating with the satellite from the third region, and a single mobile switching center that is stationary when in use but movable for deployment when not in use having a call processor for handling cellular telephone call switching between the first and second base stations; and v. providing a packet data network between the satellite and satellite communications terminals for interactive data communications throughout the cellular network.

15. A method of providing distributed cellular telephone services to a plurality of cellular telephone subscribers between selected remote geographic regions, which comprises the steps of:

I. positioning one or more global communications satellites at one or more selected locations for receiving and relaying packet data communications encapsulating cellular telephone communications to at least one of the remote geographic regions;

ii. locating a first station in a first remote geographic region, the first station including a first base station having mobile wireless links to a plurality of subscribers of cellular telephone services in the first region, a first satellite communications terminal for communicating with the satellite from the first region, and a first user terminal, the first station being stationary when in use but movable for deployment when not in use;

iii. locating a second station in a second remote geographic region, the second station including a second base station having mobile wireless links to a plurality of subscribers of cellular telephone services in the second region, a second satellite communications terminal for communicating with the satellite from the second region, a second base station controller with programming for controlling the first and second base station, and a second user terminal, the second station being stationary when in use but movable for deployment when not in use;

iv. providing a third station in a third remote geographic region, the third station including a third satellite communications terminal for communicating with the satellite from the third region, and a single mobile switching center that is stationary when in use but movable for deployment when not in use having a call processor for handling cellular telephone call switching between the first and second base stations; and providing a packet data network between the satellite and satellite communications terminals for interactive data communications throughout the cellular network.

16. A distributed cellular network for enabling calls between a third party outside the network and a cellular telephone subscriber at a selected remote location, the network comprising:

one or more global communications satellites positioned and adapted for receiving and relaying packet data communications encapsulating cellular telephone communications;

a first station located in a first remote geographic region, the first station including a first base station having mobile wireless links to a plurality of subscribers of cellular telephone services in the first region, a first satellite communications terminal for communicating with the satellite from the first region, and a first user terminal, the first station being stationary when in use but movable for deployment when not in use;

a second station located in a second remote geographic region, the second station including a second base station having mobile wireless links to a plurality of subscribers of cellular telephone services in the second region, a second satellite communications terminal for communicating with the satellite from the second region, and a second user terminal, the second station being stationary when in use but movable for deployment when not in use;

a third station located in a third remote geographic region, the third station including a third satellite communications terminal for communicating with the satellite from the third region, a plurality of base station controllers with programming for controlling the first and second base stations, and a single mobile switching center that is stationary when in use but movable for deployment when not in use having a call processor for handling cellular telephone call switching between the first and second base stations;

a land based telephone network, and/or wireline and/or other cellular telephone network(s) linked remotely and/or locally to the mobile switching center and having at least one telephone for enabling the third party to place a call to the subscriber; and a packet data network between the satellite and satellite communications terminals for interactive data communications throughout the cellular network.

17. A distributed cellular network for enabling calls between a third party outside the network and a cellular telephone subscriber at a selected remote location, which comprises:

one or more global communications satellites positioned and adapted for receiving and relaying packet data communications encapsulating cellular telephone communications;

a first station located in a first remote geographic region, the first station including a first base station having mobile wireless links to a plurality of subscribers of cellular telephone services in the first region, a first satellite communications terminal for communicating with the satellite from the first region, one or more first base station controllers with programming for controlling the first base station, and a first user terminal, the first station being stationary when in use but movable for deployment when not in use;

a second station located in a second remote geographic region, the second station including a second base station having mobile wireless links to a plurality of subscribers of cellular telephone services in the second region, a second satellite communications terminal for communicating with the satellite from the second region, one or more second base station controllers with programming for controlling the second base station, and a second user terminal, the second station being stationary when in use but movable for deployment when not in use;

a third station located in a third remote geographic region, the third station including a third satellite communications terminal for communicating with the satellite from the third region, and a single mobile switching center that is stationary when in use but movable for deployment when not in use having a call processor for handling cellular telephone call switching between the first and second base stations;

a land based telephone network, and/or wireline and/or other cellular telephone network(s), linked remotely and/or locally to the mobile switching center and having at least one telephone for enabling the third party to place a call to the subscriber; and a packet data network between the satellite and satellite communications terminals for interactive data communications throughout the cellular network.

18. A distributed cellular network for enabling calls between a third party outside the network and a cellular telephone subscriber at a selected remote location, which comprises:

one or more global communications satellites positioned and adapted for receiving and relaying packet data communications encapsulating cellular telephone communications;

a first station located in a first remote geographic region, the first station including a first base station having mobile wireless links to a plurality of subscribers of cellular telephone services in the first region, a first satellite communications terminal for communicating with the satellite from the first region, and a first user terminal, the first station being stationary when in use but movable for deployment when not in use;

a second station located in a second remote geographic region, the second station including a second base station having mobile wireless links to a plurality of subscribers of cellular telephone services in the second region, a second satellite communications terminal for communicating with the satellite from the second region, one or more second base station controllers with programming for controlling the first and second base stations, and a second user terminal, the second station being stationary when in use but movable for deployment when not in use;

a third station located in a third remote geographic region, the third station including a third satellite communications terminal for communicating with the satellite from the third region, and a single mobile switching center that is stationary when in use but movable for deployment when not in use having a call processor for handling cellular telephone call switching between the first and second base stations;

a third party, cellular or land-based, telephone network linked remotely and/or locally to the mobile switching center and having at least one telephone for enabling the third party to place a call to the subscriber; and a packet data network between the satellite and satellite communications terminals for interactive data communications throughout the cellular network.

19. A distributed cellular network for enabling calls between a first cellular telephone subscriber at a first remote location and a second cellular telephone subscriber at a second remote location, the network comprising:

one or more global communications satellites positioned and adapted for receiving and relaying packet data communications encapsulating cellular telephone communications;

a first station located in a first remote geographic region, the first station including a first base station having mobile wireless links to a plurality of subscribers of cellular telephone services in the first region, a first satellite communications terminal for communicating with the satellite from the first region, and a first user terminal, the first station being stationary when in use but movable for deployment when not in use;

a second station located in a second remote geographic region, the second station including a second base station having mobile wireless links to a plurality of subscribers of cellular telephone services in the second region, a second satellite communications terminal for communicating with the satellite from the second region, and a second user terminal, the second station being stationary when in use but movable for deployment when not in use;

a third station located in a third remote geographic region, the third station including a third satellite communications terminal for communicating with the satellite from the third region, a plurality of base station controllers with programming for controlling the first and second base stations, and a single mobile switching center that is stationary when in use but movable for deployment when not in use having a call processor for handling cellular telephone call switching between the first and second base stations; and a packet data network between the satellite and satellite communications terminals for interactive data communications throughout the cellular network.

20. A distributed cellular network for enabling calls between a first cellular telephone subscriber at a first remote location and a second, wireline telephone subscriber at a second remote location, which comprises:

one or more global communications satellites positioned and adapted for receiving and relaying packet data communications encapsulating cellular telephone communications;

a first station located in a first remote geographic region, the first station including a first base station having mobile wireless links to a plurality of subscribers of cellular telephone services in the first region, a first satellite communications terminal for communicating with the satellite from the first region, one or more first base station controllers with programming for controlling the first base station, and a first user terminal, the first station being stationary when in use but movable for deployment when not in use;

a second station located in a second remote geographic region, the second station including a second base station having non-mobile wireline links to a plurality of subscribers of wireline telephone services in the second region, a second satellite communications terminal for communicating with the satellite from the second region, one or more second base station controllers with programming for controlling the second base station, and a second user terminal, the second station being stationary when in use but movable for deployment when not in use;

a third station located in a third remote geographic region, the third station including a third satellite communications terminal for communicating with the satellite from the third region, and a single mobile switching center that is stationary when in use but movable for deployment when not in use having a call processor for handling cellular telephone call switching between the first and second base stations; and a packet data network between the satellite and satellite communications terminals for interactive data communications throughout the cellular network.

21. A distributed digital communications network for enabling interactive communications between a third party outside the network having first or second digital multimedia communications services, and a subscriber to second digital multimedia communications services at a selected remote location, the network comprising:

one or more global communications satellites positioned and adapted for receiving and relaying packet data communications encapsulating the interactive communications;

a first station located in a first remote geographic region, the first station including a first base station having mobile wireless links to a plurality of subscribers to first or second digital multimedia communications services in the first region, a first satellite communications terminal for communicating with the satellite from the first region, and a first user terminal, the first station being stationary when in use but movable for deployment when not in use;

a second station located in a second remote geographic region, the second station including a second base station having mobile wireless links to a plurality of subscribers to second digital multimedia communications services in the second region, a second satellite communications terminal for communicating with the satellite from the second region, and a second user terminal, the second station being stationary when in use but movable for deployment when not in use;

a third station located in a third remote geographic region, the third station including a third satellite communications terminal for communicating with the satellite from the third region, a base station controller with programming for controlling the first and second base stations, and a single mobile switching center that is stationary when in use but movable for deployment when not in use having a digital communications signal processor for handling digital signal switching between the first and second base stations;

a land based, wireline communications network, and/or one or more selected wireless communications network(s), linked remotely and/or locally to the mobile switching center and having at least one device for enabling the third party to transmit a communications signal to the subscriber; and a packet data network between the satellite and satellite communications terminals for interactive data communications throughout the distributed network.

22. The network set forth in claim 21, wherein the base station controller is located remotely from, or locally with, the first and second base stations.

23. The network set forth in claim 21, wherein the base station controller is located remotely from, or locally with, the first and second base stations and not at the third base station.

24. A distributed digital communications network for enabling interactive communications between a third party outside the network having first or second digital multimedia communications services, and a subscriber to second digital multimedia communications services at a selected remote location, which comprises:
   one or more global communications satellites positioned and adapted for receiving and relaying packet data communications encapsulating the interactive communications;
   a first station located in a first remote geographic region, the first station including a first base station having mobile wireless links to a plurality of subscribers to first or second digital multimedia communications services in the first region, a first satellite communications terminal for communicating with the satellite from the first region, a first base station controller with programming for controlling the first base station, and a first user terminal, the first station being stationary when in use but movable for deployment when not in use;
   a second station located in a second remote geographic region, the second station including a second base station having mobile wireless links to a plurality of subscribers to the second digital multimedia communications services in the second region, a second satellite communications terminal for communicating with the satellite from the second region, a second base station controller with programming for controlling the second base station, and a second user terminal, the second station being stationary when in use but movable for deployment when not in use;
   a third station located in a third remote geographic region, the third station including a third satellite communications terminal for communicating with the satellite from the third region, and a single mobile switching center that is stationary when in use but movable for deployment when not in use having a digital communications signal processor for handling digital signal switching between the first and second base stations;
   a land based communications network, and/or wireline and/or one or more selected wireless communications network(s), linked remotely and/or locally to the mobile switching center and having at least one device for enabling the third party to transmit a communications signal to the subscriber; and
   a packet data network between the satellite and satellite communications terminals for interactive data communications throughout the distributed network.

25. A distributed digital communications network for enabling interactive communications between a third party outside the network having first digital multimedia communications services, and a subscriber to second digital multimedia communications services at a selected remote location, which comprises:
   one or more global communications satellites positioned and adapted for receiving and relaying packet data communications encapsulating the interactive communications;
   a first station located in a first remote geographic region, the first station including a first base station having mobile wireless links to a plurality of subscribers to first digital multimedia communications services in the first region, a first satellite communications terminal for communicating with the satellite from the first region, and a first user terminal, the first station being stationary when in use but movable for deployment when not in use;
   a second station located in a second remote geographic region, the second station including a second base station having mobile wireless links to a plurality of subscribers to second digital multimedia communications services in the second region, a second satellite communications terminal for communicating with the satellite from the second region, a base station controller with programming for controlling the first and second base stations, and a second user terminal, the second station being stationary when in use but movable for deployment when not in use;
   a third station located in a third remote geographic region, the third station including a third satellite communications terminal for communicating with the satellite from the third region, and a single mobile switching center that is stationary when in use but movable for deployment when not in use having a digital communications signal processor for handling digital signal switching between the first and second base stations;
   a third party, wireless and/or wireline-based, interactive communications network linked remotely and/or locally to the mobile switching center and having at least one device for enabling the third party to transmit a communications signal to the subscriber; and
   a packet data network between the satellite and satellite communications terminals for interactive data communications throughout the distributed network.

26. The network set forth in claim 25, wherein the base station controller is located remotely from, or locally with, the first and second base stations.

27. The network set forth in claim 25, wherein the base station controller is located remotely from, or locally with, the first and second base stations and not at the third base station.

28. A distributed digital communications network for enabling interactive communications between a first digital multimedia communications services subscriber at a first remote location and a second digital multimedia communications services subscriber at a second remote location, the network comprising:
   one or more global communications satellites positioned and adapted for receiving and relaying packet data communications encapsulating the interactive communications;
   a first station located in a first remote geographic region, the first station including a first base station having mobile wireless links to a plurality of subscribers to first digital multimedia communications services in the first region, a first satellite communications terminal for communicating with the satellite from the first region, and a first user terminal, the first station being stationary when in use but movable for deployment when not in use;
   a second station located in a second remote geographic region, the second station including a second base station having mobile wireless links to a plurality to subscribers to second digital multimedia communications services in the second region, a second satellite communications terminal for communicating with the satellite from the second region, and a second user terminal, the second station being stationary when in use but movable for deployment when not in use;

a third station located in a third remote geographic region, the third station including a third satellite communications terminal for communicating with the satellite from the third region, a base station controller with programming for controlling the first and second base stations, and a single mobile switching center that is stationary when in use but movable for deployment when not in use having a digital communications signal processor for handling digital signal switching between the first and second base stations; and a packet data network between the satellite and satellite communications terminals for interactive data communications throughout the distributed network.

29. A distributed digital communications network for enabling interactive communications between a first digital multimedia communications services subscriber at a first remote location and a second digital multimedia communications services subscriber at a second remote location, which comprises:

one or more global communications satellites positioned and adapted for receiving and relaying packet data communications encapsulating the interactive communications;

a first station located in a first remote geographic region, the first station including a first base station having mobile wireless links to a plurality of subscribers to first digital multimedia communications services in the first region, a first satellite communications terminal for communicating with the satellite from the first region, a first base station controller with programming for controlling the first base station, and a first user terminal, the first station being stationary when in use but movable for deployment when not in use;

a second station located in a second remote geographic region, the second station including a second base station having mobile wireless links to a plurality of subscribers to second digital multimedia communications services in the second region, a second satellite communications terminal for communicating with the satellite from the second region, a second base station controller with programming for controlling the second base station, and a second user terminal, the second station being stationary when in use but movable for deployment when not in use;

a third station located in a third remote geographic region, the third station including a third satellite communications terminal for communicating with the satellite from the third region, and a single mobile switching center that is stationary when in use but movable for deployment when not in use having a digital communications signal processor for handling digital signal switching between the first and second base stations; and a packet data network between the satellite and satellite communications terminals for interactive data communications throughout the distributed network.

30. A method of providing distributed interactive digital multimedia communications services to a plurality of subscribers at selected remote geographic regions, which comprises the steps of:

I. positioning one or more global communications satellites at one or more selected locations for receiving and relaying packet data communications encapsulating the communications services to at least one of the remote geographic regions;

ii. locating a first station in a first remote geographic region, the first station including a first base station having mobile wireless links to a plurality of subscribers to the communications services in the first region, a first satellite communications terminal for communicating with the satellite from the first region, and a first user terminal, the first station being stationary when in use but movable for deployment when not in use;

iii. locating a second station in a second remote geographic region, the second station including a second base station having mobile wireless links to a plurality of subscribers to the communications services in the second region, a second satellite communications terminal for communicating with the satellite from the second region, and a second user terminal, the second station being stationary when in use but movable for deployment when not in use;

iv. providing a third station in a third remote geographic region, the third station including a third satellite communications terminal for communicating with the satellite from the third region, a base station controller with programming for controlling the first and second base station, and a single mobile switching center that is stationary when in use but movable for deployment when not in use having a digital communications signal processor for handling digital signal switching between the first and second base stations;

v. linking a land based communications network, and/or wireline and/or other selected wireless communications network(s), remotely and/or locally to the mobile switching center, the network having at least one device for enabling the third party to transmit a communications signal to the subscriber; and vi. providing a packet data network between the satellite and satellite communications terminals for interactive data communications throughout the distributed network.

31. A method of providing distributed interactive digital multimedia communications services to a plurality of subscribers at selected remote geographic regions, which comprises the steps of:

I. positioning one or more global communications satellites at one or more selected locations for receiving and relaying packet data communications encapsulating the communications services to at least one of the remote geographic regions;

ii. locating a first station in a first remote geographic region, the first station including a first base station having mobile wireless links to a plurality of subscribers to the communications services in the first region, a first satellite communications terminal for communicating with the satellite from the first region, a first base station controller with programming for controlling the first base station, and a first user terminal, the first station being stationary when in use but movable for deployment when not in use;

iii. locating a second station in a second remote geographic region, the second station including a second base station having mobile wireless links to a plurality of subscribers to the communications services in the second region, a second satellite communications terminal for communicating with the satellite from the second region, a second base station controller with programming for controlling the second base station, and a second user terminal, the second station being stationary when in use but movable for deployment when not in use;

iv. providing a third station in a third remote geographic region, the third station including a third satellite communications terminal for communicating with the satellite from the third region, and a single mobile switching center that is stationary when in use but movable for deployment when not in use having a digital communications signal processor for handling digital signal switching between the first and second base stations;

v. linking a land based telephone network, and/or wireline and/or other selected wireless communications network(s), remotely and/or locally to the mobile switching center, the network having at least one device for enabling the third party to transmit a communications signal to the subscriber; and vi. providing a packet data network between the satellite and satellite communications terminals for interactive data communications throughout the distributed network.

32. A method of providing distributed interactive digital multimedia communications services to a plurality of subscribers at selected remote geographic regions, which comprises the steps of:

I. positioning one or more global communications satellites at one or more selected locations for receiving and relaying packet data communications encapsulating the communications services to at least one of the remote geographic regions;

ii. locating a first station in a first remote geographic region, the first station including a first base station having mobile wireless links to a plurality of subscribers to the communications services in the first region, a first satellite communications terminal for communicating with the satellite from the first region, and a first user terminal, the first station being stationary when in use but movable for deployment when not in use;

iv. locating a second station in a second remote geographic region, the second station including a second base station having mobile wireless links to a plurality of subscribers to the communications services in the second region, a second satellite communications terminal for communicating with the satellite from the second region, a base station controller with programming for controlling the first and second base stations, and a second user terminal, the second station being stationary when in use but movable for deployment when not in use;

v. providing a third station in a third remote geographic region, the third station including a third satellite communications terminal for communicating with the satellite from the region, and a single mobile switching center that is stationary when in use but movable for deployment when not in use having a digital communications signal processor for handling digital signal switching between the first and second base stations;

vi. linking a land based telephone network, and/or wireline and/or other selected wireless communications network(s), remotely and/or locally to the mobile switching center, the network having at least one device for enabling the third party to transmit a communications signal to the subscriber; and vii. providing a packet data network between the satellite and satellite communications terminals for interactive data communications throughout the distributed network.

33. A method of providing distributed interactive digital multimedia communications services to a plurality of subscribers between selected remote geographic regions, which comprises the steps of:

I. positioning one or more global communications satellites at one or more selected locations for receiving and relaying packet data communications encapsulating the communications services to at least one of the remote geographic regions;

ii. locating a first station in a first remote geographic region, the first station including a first base station having mobile wireless links to a plurality of subscribers to the communications services in the first region, a first satellite communications terminal for communicating with the satellite from the first region, and a first user terminal, the first station being stationary when in use but movable for deployment when not in use;

iii. locating a second station in a second remote geographic region, the second station including a second base station having mobile wireless links to a plurality of subscribers to the communications services in the second region, a second satellite communications terminal for communicating with the satellite from the second region, and a second user terminal, the second station being stationary when in use but movable for deployment when not in use;

iv. providing a third station in a third remote geographic region, the third station including a third satellite communications terminal for communicating with the satellite from the region, a base station controller with programming for controlling the first and second base stations, and a single mobile switching center that is stationary when in use but movable for deployment when not in use having a digital communications signal processor for handling digital signal switching between the first and second base stations; and v. providing a packet data network between the satellite and satellite communications terminals for interactive data communications throughout the distributed network.

34. A method of providing distributed interactive digital multimedia communications services to a plurality of subscribers between selected remote geographic regions, which comprises the steps of:

I. positioning one or more global communications satellites at one or more selected locations for receiving and relaying packet data communications encapsulating the communications services to at least one of the remote geographic regions;

ii. locating a first station in a first remote geographic region, the first station including a first base station having mobile wireless links to a plurality of subscribers to the communications services in the first region, a first satellite communications terminal for communicating with the satellite from the first region, a first base station controller with programming for controlling the first base station, and a first user terminal, the first station being stationary when in use but movable for deployment when not in use;

iii. locating a second station in a second remote geographic region, the second station including a second base station having mobile wireless links to a plurality of subscribers to the communications services in the second region, a second satellite communications terminal for communicating with the satellite from the second region, a second base station controller with programming for controlling the second base station, and a second user terminal, the second station being stationary when in use but movable for deployment when not in use;

iv. providing a third station in a third remote geographic region, the third station including a third satellite communications terminal for communicating with the satellite from the region, and a single mobile switching center that is stationary when in use but movable for deployment when not in use having a digital communications signal processor for handling digital signal switching between the first and second base stations; and v. providing a packet data network between the satellite and satellite communications terminals for interactive data communications throughout the distributed network.

35. A method of providing distributed interactive digital multimedia communications services to a plurality of subscribers between selected remote geographic regions, which comprises the steps of:

I. positioning one or more global communications satellites at one or more selected locations for receiving and relaying packet data communications encapsulating the communications services to at least one of the remote geographic regions;

ii. locating a first station in a first remote geographic region, the first station including a first base station having mobile wireless links to a plurality of subscribers to the communications services in the first region, a first satellite communications terminal for communicating with the satellite from the first region, and a first user terminal, the first station being stationary when in use but movable for deployment when not in use;

iii. locating a second station in a second remote geographic region, the second station including a base station having mobile wireless links to a plurality of subscribers to the communications services in the second region, a second satellite communications terminal for communicating with the satellite from the second region, a second base station controller with programming for controlling the first and second base stations, and a second user terminal, the second station being stationary when in use but movable for deployment when not in use;

iv. providing a third station in a third remote geographic region, the third station including a third satellite communications terminal for communicating with the satellite from the third region, and a single mobile switching center that is stationary when in use but movable for deployment when not in use having a signal processor for handling signal switching between the first and second base stations; and v. providing a packet data network between the satellite and satellite communications terminals for interactive data communications throughout the distributed network.

36. A distributed interactive digital multimedia communications network for enabling transmission of one or more communications signal(s) between a third party outside the network and a communications services subscriber at a selected remote location, the network comprising:

one or more global communications satellites positioned and adapted for receiving and relaying packet data communications encapsulating the communications services;

a first station located in a first remote geographic region, the first station including a first base station having mobile wireless links to a plurality of subscribers to communications services in the first region including those for interactive transmission, a first satellite communications terminal for communicating with the satellite from the first region, and a first user terminal, the first station being stationary when in use but movable for deployment when not in use;

a second station located in a second remote geographic region, the second station including a second base station having mobile wireless links to a plurality of subscribers to communications services in the second region including those for interactive transmission, a second satellite communications terminal for communicating with the satellite from the second region, and a second user terminal, the second station being stationary when in use but movable for deployment when not in use;

a third station located in a third remote geographic region, the third station including a third satellite communications terminal for communicating with the satellite from the third region, a plurality of base station controllers with programming for controlling the first and second base stations, and a single mobile switching center that is stationary when in use but movable for deployment when not in use having a digital communications signal processor for handling digital signal switching between the first and second base stations;

a land based telephone network, and/or wireline and/or other wireless telephone network(s), linked remotely and/or locally to the mobile switching center and having at least one device for enabling the third party to transmit a communications signal to the subscriber; and a packet data network between the satellite and satellite communications terminals for interactive data communications throughout the distributed network.

37. A distributed interactive digital communications network for enabling interactive transmission of one or more multimedia communications signal(s) between a third party outside the network and a multimedia communications services subscriber at a selected remote location, which comprises:

one or more global communications satellites positioned and adapted for receiving and relaying packet data communications encapsulating the communications signal(s);

a first station located in a first remote geographic region, the first station including a first base station having mobile wireless links to a plurality of subscribers to communications services in the first region including those for interactive transmission, a first satellite communications terminal for communicating with the satellite from the first region, one or more first base station controllers with programming for controlling the first base station, and a first user terminal, the first station being stationary when in use but movable for deployment when not in use;

a second station located in a second remote geographic region, the second station including a second base station having mobile wireless links to a plurality of subscribers to communications services in the second region including those for interactive transmission, a second satellite communications terminal for communicating with the satellite from the second region, one or more second base station controllers with programming for controlling the second base station, and a second user terminal, the second station being stationary when in use but movable for deployment when not in use;

a third station located in a third remote geographic region, the third station including a third satellite communications terminal for communicating with the satellite from the third region, and a single mobile switching center that is stationary when in use but movable for deployment when not in use having a digital communications signal processor for handling digital signal switching between the first and second base stations;

a land based telephone network, and/or wireline and/or other selected wireless communications network(s), linked remotely and/or locally to the mobile switching center and having at least one device for enabling the third party to transmit a communications signal to the subscriber; and a packet data network between the satellite and satellite communications terminals for interactive data communications throughout the distributed network.

38. A distributed interactive digital communications network for enabling transmission of one or more multimedia communications signal(s) between a third party outside the network and a multimedia communications services subscriber at a selected remote location, which comprises:

one or more global communications satellites positioned and adapted for receiving and relaying packet data communications encapsulating the communications signal(s);

a first station located in a first remote geographic region, the first station including a first base station having mobile wireless links to a plurality of subscribers to communications services in the first region including those for interactive transmission, a first satellite communications terminal for communicating with the satellite from the first region, and a first user terminal, the first station being stationary when in use but movable for deployment when not in use;

a second station located in a second remote geographic region, the second station including a second base station having mobile wireless links to a plurality of subscribers to communications services in the second region including those for interactive transmission, a second satellite communications terminal for communicating with the satellite from the second region, one or more base station controllers with programming for controlling the first and second base stations, and a second user terminal, the second station being stationary when in use but movable for deployment when not in use;

a third station located in a third remote geographic region, the third station including a third satellite communications terminal for communicating with the satellite from the third region, and a single mobile switching center that is stationary when in use but movable for deployment when not in use having a digital communications signal processor for handling digital signal switching between the first and second base stations;

a third party, wireless and/or land-based, interactive communications network linked remotely and/or locally to the mobile switching center and having at least one device for enabling the third party to transmit a communications signal to the subscriber; and a packet data network between the satellite and satellite communications terminals for interactive data communications throughout the distributed network.

39. A distributed digital communications network for enabling interactive communications between a first digital multimedia communications services subscriber at a first remote location and a second digital multimedia communications services subscriber at a second remote location, the network comprising:

one or more global communications satellites positioned and adapted for receiving and relaying packet data communications encapsulating the interactive communications;

a first station located in a first remote geographic region, the first station including a first base station having mobile wireless links to a plurality of subscribers to first digital multimedia communications services in the first region, a first satellite communications terminal for communicating with the satellite from the first region, and a first user terminal, the first station being stationary when in use but movable for deployment when not in use;

a second station located in a second remote geographic region, the second station including a second base station having mobile wireless links to a plurality of subscribers to second digital multimedia communications services in the second region, a second satellite communications terminal for communicating with the satellite from the second region, and a second user terminal, the second station being stationary when in use but movable for deployment when not in use;

a third station located in a third remote geographic region, the third station including a third satellite communications terminal for communicating with the satellite from the third region, a plurality of base station controllers with programming for controlling the first and second base stations, and a single mobile switching center that is stationary when in use but movable for deployment when not in use having a digital communications signal processor for handling digital signal switching between the first and second base stations; and a packet data network between the satellite and satellite communications terminals for interactive data communications throughout the distributed network.

40. A distributed digital communications network for enabling interactive communications between a first digital multimedia communications services subscriber at a first remote location and a second digital multimedia communications services subscriber at a second remote location, which comprises:

one or more global communications satellites positioned and adapted for receiving and relaying packet data communications encapsulating the interactive communications;

a first station located in a first remote geographic region, the first station including a first base station having mobile wireless links to a plurality of subscribers to first digital multimedia communications services in the first region, a first satellite communications terminal for communicating with the satellite from the first region, one or more first base station controllers with programming for controlling the first base station, and a first user terminal, the first station being stationary when in use but movable for deployment when not in use;

a second station located in a second remote geographic region, the second station including a second base station having non-mobile wireline links to a plurality of subscribers to second digital multimedia communications services in the second region, a second satellite communications terminal for communicating with the satellite from the second region, one or more second base station controllers with programming for controlling the second base station, and a second user terminal, the second station being stationary when in use but movable for deployment when not in use;

a third station located in a third remote geographic region, the third station including a third satellite communications terminal for communicating with the satellite from the third region, and a single mobile switching center that is stationary when in use but movable for deployment when not in use having a digital communications signal processor for handling digital signal switching between the first and second base stations; and a packet data network between the satellite and satellite communications terminals for interactive data communications throughout the distributed network.

* * * * *